(12) United States Patent
Morita et al.

(10) Patent No.: US 11,709,476 B2
(45) Date of Patent: Jul. 25, 2023

(54) INFORMATION PROCESSING APPARATUS, INFORMATION PROCESSING METHOD AND PROGRAM

(71) Applicant: SONY CORPORATION, Tokyo (JP)

(72) Inventors: Takuma Morita, Tokyo (JP); Yusuke Kawabe, Kanagawa (JP); Tomoo Mizukami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 16/758,554

(22) PCT Filed: Jul. 26, 2018

(86) PCT No.: PCT/JP2018/028131
§ 371 (c)(1),
(2) Date: Apr. 23, 2020

(87) PCT Pub. No.: WO2019/087484
PCT Pub. Date: May 9, 2019

(65) Prior Publication Data
US 2020/0348647 A1 Nov. 5, 2020

(30) Foreign Application Priority Data
Oct. 30, 2017 (JP) .................. 2017-209026

(51) Int. Cl.
*G05B 19/4155* (2006.01)
(52) U.S. Cl.
CPC .............. *G05B 19/4155* (2013.01); *G05B 2219/39254* (2013.01)
(58) Field of Classification Search
None
See application file for complete search history.

(56) References Cited

U.S. PATENT DOCUMENTS 4,775,352 A * 10/1988 Curran .................. A63H 3/28
352/87
6,904,334 B2 6/2005 Asano et al.
(Continued)

FOREIGN PATENT DOCUMENTS

| CN | 106537481 A | 3/2017 |
|---|---|---|
| CN | 209364629 U | 9/2019 |

(Continued)

OTHER PUBLICATIONS

Hoque et al., "A Proactive Approach of Robotic Framework for Making Eye Contact with Humans", Jul. 2014, Advances in Human-Computer Interaction, pp. 2-10 (Year: 2014).*

*Primary Examiner* — Mohammad Ali
*Assistant Examiner* — David Earl Ogg
(74) *Attorney, Agent, or Firm* — Paratus Law Group, PLLC

(57) ABSTRACT

There is provided an information processing apparatus and information processing method to implement a more natural and flexible behavior plan of an autonomous mobile object, the information processing apparatus including a behavior planner configured to plan a behavior of an autonomous mobile object based on estimation of circumstances, wherein the behavior planner is configured to, based on the circumstances that are estimated and multiple sets of needs that are opposed to each other, determine the behavior to be executed by the autonomous mobile object. The information processing method includes, by a processor, planning a behavior of an autonomous mobile object based on estimation of circumstances, wherein the planning includes, based on the circumstances that are estimated and multiple sets of needs that are opposed to each other, determining the behavior to be executed by the autonomous mobile object.

21 Claims, 39 Drawing Sheets

(56) References Cited

U.S. PATENT DOCUMENTS

| | | | |
|---|---|---|---|
| 2004/0243281 A1 | 12/2004 | Fujita et al. | |
| 2007/0203613 A1* | 8/2007 | Huang | B25J 13/087 |
| | | | 700/245 |
| 2009/0289391 A1* | 11/2009 | Tye | A63H 9/00 |
| | | | 264/219 |
| 2011/0172822 A1* | 7/2011 | Ziegler | G16H 20/00 |
| | | | 348/E7.086 |
| 2011/0295399 A1* | 12/2011 | Plociennik | B25J 9/1676 |
| | | | 901/46 |
| 2014/0039680 A1 | 2/2014 | Angle et al. | |
| 2017/0100842 A1* | 4/2017 | Le Borgne | B25J 9/1694 |
| 2017/0120446 A1* | 5/2017 | Veltrop | B25J 9/1661 |
| 2018/0229372 A1* | 8/2018 | Breazeal | B25J 11/001 |

FOREIGN PATENT DOCUMENTS

| | | | |
|---|---|---|---|
| EP | 2933065 A1 | 10/2015 | |
| EP | 2933065 A1 | 10/2015 | |
| JP | 2002178283 A | 6/2002 | |
| JP | 2002-307354 A | 10/2002 | |
| JP | 2003-071763 A | 3/2003 | |
| JP | 2003-195886 A | 7/2003 | |
| JP | 2003-305677 A | 10/2003 | |
| JP | 2003305677 A * | 10/2003 | |
| JP | 2005-202075 A | 7/2005 | |
| JP | 2007-152445 A | 6/2007 | |
| JP | 2017-514709 A | 6/2017 | |
| WO | WO 2017/119348 A1 | 7/2017 | |
| WO | WO-2017119348 A1 * | 7/2017 | B25J 13/00 |

* cited by examiner

FIG.5
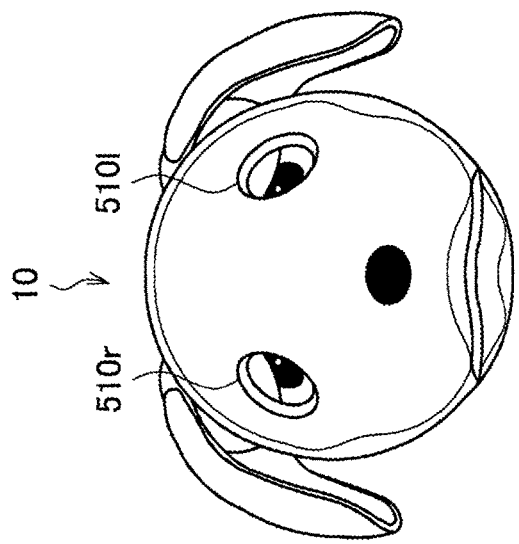
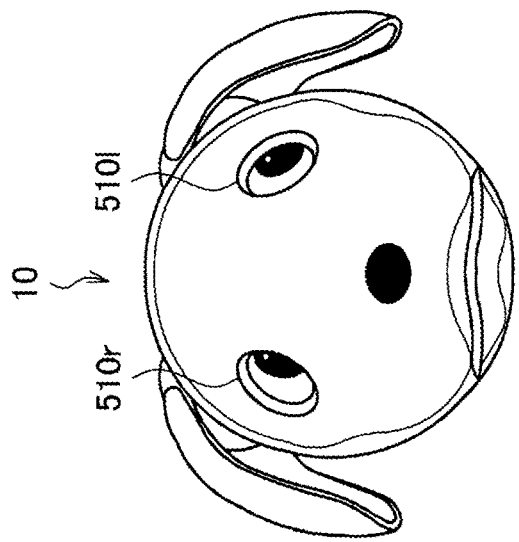
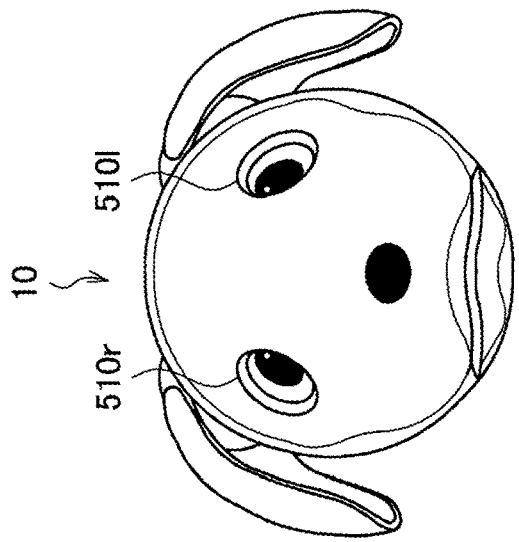

FIG.6
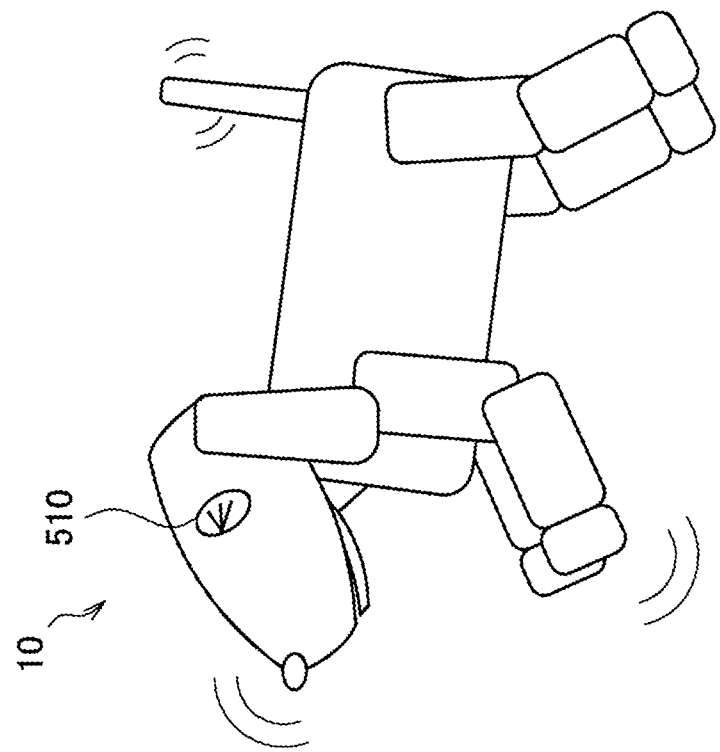
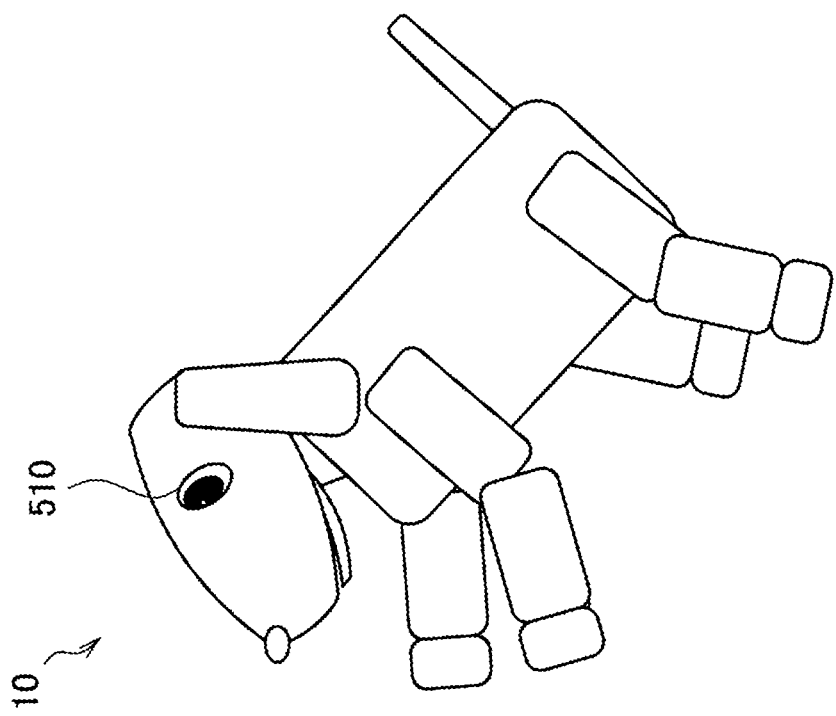

FIG.12
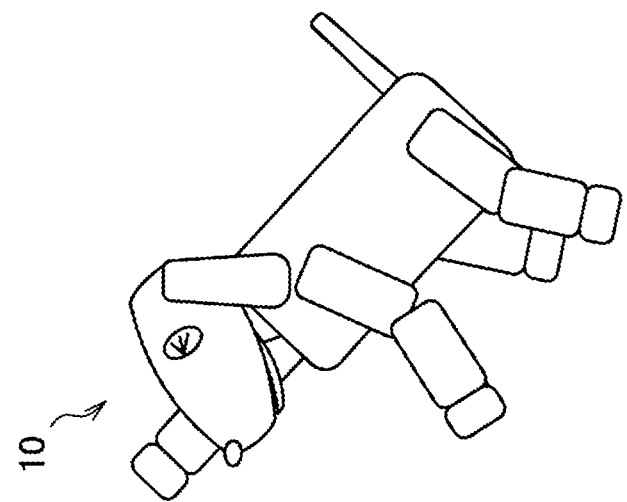
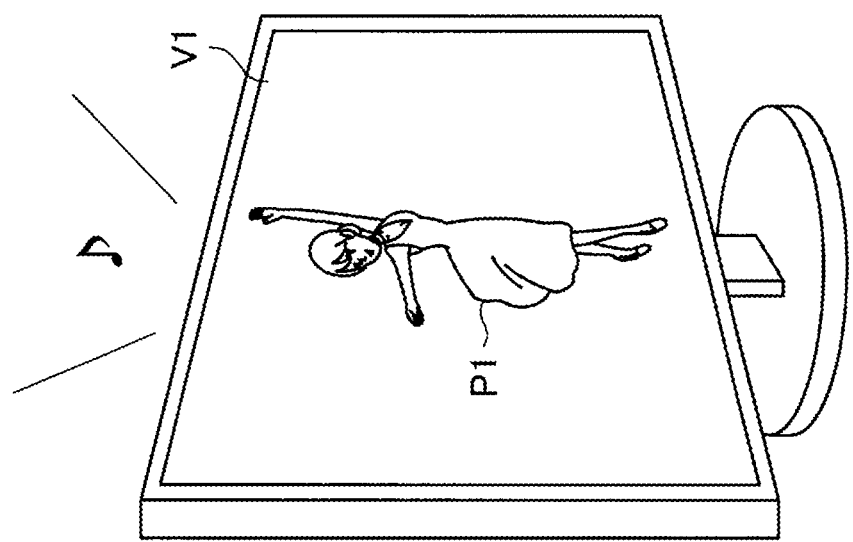

FIG.13
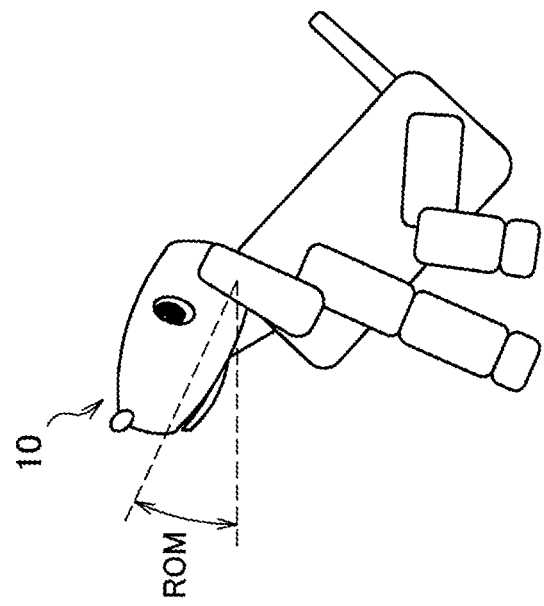
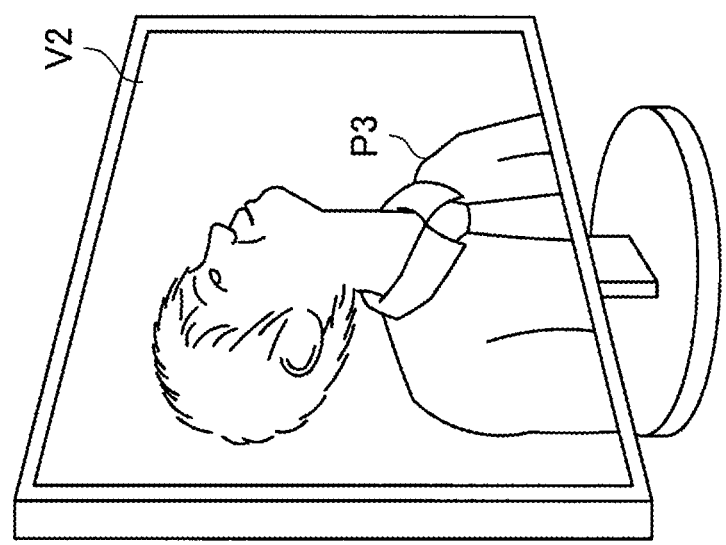

FIG.14
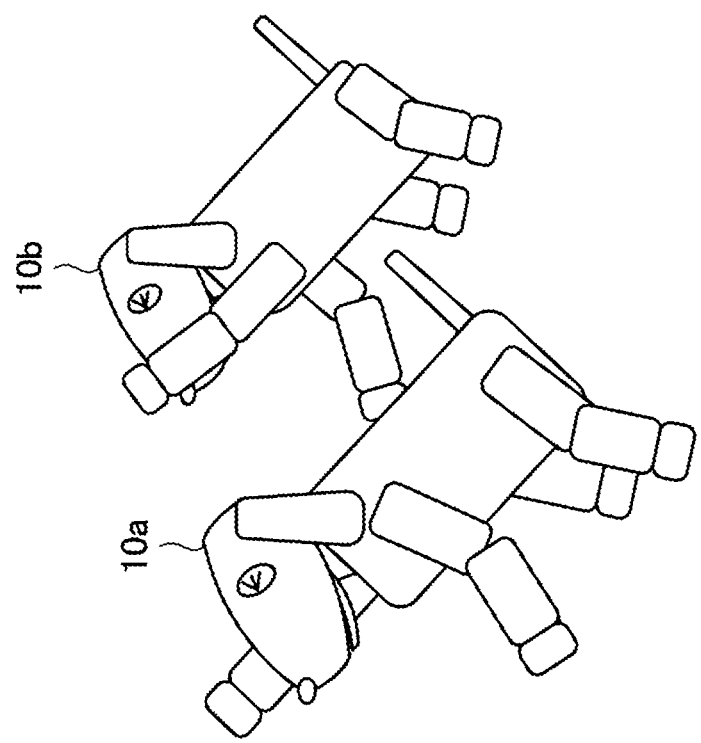
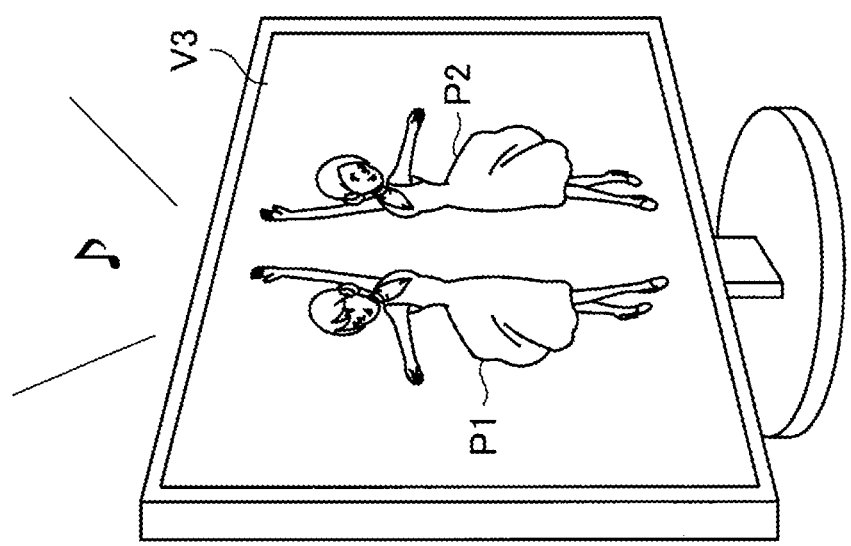

FIG.16
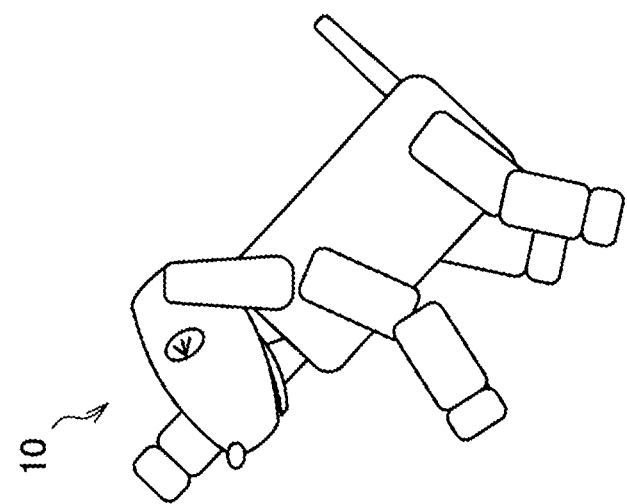
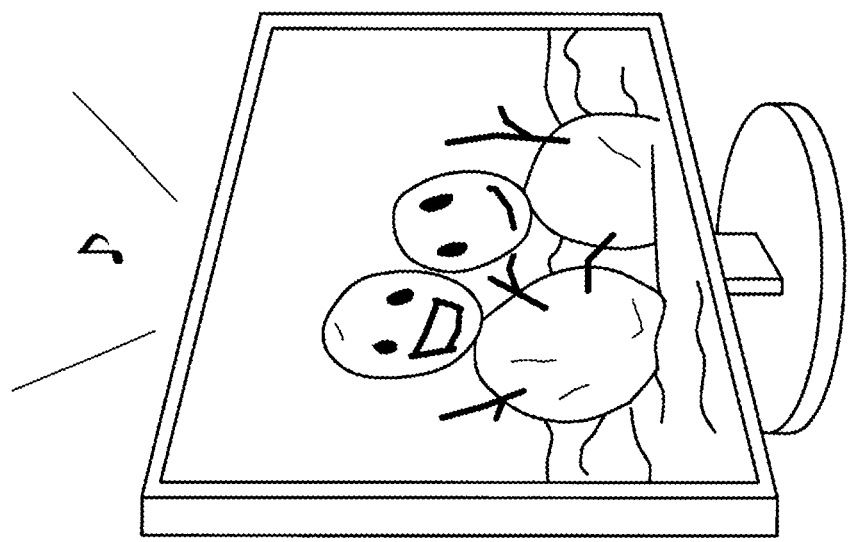

FIG.18
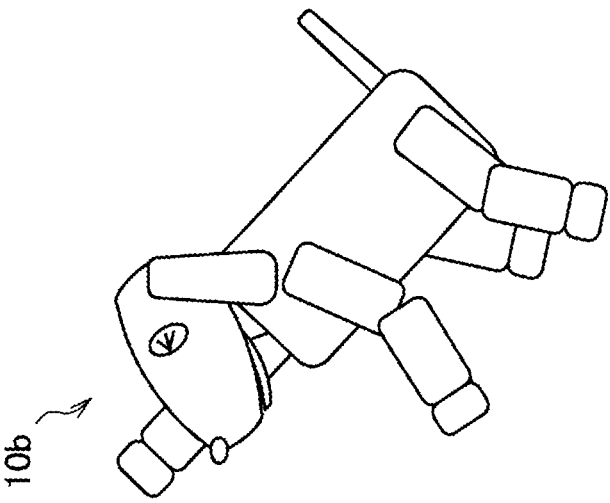
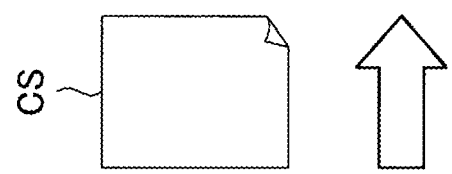
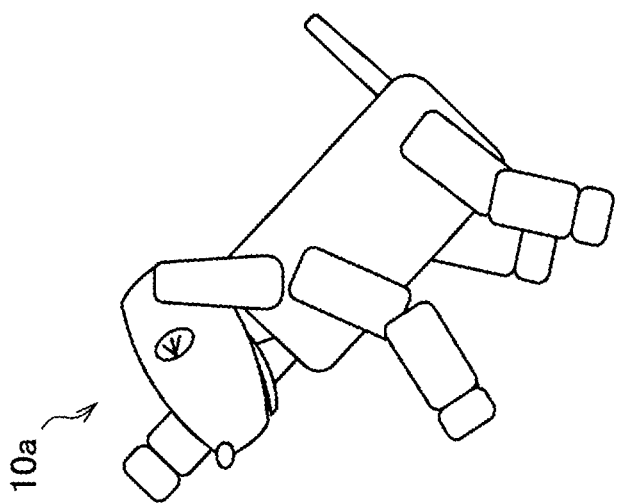

FIG.21
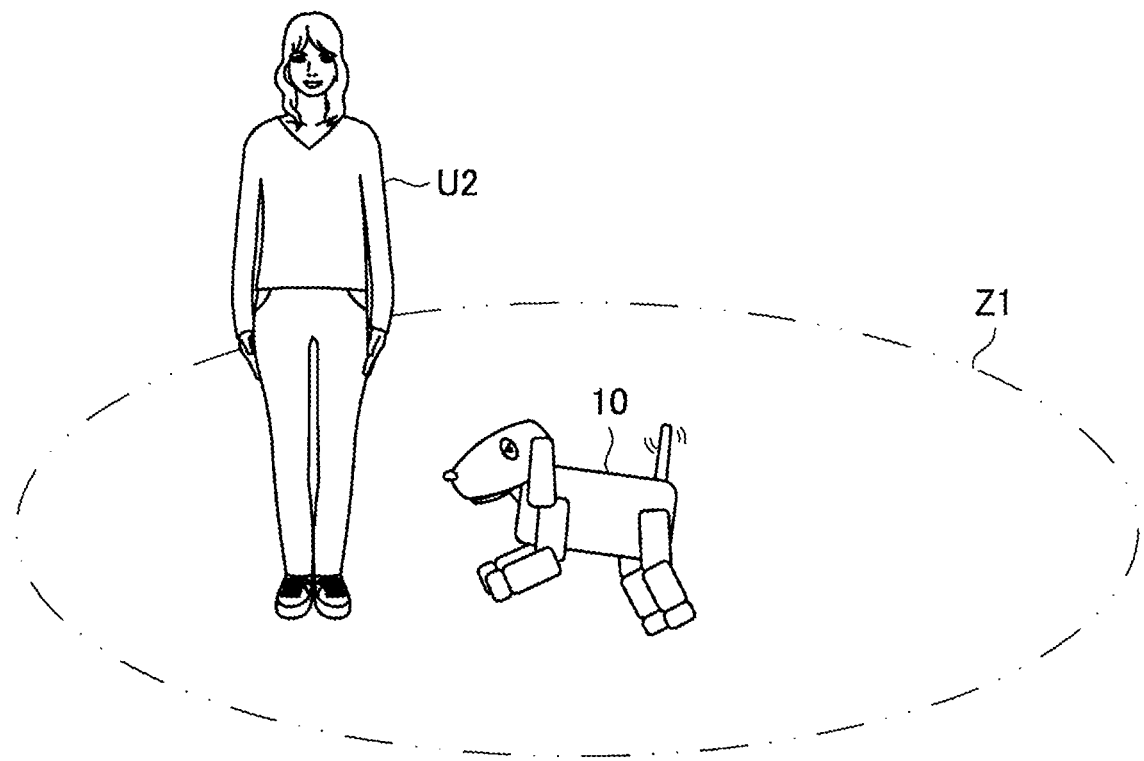
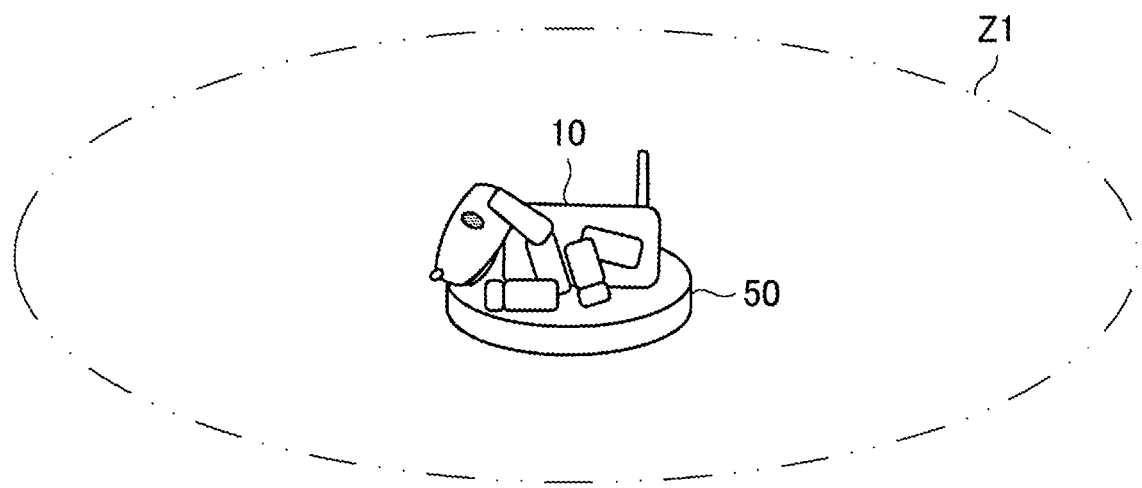

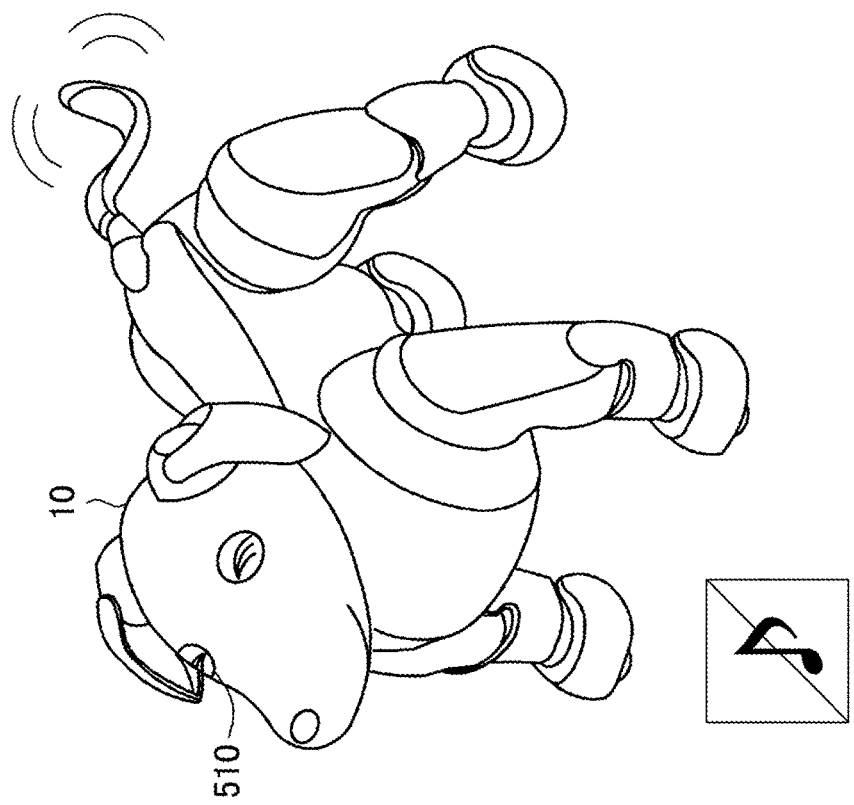
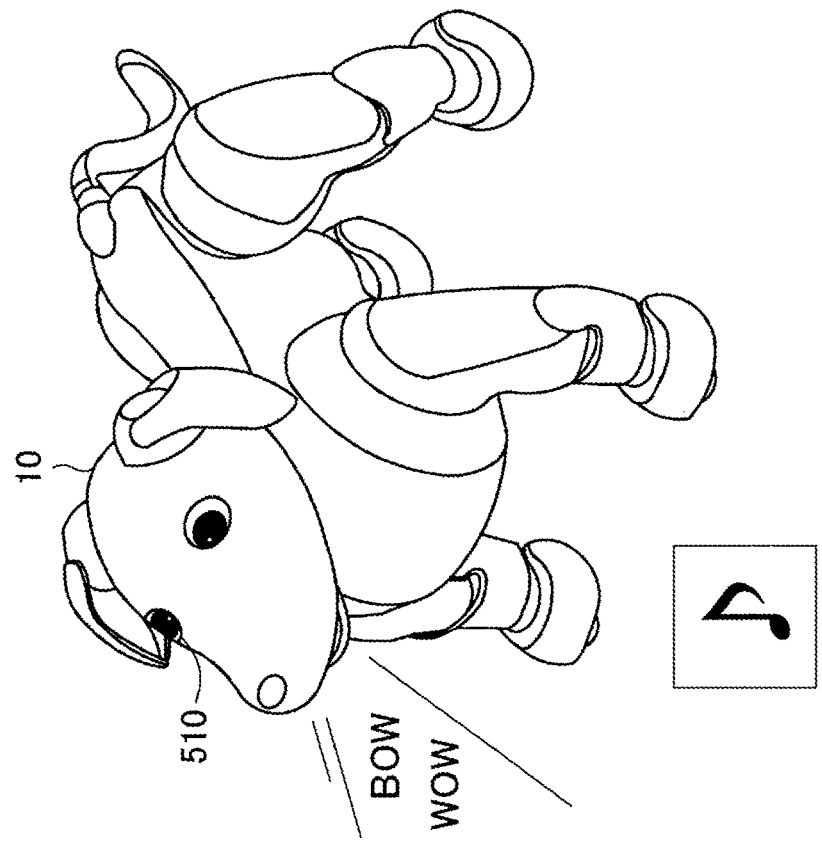
FIG.28

INFORMATION PROCESSING APPARATUS, INFORMATION PROCESSING METHOD AND PROGRAM

CROSS REFERENCE TO PRIOR APPLICATION

This application is a National Stage Patent Application of PCT International Patent Application No. PCT/JP2018/028131 (filed on Jul. 26, 2018) under 35 U.S.C. § 371, which claims priority to Japanese Patent Application No. 2017-209026 (filed on Oct. 30, 2017), which are all hereby incorporated by reference in their entirety.

FIELD

The present disclosure relates to an information processing apparatus, an information processing method and a program.

BACKGROUND

In recent years, various apparatuses with learning functions have been developed. The apparatuses include autonomous mobile objects, such as a robot that performs autonomous operations based on estimated circumstances. For example, Patent Literature 1 discloses a footed mobile robot that performs autonomous operations and expresses emotions corresponding to the circumstances.

CITATION LIST

Patent Literature

Patent Literature 1: Japanese Laid-open Patent Publication No. 2003-71763

SUMMARY

Technical Problem

Operations of an autonomous mobile object like that described in Patent Literature 1 are executed according to a behavior plan based on estimation of circumstances. When uniform behaviors are determined for estimated circumstances, simplistic operations patterns are caused and thus a situation in which the interest of the user in the autonomous mobile object lowers is also assumed.

The present disclosure thus proposes an information processing apparatus, an information processing method and a program that are novel and improved and that make it possible to implement a more natural and flexible behavior plan of an autonomous mobile object.

Solution to Problem

According to the present disclosure, an information processing apparatus is provided that includes: a behavior planner configured to plan a behavior of an autonomous mobile object based on estimation of circumstances, wherein the behavior planner is configured to, based on the circumstances that are estimated and multiple sets of needs that are opposed to each other, determine the behavior to be executed by the autonomous mobile object.

Moreover, according to the present disclosure, an information processing method is provided that includes: by a processor, planning a behavior of an autonomous mobile object based on estimation of circumstances, wherein the planning includes, based on the circumstances that are estimated and multiple sets of needs that are opposed to each other, determining the behavior to be executed by the autonomous mobile object.

Moreover, according to the present disclosure, a program is provided that causes a computer to function as an information processing apparatus comprising a behavior planner configured to plan a behavior of an autonomous mobile object based on estimation of circumstances, wherein the behavior planner is configured to, based on the circumstances that are estimated and multiple sets of needs that are opposed to each other, determine the behavior to be executed by the autonomous mobile object.

Advantageous Effects of Invention

According to the disclosure described above, it is possible to implement a more natural and flexible behavior plan of an autonomous mobile object.

The aforementioned effect is not necessarily restrictive and, together with the aforementioned effect, or instead of the aforementioned effect, another effect that can be known from any one of the effects represented in the specification or the specification may be derived.

BRIEF DESCRIPTION OF DRAWINGS

FIG. 5 is a diagram for describing a function of a display that the autonomous mobile object includes according to the embodiment of the disclosure.

FIG. 6 is a diagram illustrating an exemplary operation of the autonomous mobile object according to the embodiment of the disclosure.

FIG. 12 is a diagram for describing teaching according to movements of an animal object of which images are captured according to the first embodiment.

FIG. 13 is a diagram for describing trimming based on a range of motion according to the embodiment.

FIG. 14 is a diagram for describing teaching that specifies relative positions relating to multiple autonomous mobile objects according to the first embodiment.

FIG. 16 is a diagram for describing cause circumstances according to the first embodiment.

FIG. 18 is a diagram for describing transmission of control sequence data between the autonomous mobile objects according to the first embodiment.

FIG. 21 is a diagram for describing a behavior plan based on whether there is detection of a user according to a second embodiment of the disclosure.

FIG. 28 is a diagram for describing an exemplary behavior plan based on a control mode of the autonomous mobile object according to the second embodiment.

DESCRIPTION OF EMBODIMENTS

Figure 1:
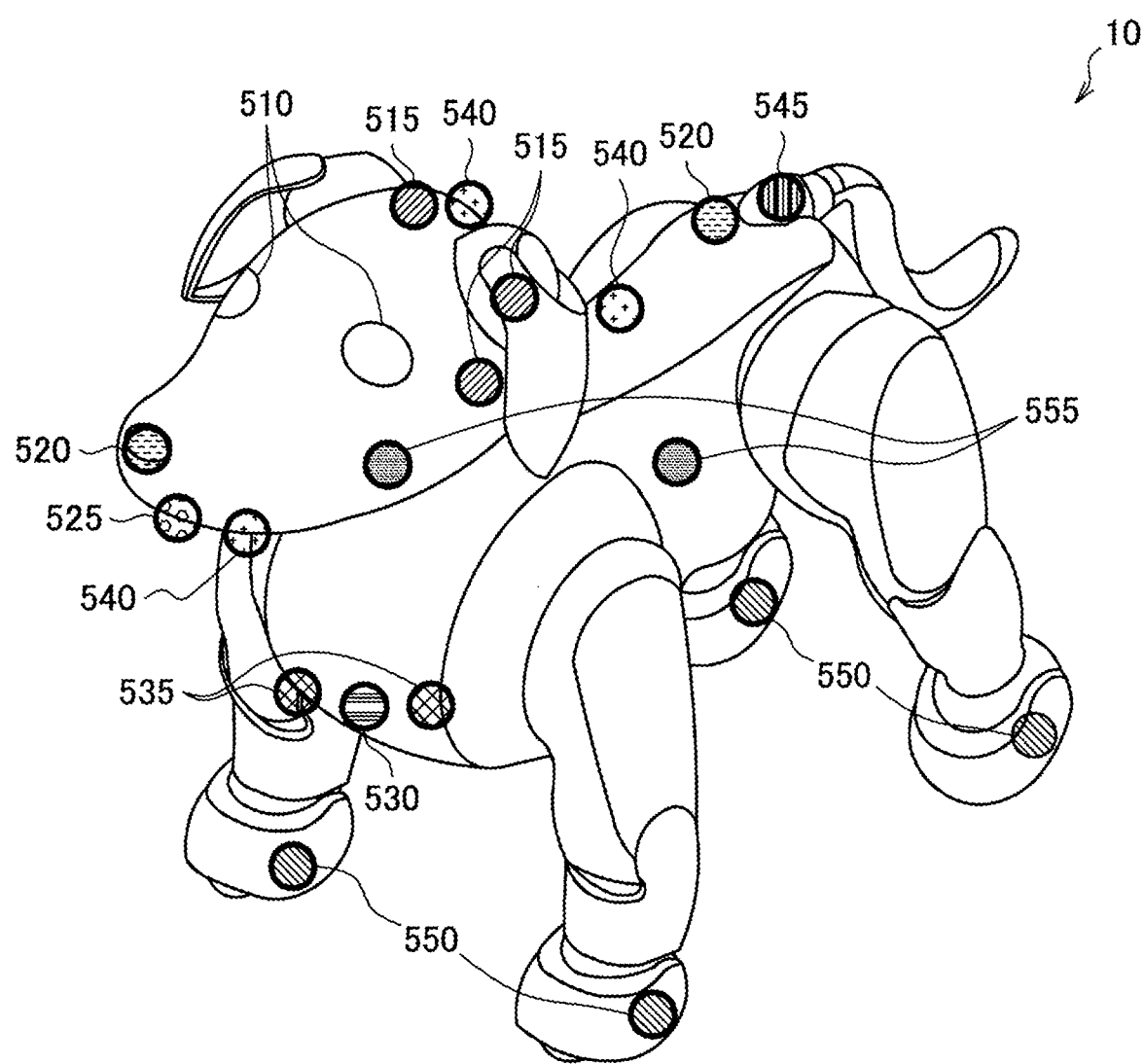
FIG. 1 is a diagram illustrating an exemplary hardware configuration of an autonomous mobile object according to an embodiment of the disclosure.

With reference to the accompanying drawings, preferable embodiments of the disclosure will be described. In the description and drawings, components that substantially have the same function are dented with the same numbers and redundant description is thus omitted.

Description will be given in the following order.
1. Configuration
   1.1. Overview of autonomous mobile object 10
   1.2. Exemplary hardware configuration of autonomous mobile object 10
   1.3. Exemplary system configuration
   1.4. Exemplary functional configuration of autonomous mobile object 10
   1.5. Exemplary functional configuration of information processing server 20
2. First Embodiment
   2.1. Overview
   2.2. Generation of control sequence data
   2.3. Flow of control
3. Second Embodiment
   3.1. Overview
   3.2. Specific example of behavior plan
   3.3 Flow of control
4. Third Embodiment
   4.1. Overview
   4.2. Representation of recommended behavior
   4.3. Additional registration in recognition dictionary
   4.4. Recommendation of maintenance
   4.5. Control flow
5. Exemplary hardware configuration
6. Summary

1. Configuration

1.1. Overview of Autonomous Mobile Object 10

First of all, an overview of an autonomous mobile object 10 according to an embodiment of the disclosure will be described. The autonomous mobile object 10 according to the embodiment of the disclosure is an information processing apparatus that executes circumstances estimation based on collected sensor information and autonomously selects and executes various operations corresponding to the circumstances. Unlike a robot that simply performs an operation according to an instruction command from a user, the autonomous mobile object 10 has a characteristic in autonomously executing an operation that is estimated as an optimum one according to each set of circumstances.

For this reason, the autonomous mobile object 10 according to the embodiment of the disclosure sometimes purposely does not execute an operation corresponding to an instruction from the user or executes another behavior different from the operation. For example, the case where an operation corresponding to an instruction from the user is performed, the case where the safety of the user and the autonomous mobile object 10 or of the surrounding environment is impaired, and the case where the autonomous mobile object 10, for example, prioritizes other needs (instinct), such as power charging, apply to the above-described circumstances.

The autonomous mobile object 10 sometimes purposely does not follow an instruction from the user to try to cause an interest of the user or try to transmit the feeling of the autonomous mobile object 10 and the condition of hardware to the user.

On the other hand, the autonomous mobile object 10 has strong needs (instinct) for being loved by the user. The autonomous mobile object 10 repeatedly executes an operation corresponding to an instruction from the user in order to please the user and learns an operation that the user likes and autonomously executes the operation even without instruction.

As described above, as animals including humans do, the autonomous mobile object 10 according to the embodiment of the disclosure comprehensively determines needs and feelings and the surrounding environment and determines and executes autonomous operations. As for the aspect described above, the autonomous mobile object 10 is definitely different from a passive apparatus that executes a corresponding operation or process based on an instruction.

The autonomous mobile object 10 according to the embodiment of the disclosure may be an autonomous mobile robot that autonomously moves in a space and executes various operations. The autonomous mobile object 10 may be, for example, an autonomous mobile robot with a shape imitating an animal, such as a human or a dog, and operational ability. The autonomous mobile object 10 may be, for example, a vehicle with an ability to communicate with users or may be another apparatus. The shape, ability and level of needs, etc., of the autonomous mobile object 10 of the disclosure can be designed as appropriate according to the purpose and role.

1.2. Exemplary Hardware Configuration of Autonomous Mobile Object 10

An exemplary hardware configuration of the autonomous mobile object 10 according to the embodiment of the disclosure will be described. The case where the autonomous mobile object 10 is a dog-type quadruped robot will be described as an example below.

FIG. 1 is a diagram illustrating an exemplary hardware configuration of the autonomous mobile object 10 according to the embodiment of the disclosure. As illustrated in FIG. 1, the autonomous mobile object 10 is a dog-type quadruped robot including a head part, a torso part, four leg parts, and a tail part. The autonomous mobile object 10 includes two displays 510 in the head part.

The autonomous mobile object 10 includes various sensors. The autonomous mobile object 10, for example, includes microphones 515, cameras 520, a ToF (Time of Flight) sensor 525, a human detection sensor 530, range sensors 535, touch sensors 540, an illuminance sensor 545, sole buttons 550, and inertia sensors 555.

Microphone 515

The microphone 515 has a function of collecting surrounding sounds. The sounds include utterance of the user and surrounding environmental sounds. The autonomous mobile object 10 may, for example, include four microphones on the head part. Including the microphones 515 makes it possible to sensitively collect sounds occurring around and realize localization of a sound source.

Camera 520

The camera 520 has a function of capturing an image of the user and the surrounding environment. The autonomous mobile object 10 may include two wide-angle cameras at the tip of nose and the waist. In this case, the wide-angle camera that is arranged at the tip of nose captures images corresponding to the front field of view of the autonomous mobile object (that is, the field of view of dog) and the wide-angle camera at the waist captures images of the surrounding area mainly of the upper area. The autonomous mobile object 10, for example, is able to extract a feature of the ceiling based on images captured by the wide-angle camera that is arranged at the waist and realize SLAM (Simultaneous Localization and Mapping).

ToF Sensor 525

The ToF sensor 525 has a function of detecting a distance to an object that is present in front of the head part. The ToF sensor 525 is included at the tip of nose of the head part. The ToF sensor 525 enables accurate detection of distances to various objects and thus enables realization of an operation corresponding to the relative positions with respect to objects including the user and obstacles.

Human Detection Sensor 530

The human detection sensor 530 has a function of sensing presence of a user or a pet that the user rears. The human detection sensor 530 is arranged on, for example, the chest. The human detection sensor 530 senses an animal object that is present ahead and thus enables realization of operations corresponding to feelings, such as interest, fear, and surprise, to the animal object.

Range Sensor 535

The range sensor 535 has a function of acquiring the circumstances of the floor surface in front of the autonomous mobile object 10. The range sensor 535 is, for example, arranged on the chest. The range sensor 535 enables accurate detection of a distance to an object that is present on the floor surface in front of the autonomous mobile object 10 and thus enables realization of an operation corresponding to a relative position with respect to the object.

Touch Sensor 540

The touch sensor 540 has a function of sensing contact by the user. The touch sensor 540 is, for example, arranged in a part, such as the top of head, the bottom of chin, or the back where the user highly likely touches the autonomous mobile object 10. The touch sensor 540 may be, for example, a capacitive or pressure-sensitive touch sensor. The touch sensor 540 enables sensing an act of contact by the user, such as touching, petting, hitting or pushing, and thus enables an operation corresponding to the act of contact.

Illuminance Sensor 545

The illuminance sensor 545 detects an illuminance of a space in which the autonomous mobile object 10 positions. The illuminance sensor 515, for example, may be arranged at the base of the tail part behind the head part. The illuminance sensor 545 enables detection of surrounding brightness and thus enables execution of an operation corresponding to the brightness.

Sole Button 550

The sole button 550 has a function of sensing whether the bottom of a leg part of the autonomous mobile object 10 contacts the floor. The sole buttons 550 are thus arranged respectively on parts corresponding to the paw pads of the four leg parts. The sole button 550 makes it possible to sense contact or non-contact between the autonomous mobile object 10 and the floor surface and thus, for example, know that the autonomous mobile object 10 is lifted in the arms of the user.

Inertia Sensor 555

The inertia sensor 555 is a six-axis sensor that detects physical quantities, such as a speed, an acceleration and a rotation, or the head part and the torso part. In other words, the inertia sensor 555 detects accelerations and angular speeds of an X-axis, a Y-axis and a Z-axis. The inertia sensors 555 are arranged respectively at the head part and the torso part. The inertia sensor 555 enables accurate detection of movements of the head and torso part of the autonomous mobile object 10 and thus enables realization of operational control corresponding to the circumstances.

Exemplary sensors of the autonomous mobile object 10 according to the embodiment of the disclosure have been described. The above-described configuration given above using FIG. 1 is an example only and the configurations of sensors the autonomous mobile object 10 can include are not limited thereto. The autonomous mobile object 10 may further include, in addition to the above-described configuration configuration, various communication devices including a temperature sensor, a geomagnetic sensor, and a GNSS (Global Navigation Satellite System) signal receiver. The configurations of sensors of the autonomous mobile object 10 may be flexibly varied according to the specification and operation.

Figure 2:
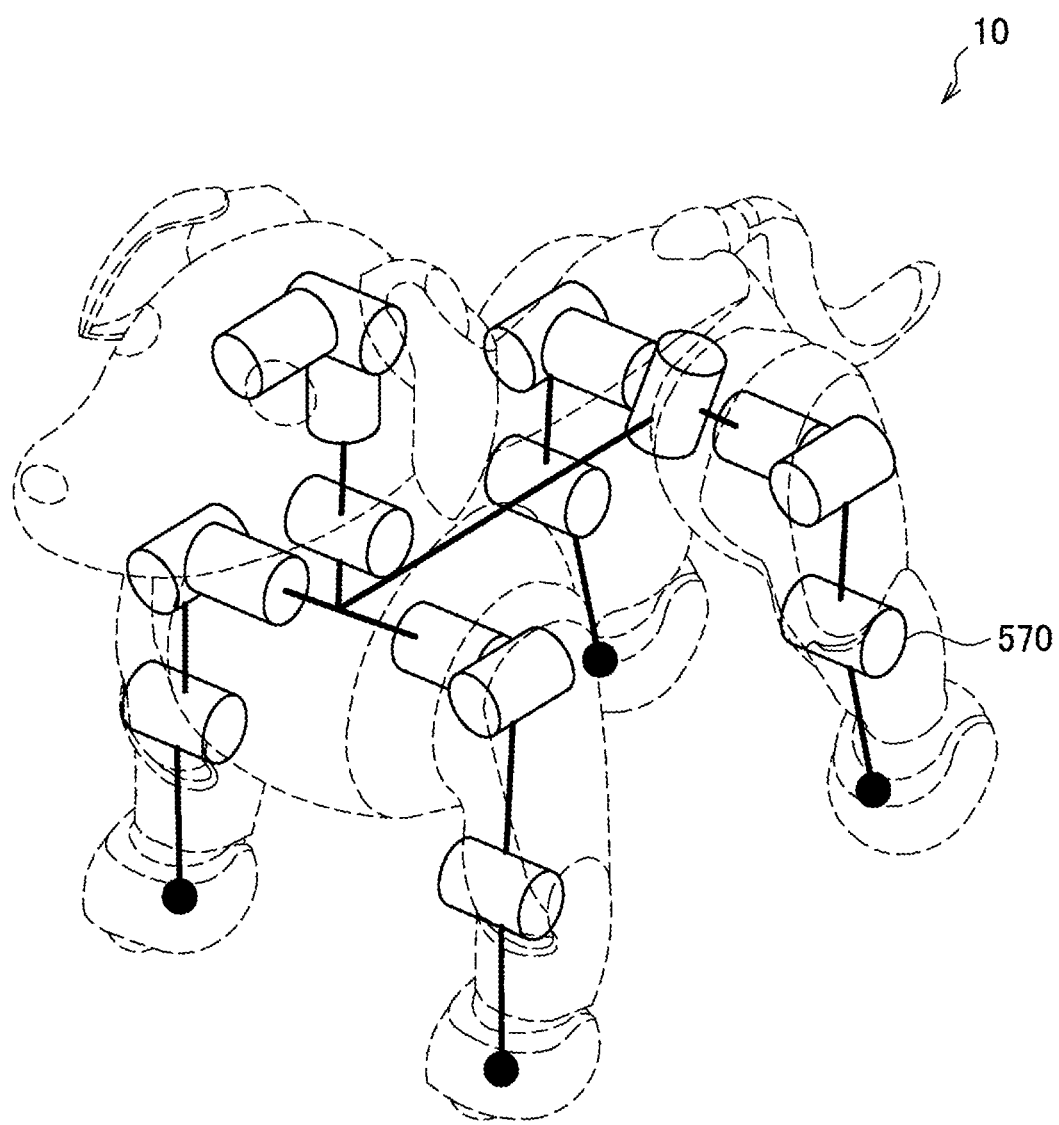
FIG. 2 is an exemplary configuration of an actuator that the autonomous mobile object includes according to the embodiment of the disclosure.

An exemplary configuration of joint parts of the autonomous mobile object 10 according to the embodiment of the disclosure will be described. FIG. 2 is an exemplary configuration of actuators 570 that the autonomous mobile object 10 includes according to the embodiment of the disclosure. The autonomous mobile object 10 according to the embodiment of the disclosure has 22 degrees of freedom of rotation in total including, in addition to degrees of freedom of rotation in rotating parts illustrated in FIG. 2, two degrees of freedom of rotation in each of the pair of ears and the tail part, and one degree of freedom of rotation in the mouth.

For example, the autonomous mobile object 10 has three degrees of freedom in the head part and thus enables both operations of nodding and tilting the head. The autonomous mobile object 10 enables realization of natural and flexible operations more close to those of a real dog by reproducing swing operations of the waist.

The autonomous mobile object 10 according to the embodiment of the disclosure may realize the aforementioned 22 degrees of freedom of rotation by combining a single-axis actuator and a two-axis actuator. For example, single-axis actuators may be used for the elbows and knees of the leg parts and two-axis actuators may be used for the shoulders and the tails of thighs, respectively.

Figure 3:
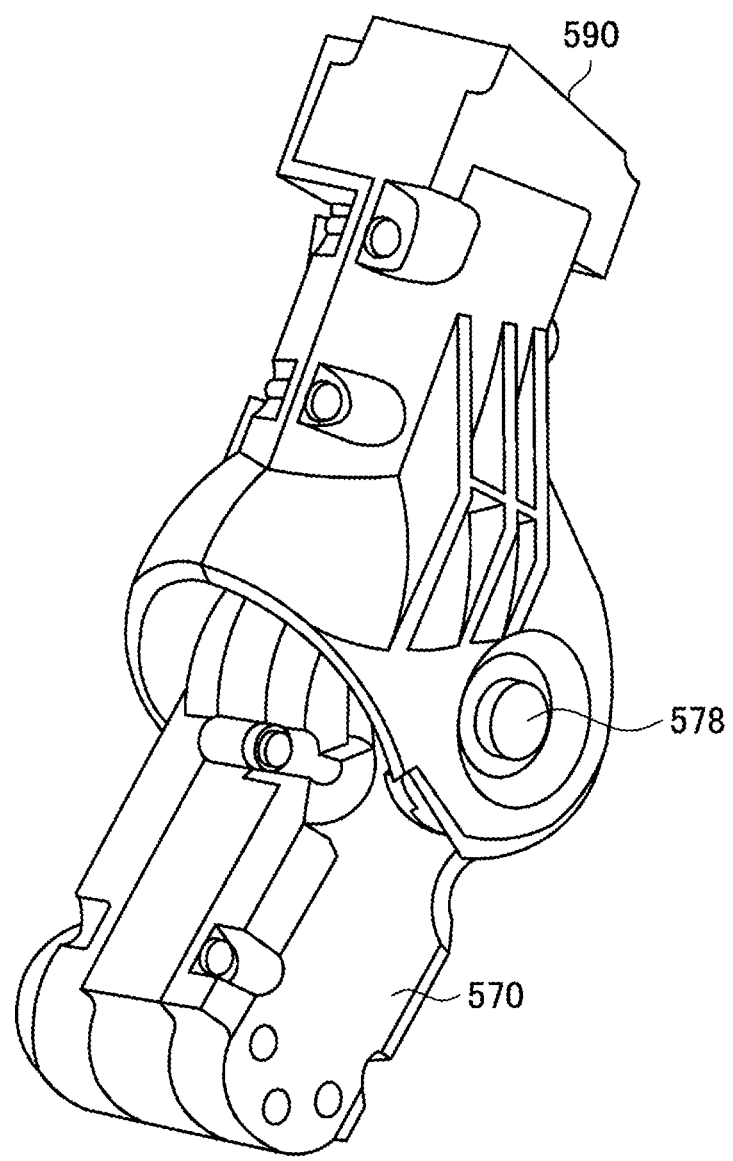
FIG. 3 is a diagram for describing an operation of the actuator of the autonomous mobile object according to the embodiment of the disclosure.
Figure 4:
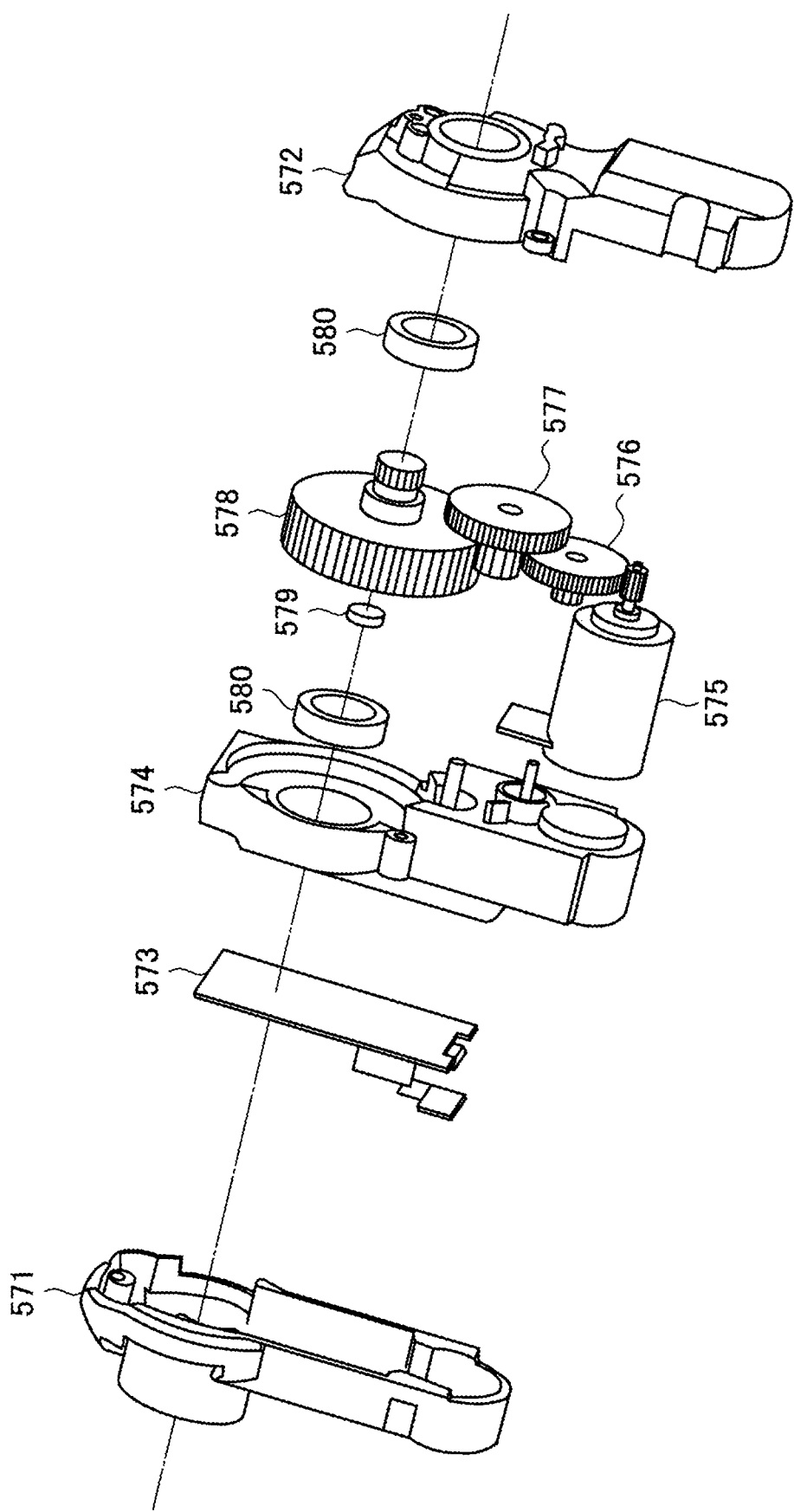
FIG. 4 is a diagram for describing the operation of the actuator of the autonomous mobile object according to the embodiment of the disclosure.

FIGS. 3 and 4 are diagrams for describing operations of the actuator 570 of the autonomous mobile object 10 according to the embodiment of the disclosure. Referring to FIG. 3, by rotating an output gear using a motor 575, the actuator 570 enables a movable arm 590 to be driven at a given rotational position and a rotational speed.

Referring to FIG. 4, the actuator 570 according to the embodiment of the disclosure includes a rear cover 571, a gear box cover 572, a control board 573, a gear box base 574, the motor 575, a first gear 576, a second gear 577, an output gear 578, a detection magnet 579, and two bearings 580.

The actuator 570 according to the embodiment of the disclosure may be, for example, a magnetic svGMR (spin-valve Giant Magnetoresistive). The control board 573 causes the motor 575 to rotate according to the control by a main processor, so that power is transmitted to the output gear 578 via the first gear 576 and the second gear 577 and accordingly the movable arm 590 can be driven.

The position sensor that the control board 573 includes detects an angle of rotation of the detection magnet 579 that rotates in synchronization with the output gear 578, thereby enabling accurate detection of an angle of rotation of the movable arm 590, that is, a rotational position.

The magnetic svGMR employs a non-contact system and thus has excellent durability and the magnetic svGMR is used in a GMR saturated area and thus has an advantage in that effects of signal variations resulting from variations in distance between the detection magnet 579 and the position sensor are small.

The exemplary configuration of the actuator 570 of the autonomous mobile object 10 according to the embodiment of the disclosure has been described. The above-described configuration enables accurate control on bending and stretching operations of the joint parts that the autonomous mobile object 10 has and thus enables accurate detection of the rotational positions of the joint parts.

Referring to FIG. 5, the function of the display 510 that the autonomous mobile object 10 according to the embodiment of the disclosure includes will be described. FIG. 5 is a diagram for describing the function of the display 510 of the autonomous mobile object 10 according to the embodiment of the disclosure.

Display 510

The display 510 has a function of visually expressing motions of eyes and feelings of the autonomous mobile object 10. As illustrated in FIG. 5, the displays 510 are enables expression of motion of eyeballs, pupils, and eyelids corresponding to feelings and operations. The displays 510 purposely do not display texts and symbols and images not relating to eyeball movements, thereby producing natural operations close to those of an existing animal, such as a dog.

As illustrated in FIG. 5, the autonomous mobile object 10 includes two displays 510r and 510l corresponding respectively to the right eye and the left eye. The displays 510r and 510l are, for example, implemented using independent two OLEDs (Organic Light Emitting Diodes). The OLEDs enable reproduction of curved surfaces of the eyeballs and enable more natural appearance compared to the case where a pair of eyeballs is expressed using a single planar display or the case where the two eyeballs are expressed respectively using two independent planar displays.

As described above, the displays 510r and 510l enable accurate and flexible expression of gaze and feelings of the autonomous mobile object 10. The user is able to instinctively know the condition of the autonomous mobile object 10 from operations of eyeballs that are displayed on the displays 510.

The exemplary hardware configuration of the autonomous mobile object 10 according to the embodiment of the disclosure has been described. The above-described configuration enables realization of operations and expression of feelings more close to those of an existing living thing by accurately and flexibly controlling operations of joint parts and eyeballs of the autonomous mobile object 10 as illustrated in FIG. 6. FIG. 6 is a diagram illustrating exemplary operations of the autonomous mobile object 10 according to the embodiment of the disclosure, and FIG. 6 illustrates the external structure of the autonomous mobile object 10 in a simplified manner in order to give description focusing on operations of the joint parts and eyeballs of the autonomous mobile object 10. Similarly, in the following description, the external structure of the autonomous mobile object 10 is sometimes illustrated in a simplified manner; however, the hardware configuration and the appearance of the autonomous mobile object 10 according to the embodiment of the disclosure is not limited the example illustrated in the drawings and they may be designed appropriately.

1.3. Exemplary System Configuration

Figure 7:
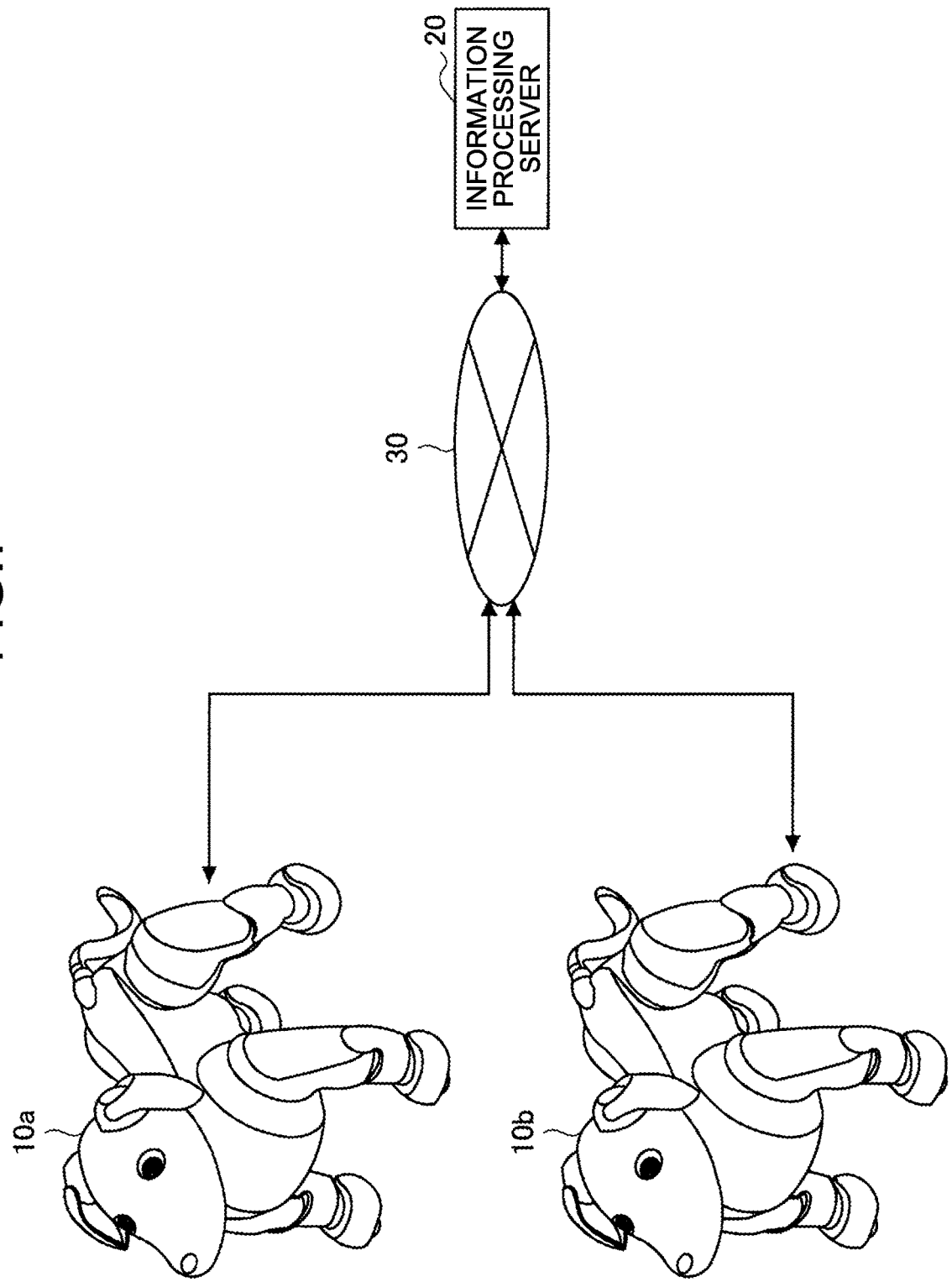
FIG. 7 is a diagram illustrating an exemplary system configuration according to the embodiment of the disclosure.

An exemplary system configuration according to an embodiment of the disclosure will be described. FIG. 7 is a diagram illustrating an exemplary system configuration according to the embodiment of the disclosure. Referring to FIG. 7, the information processing system according to the embodiment of the disclosure includes a plurality of autonomous mobile objects 10 and an information processing server 20. The autonomous mobile objects 10 and the information processing server 20 are connected to each other and the autonomous mobile objects 10 are connected to each other such that they are able to communicate with each other via a network 30.

Autonomous Mobile Object 10

The autonomous mobile object 10 according to the embodiment of the disclosure is an information processing apparatus that executes circumstances estimation based on the collected sensor information and autonomously selects and executes various operations corresponding to the circumstances. As described above, the autonomous mobile object 10 according to the embodiment of the disclosure may be, for example, an autonomous mobile robot that has a shape imitating an animal, such as a human or a dog, and operational ability.

Information Processing Server 20

The information processing server 20 according to the embodiment of the disclosure is an information processing apparatus that is connected to the autonomous mobile objects 10 and that has a function of collecting various types of information from the autonomous mobile objects 10. The information processing server 20 is, for example, capable of performing analysis relating to the condition of hardware of the autonomous mobile object 10 and the degree of love of the user for the autonomous mobile object 10 from the sensor information that is collected by the autonomous mobile objects 10.

The information processing server 20 has a function of, based on the circumstances that are estimated by the autonomous mobile object 10, representing a recommended behavior that the autonomous mobile object 10 should take in the circumstances. The information processing server 20 may transmit control sequence data for casing the autonomous mobile object 10 to implement the recommended behavior to the autonomous mobile object 10. The above-described function of the information processing server 20 will be described in detail separately.

Network 30

The network 30 has a function of connecting the autonomous mobile objects 10 and the information processing server 20 to each other and connecting the autonomous mobile objects 10 to each other. The network 30 may include a public network, such as the Internet, a telephone network or a satellite communication network, and various types of LAN (Local Area Network) and WAN (Wide Area Network) including Ethernet (trademark). The network 30 may include a dedicated network, such as IP-VPN (Internet Protocol-Virtual Private Network). The network 30 may include a radio communication network, such as Wi-Fi (trademark) or Bluetooth (Trademark).

The exemplary system configuration of the embodiment of the disclosure has been described. The above-described configuration described using FIG. 7 is an example only, and the configuration of the information processing system according to the embodiment of the disclosure is not limited to the example. For example, the autonomous mobile object 10 may further communicate information with various external devices in addition to the information processing server 20. The aforementioned external devices may, for example, include a server that transmits the weather and news and other service information, various information processing terminal devices that the user owns, and home electric appliances. The system configuration according to the embodiment of the disclosure can be flexibly modified according to the specification and operation.

1.4. Exemplary Functional Configuration of Autonomous Mobile Object 10

Figure 8:
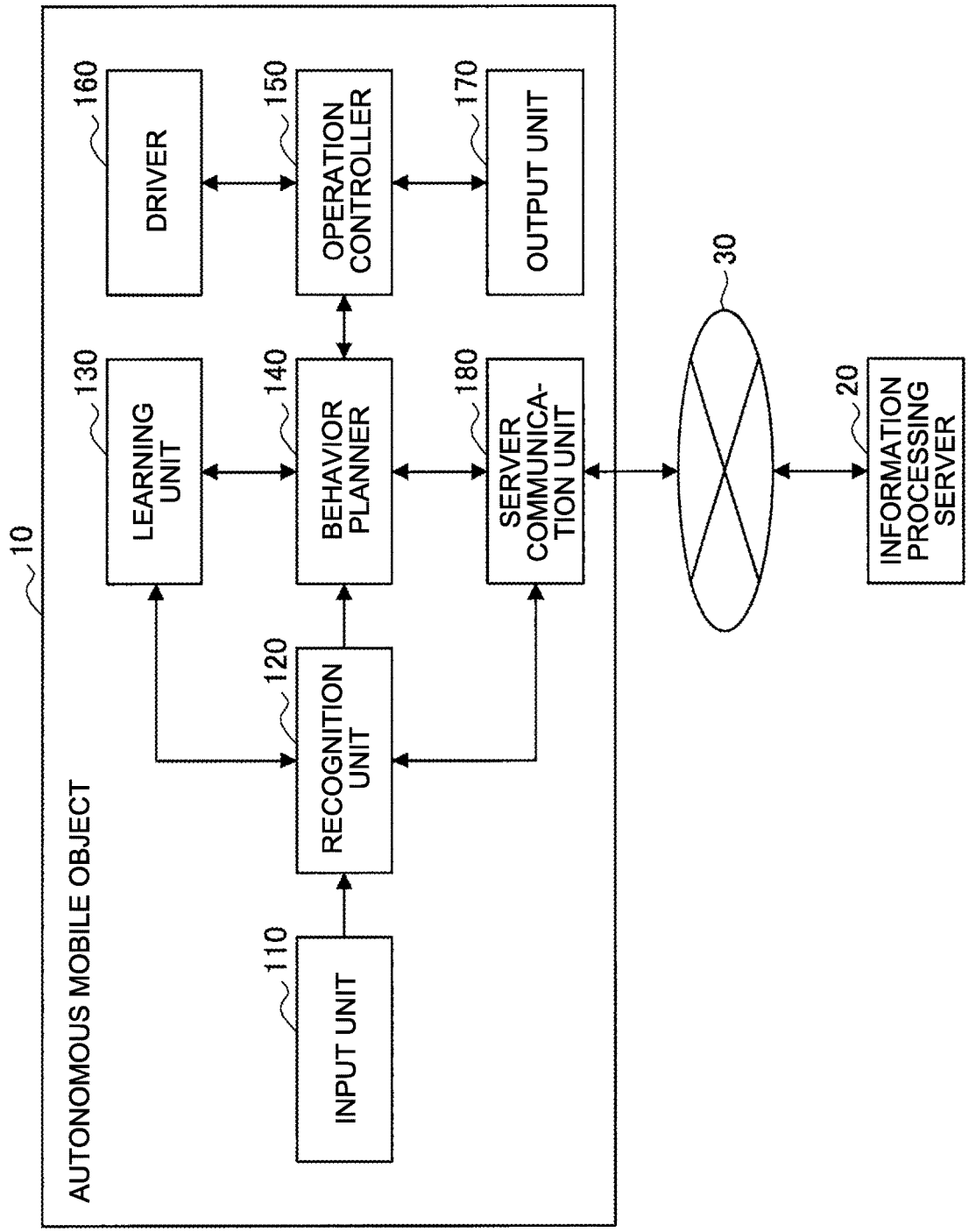
FIG. 8 is a diagram illustrating an exemplary functional configuration of the autonomous mobile object according to the embodiment of the disclosure.

A functional exemplary configuration of the autonomous mobile object 10 according to the embodiment of the disclosure will be described. FIG. 8 is a diagram illustrating an exemplary functional configuration of the autonomous mobile object 10 according to the embodiment of the disclosure. Referring to FIG. 8, the autonomous mobile object 10 according to the embodiment of the disclosure includes an input unit 110, a recognition unit 120, a learning unit 130, a behavior planner 140, an operation controller 150, a driver 160, an output unit 170, and a server communication unit 180.

Input Unit 110

The input unit 110 has a function of collecting various types of information relating to the user and surrounding environment. The input unit 110, for example, collects voices of the user, environmental sound occurring around, image information relating to the user and the surrounding environment, and various types of sensor information. For this reason, the input unit 110 includes each type of sensor illustrated in FIG. 1.

Recognition Unit 120

The recognition unit 120 has a function of, based on various types of information collected by the input unit 110, performing various types of recognition relating to the user, the surrounding environment, and the condition of the autonomous mobile object 10. In an example, the recognition unit 120 may identify a person, recognize the expression and gaze, recognize an object, recognize color, recognize a shape, recognize a marker, recognize an obstacle, recognize a step, or recognize brightness.

The recognition unit 120 recognizes feelings relating to the voice of the user, understands words, and localizes a sound source. The recognition unit 120 is capable of recognizing contact by the user, the surrounding temperature, presence of an animal object, the posture of the autonomous mobile object 10, etc.

The recognition unit 120 has a function of, based on the aforementioned information that is recognized, estimating the surrounding environment and circumstances in which the autonomous mobile object 10 is. The recognition unit 120 may comprehensively estimate the circumstances using environmental knowledge that is stored in advance.

Learning Unit 130

The learning unit 130 has a function of learning the environment (circumstances), behavior and the effect of the behavior on the environment. The learning unit 130 realizes the aforementioned learning using a machine learning algorithm, such as deep learning. The learning algorithm that is employed by the learning unit 130 is not limited to the example described above, and the learning algorithm may be designed appropriately.

Behavior Planner 140

The behavior planner 140 has a function of planning a behavior to be taken by the autonomous mobile object 10 based on the circumstances that are estimated by the recognition unit 120 and the knowledge that is learned by the learning unit 130. Details of the function of the behavior planner 140 according to the embodiment of the disclosure will be described separately.

Operation Controller 150

The operation controller 150 has a function of controlling operations of the driver 160 and the output unit 170 based on the behavior plan made by the behavior planner 140. For example, based on the aforementioned behavior plan, the operation controller 150 performs control on rotation of the actuators 570, control on display by the displays 510, and control on audio output a speaker. Details of function of the operation controller 150 according to the embodiment of the disclosure will be described in detail separately.

Driver 160

The driver 160 has a function of bending and stretching a plurality of joint parts of the autonomous mobile object 10 according to control by the operation controller 150. More specifically, according to the control by the operation controller 150, the driver 160 drives the actuator 570 that each joint part has.

Output Unit 170

The output unit 170 has a function of, according to control performed by the operation controller 150, outputting visual information and audio information. Thus, the output unit 170 includes the displays 510 and a speaker.

Server Communication Unit 180

The server communication unit 180 has a function of communicating information with the information processing server 20 or another autonomous mobile object 10. For example, the server communication unit 180 transmits information on the circumstances that are recognized by the recognition unit 120, etc., to the information processing server 20. For example, the server communication unit 180 receives control sequence data relating to the recommended behavior and the recommended behavior from the information processing server 20.

The functional configuration of the autonomous mobile object 10 according to the embodiment of the disclosure has been described above. Note that the configuration described above using FIG. 8 is an example only and the functional configuration of the autonomous mobile object 10 according to the embodiment of the disclosure is not limited to the example. The functional configuration of the autonomous mobile object 10 according to the embodiment of the disclosure can be flexibly modified according to the specification and operation.

1.5. Exemplary Functional Configuration of Information Processing Server 20

Figure 9:
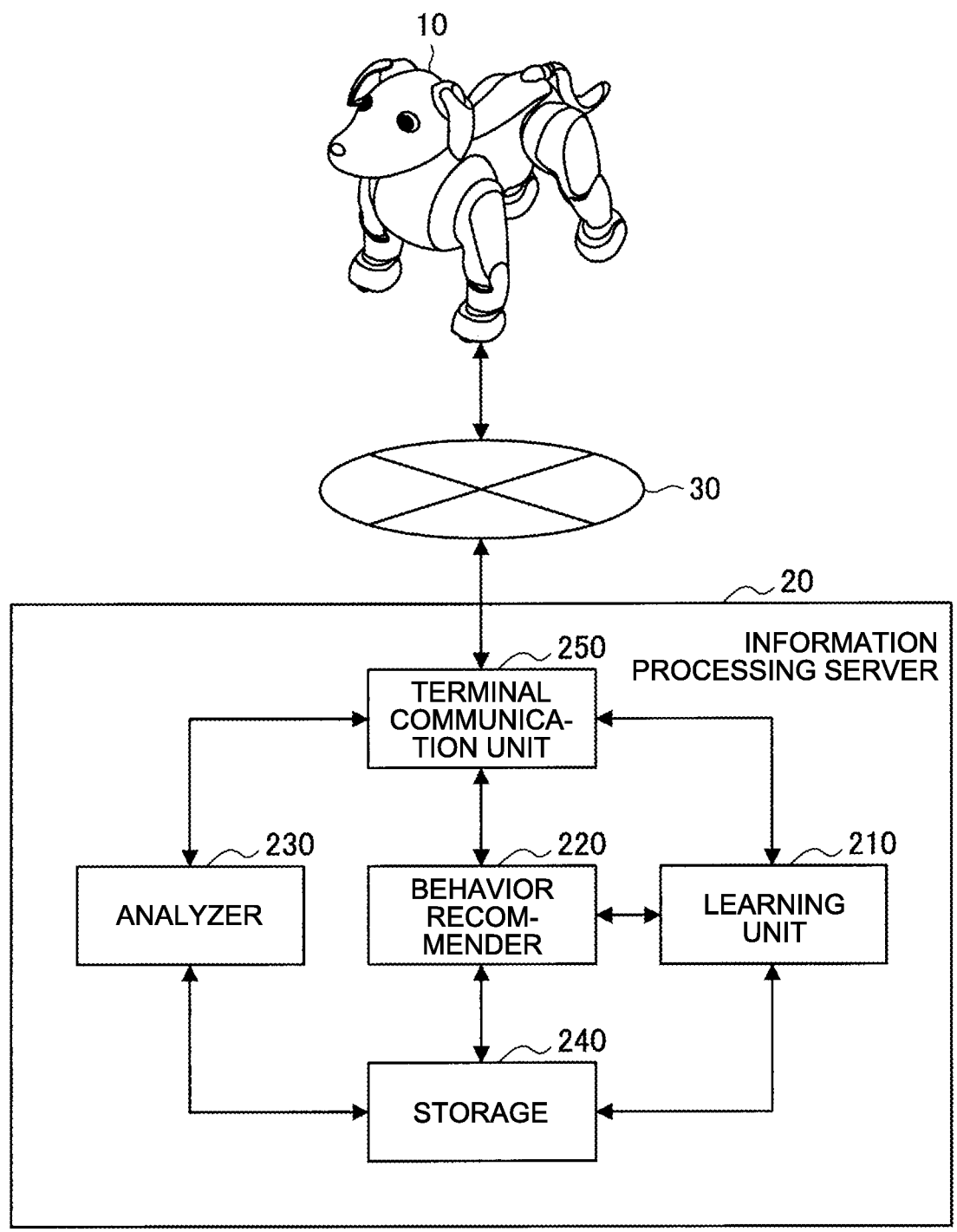
FIG. 9 a diagram illustrating an exemplary functional configuration of an information processing server according to the embodiment of the disclosure.

An exemplary functional configuration of the information processing server 20 according to the embodiment of the disclosure will be described. FIG. 9 is a diagram illustrating the exemplary functional configuration of the information processing server 20 according to the embodiment of the disclosure. Referring to FIG. 9, the information processing server 20 exemplary functional configuration of the information processing server 20 according to the embodiment of the disclosure includes a learning unit 210, a behavior recommender 220, an analyzer 230, a storage 240, and a terminal device communication unit 250.

Learning Unit 210

The learning unit 130 has a function of learning the environment (circumstances), a behavior, and the effect of the behavior on the environment. The learning unit 210 is characterized in performing learning based on a log of behaviors collected from the autonomous mobile objects 10. In other words, the learning unit 210 can be referred to as collective intelligence that is common among the autonomous mobile objects 10.

Behavior Recommender 220

The behavior recommender 220 has a function of determining a recommended behavior that is recommended to the autonomous mobile object 10 based on information on the circumstances estimation that is received from the autonomous mobile object 10 and the knowledge that the learning unit 210 has and that serves as the collective intelligence. The behavior recommender 220 has a characteristic in transmitting, together with the recommended command, the control sequence data for causing the autonomous mobile object 10 to implement the recommended behavior to the autonomous mobile object via the terminal device communication unit 250.

The aforementioned sequence data is information containing a control signal relating to changes in rotational position of the joint parts of the autonomous mobile object 10 over time, eyeball expression, and audio output. In other words, the control sequence data is also referred to as setting data for causing the autonomous mobile object 10 to implement a given operation (action).

The above-described function that the behavior recommender 220 according to the embodiment of the disclosure has makes it possible to add new actions executable by the autonomous mobile object 10 as necessary and thus keep engaging the interest of the user in the autonomous mobile object 10.

Analyzer 230

The analyzer 230 has a function of analyzing various types of analysis based on information received from the autonomous mobile object 10. The analyzer 230 is capable of analyzing the condition of the actuator 570 based on the behavior log and the operational circumstances that are received from the autonomous mobile object 10. The analyzer 230 is capable or analyzing the interest (love) of the user in (for) the autonomous mobile object 10 based on the information on contact by or response of the user that is received from the autonomous mobile object 10.

Storage 240

The storage 240 has a function of accumulating information that each component of the information processing server 20 uses. The storage 240, for example, stores the control sequence data that is received from the autonomous mobile object 10 in association with the circumstances and the response of the user. The storage 240 stores information that is used for analysis by the analyzer 230 and the result of analysis.

Terminal Device Communication Unit 250

The terminal device communication unit 250 has a function of communicating information with the autonomous mobile objects 10. The terminal device communication unit 250, for example, receives information on circumstances estimation from the autonomous mobile object 10. The terminal device communication unit 250, for example, transmits information on the recommended behavior that is determined by the behavior recommender 220 and the control sequence data to the autonomous mobile object 10.

The exemplary functional configuration of the information processing server 20 according to the embodiment of the disclosure has been described. Note that the configuration described above using FIG. 9 is an example only and the functional configuration of the information processing server 20 according to the embodiment of the disclosure is not limited to the example. The information processing server 20, for example, may have a function of providing various user interfaces to be described below to the user. The various functions of the information processing server 20 can be distributed to multiple devices and implemented. The functional configuration of the information processing server 20 according to the embodiment of the disclosure can be flexibly modified according to the modification and operation.

2. First Embodiment 2.1. Overview

The first embodiment of the disclosure will be described. As described above, the autonomous mobile object 10 according to the embodiment of the disclosure includes the displays 510 that express operations of the joint parts and eyeballs and thus is able to execute various operations (actions).

On the other hand, in order to execute an action, the autonomous mobile object 10 is required to have control sequence data corresponding to the action. For this reason, when the autonomous mobile object 10 has no mechanism to add new control sequence data, the autonomous mobile object 10 executes only actions that are set on shipping of goods.

In this case, the interest of the user in the actions that are executed repeatedly is lost and this may cause lowering of the love for the autonomous mobile object 10. Depending on the user, a demand for having the autonomous mobile object 10 know and implement unique actions as training a real dog is assumed.

The autonomous mobile object 10 according to the embodiment is inspired by focusing on the above-described aspect and the user is able to easily have the autonomous mobile object 10 know a new action. For this reason, the autonomous mobile object 10 according to the embodiment has a characteristic in, based on a teaching operation, generating control sequence data for implementing an autonomous operation corresponding to the teaching operation. The autonomous mobile object 10 according to the embodiment has a characteristic in executing an autonomous operation corresponding to control sequence data based on a behavior plan that is determined by circumstances estimation.

According to the aforementioned characteristic of the autonomous mobile object 10 according to the embodiment, the user is able to easily have the autonomous mobile object 10 know a new action and therefore an effect that the degree of love of the user is kept high is expected.

2.2. Generation of Control Sequence Data

Generation of control sequence data according to the embodiment will be described in detail. The operation controller 150 of the autonomous mobile object 10 according to the embodiment has a function of, based on a teaching motion, generating control sequence data for implementing an autonomous operation corresponding to the teaching motion.

More specifically, the operation controller 150 according to the embodiment may generate, based on a teaching operation, control sequence data containing at least information on changes in rotational positions of the joint parts over time.

Figure 10:
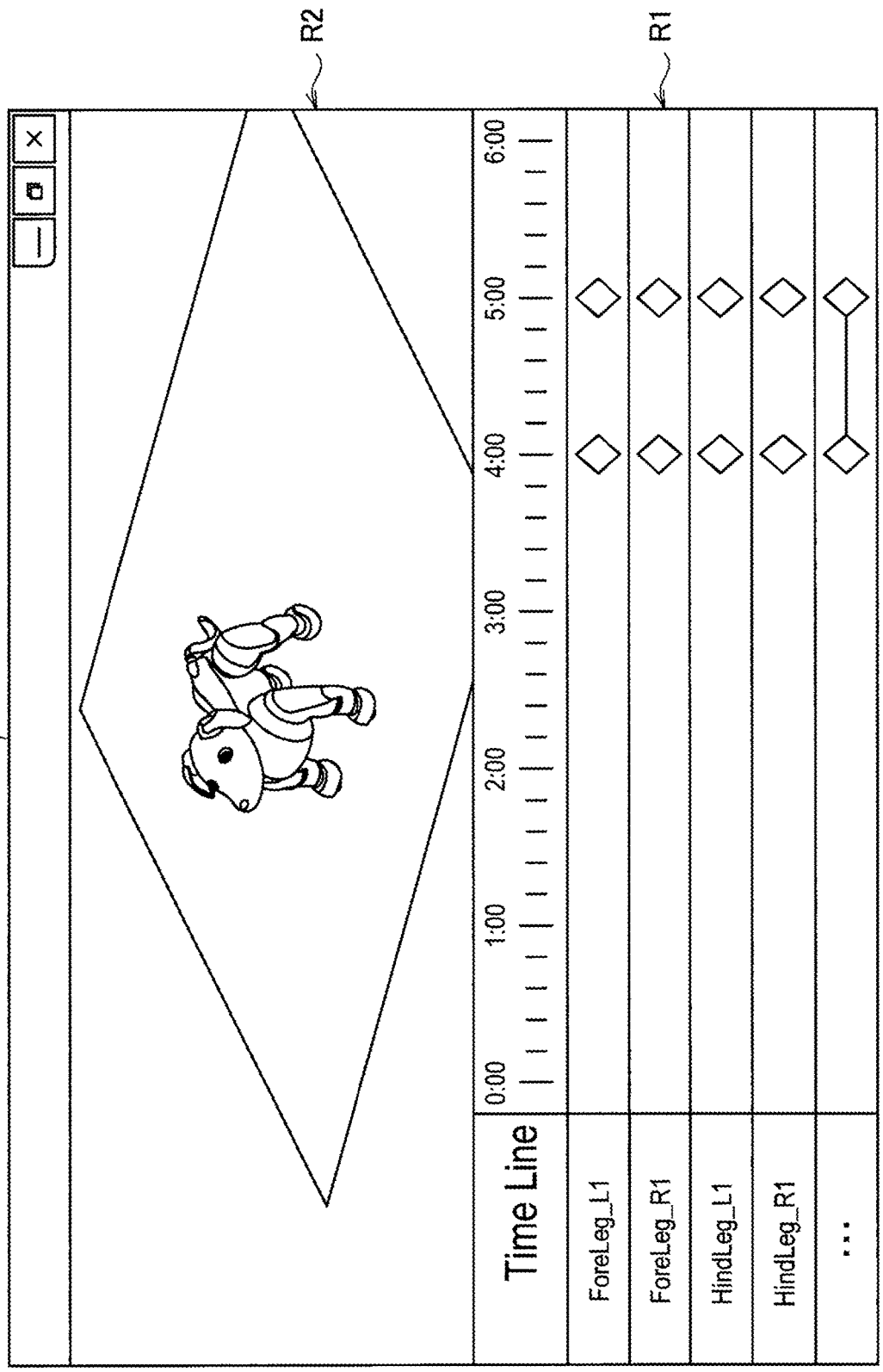
FIG. 10 is a diagram for describing teaching an action using an user interface according to a first embodiment of the disclosure.

For example, using a dedicated user interface, the user is able to teach a new action to the autonomous mobile object 10, that is, have the autonomous mobile object 10 to know the new action. FIG. 10 is a diagram for describing teaching an action using a user interface according to the embodiment.

FIG. 10 illustrates a user interface UI1 for the user to teach a new action to the autonomous mobile object 10. The user, for example, is able to access the user interface UI1 via a computer or a smartphone.

Referring to FIG. 10, the user interface UI1 includes, for example, two areas R1 and R2. The area R1 may be an area for the user to set operations of the joint parts of the autonomous mobile object 10. By specifying changes in rotational position of each joint part (direction, magnitude, and speed of bending and stretching) chronologically in the area R1, the user is able to teach a new action to the autonomous mobile object 10. The user may, for example, specify angles of rotation and rotational speeds of the joint parts using a keyboard or mouse operations.

The area R2 is an area where a preview of the teaching operation that is specified by the user in the area R1 is displayed. For example, in the area R2, an avatar of the autonomous mobile object 10 that reproduces the operations of the joints that are specified by the user in the area R1 may be displayed. In the area R2, in addition to the bird's-eye view illustrated in the drawing, an image reproducing the teaching operation from the front side, upper side, lateral side and rear side of the autonomous mobile object 10 may be displayed.

The user is also able to teach an action by operating the avatar of the autonomous mobile object 10 that is displayed in the area R2 using a mouse or fingers. The operation controller 150 according to the embodiment is capable of, according to the aforementioned user operation executed in the area R2, storing the angle of rotation and the rotational speed of the actuator 570 corresponding to each joint part and reflect the angle of angle of rotation and the rotational speed in setting in the area R1.

Although not illustrated in the drawings, the user is also able to, in the user interface U1, set operations of eyeballs of the autonomous mobile object 10 to be displayed on the displays 510 and a voice that the speaker is caused to output.

As described above, the user interface UI1 according to the embodiment allows a user to finely and accurately teach a new action and thus enables an autonomous mobile object to execute a more accurate operation.

The teaching operation according to the embodiment includes physical bending and stretching operations of joint parts that is implemented by the user. The operation controller 150 according to the embodiment is capable of generating control sequence data according to the above-described physical bending and stretching operations.

Figure 11:
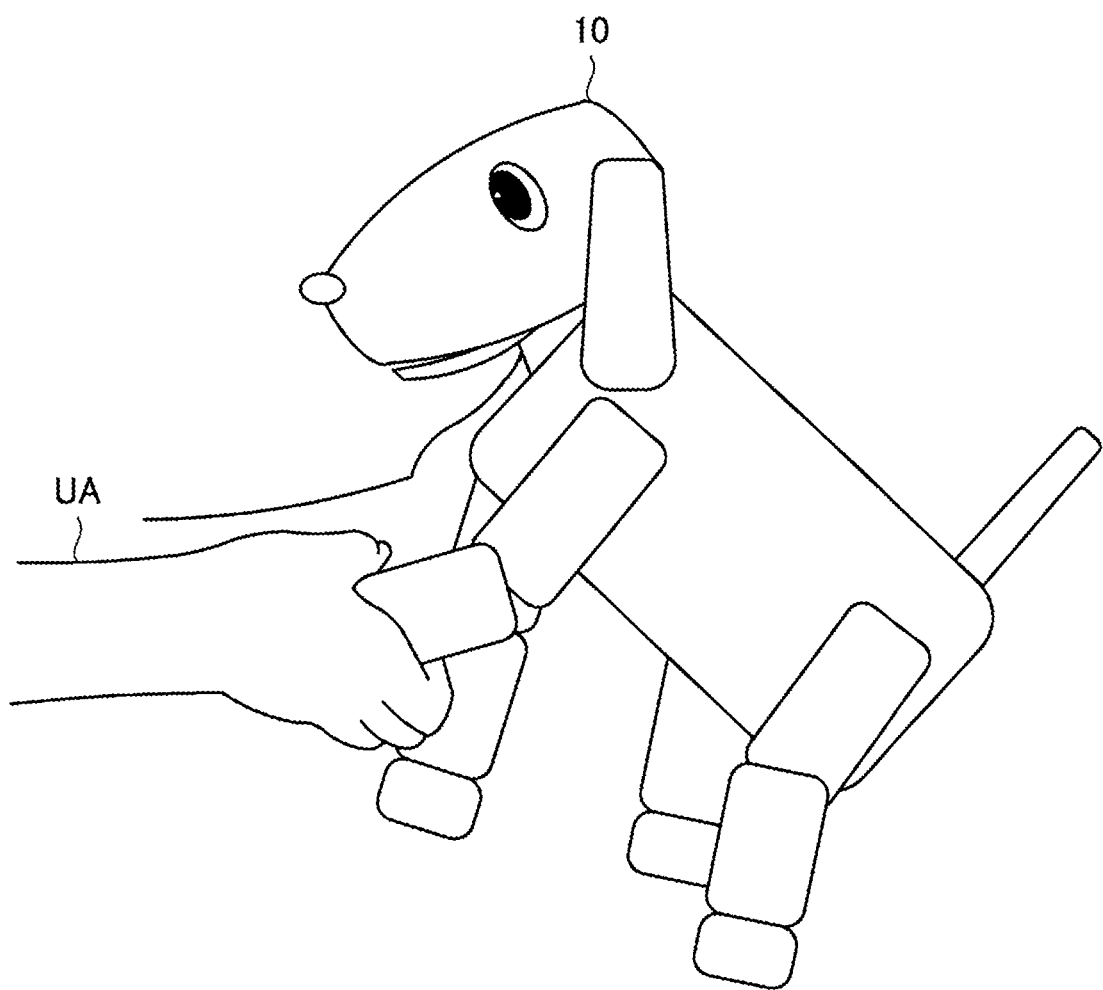
FIG. 11 is a diagram for describing teaching according to physical bending and stretching operations on a joint part according to the first embodiment.

FIG. 11 is a diagram for describing teaching according to physical bending and stretching operations on a joint part according to the embodiment. As illustrated in FIG. 11, the user is able to teach a new action by physically bending and stretching a joint part of the autonomous mobile object 10, for example, with a hand UA.

First of all, by giving an utterance of, for example, "learn this", the user has the autonomous mobile object 10 recognize that a teaching operation is to be performed. When the recognition unit 120 recognizes that bending and stretching operations are to be started, the operation controller 150 causes the driver 160 to execute a relaxing operation on a joint part.

The aforementioned relaxing operation denotes an operation of, in order to realize a teaching operation performed by the user, causing a condition in which the actuator 570 rotates easily with respect to a force applied from outside. The actuator 570 according to the embodiment is configured such that the drag coefficient with respect to a rotational movement is adjustable to any drag coefficient, for example, enabling realization of a condition in which the actuator 570 easily rotates with respect to a force that is applied from outside or a condition in which the actuator 570 is unable to rotate easily. The relaxing operation according to the embodiment allows the user to easily bend and stretch the joint part easily and excludes a possibility of damaging the actuator 570 by forcibly applying a force and a risk that the user is injured.

When the user starts the bending and stretching operations of the joint, the operation controller 150 according to the embodiment stores changes in rotational position chronologically based on the rotational positions of the joint part that are detected by the position sensor of the actuator 570.

As described above, the function of the operation controller 150 according to the embodiment enables even a user who is not familiar with technical knowledge to intuitively teach a new action to the autonomous mobile object 10 by directly moving a joint part.

The teaching operation according to the embedment may cover movements of an animal object having joints. The operation controller 150 according to the embodiment is also capable of generating control sequence data based on movements of an animal object of which images are captured.

FIG. 12 is a diagram for describing teaching relating to movements of an animal object of which images are captured according to the embodiment. FIG. 12 illustrates visual information V1 relating to movement of an animal object P1 that is output by a display device and the autonomous mobile object 10 that recognizes the visual information V1 by sight.

As illustrated in FIG. 12, the operation controller 150 according to the embodiment is capable of, using the movements of the animal object of which images are captured by the input unit 110 as a teaching operation, generating control sequence data corresponding to the teaching operation.

FIG. 12 illustrates the case where the movements of the animal object P1 are displayed by the display device as the visual information V1; however, the movements of the animal object according to the embodiment are not limited to the example. The movements of the animal object according to the embodiment widely cover, for example, real movements made by a user, a pet, or another autonomous mobile object and an animation that is displayed as visual information.

The operation controller 150 according to the embodiment may execute generation of control sequence data based on movements of an animal object regardless whether there is a clear instruction made by the user. In other words, even when the user makes no instruction, using movements of the user or a pet or visual information that are displayed by the display device, the operation controller 150 according to the embodiment is capable of autonomously generating control sequence data relating to a new action.

The above-described function of the operation controller 150 according to the embodiment enables the autonomous mobile object 10 to autonomously copy movements of the user or pet or autonomously learn a dance in trend that is displayed by the display device, which makes it possible to keep the interest of the user in the autonomous mobile object 10 high.

First of all, the operation controller 150 estimates the positions of joints of an animal object of which images are captured and acquires joint parts corresponding to the respective joints using a relative joint map, or the like. Furthermore, the operation controller 150 calculates a magnitude of bending and stretching movements relating to the joints of the animal object, converts the bending and stretching movements of the joints to rotational positions of the corresponding joint parts, and stores the rotational positions.

The operation controller 150 according to the embodiment may appropriately correct operations of joint parts of the animal object according to the ranges of motion of joint parts. For example, the operation controller 150 according to the embodiment is able to dynamically trim part of bending and stretching movements relating to joints of the animal object and record rotational positions of corresponding joint parts. More specifically, when bending and stretching movements relating to the joints of the animal object exceed ranges of motion of the joint parts corresponding to the joints, the operation controller 150 according to the embodiment may dynamically trims part of the bending and stretching movements exceeding the ranges of motion.

FIG. 13 is a diagram for describing trimming based on a range of motion according to the embodiment. FIG. 13 illustrates a bending and stretching movement of the neck of an animal object P3 that is output as visual information V2 and the autonomous mobile object 10 that recognizes visual information V3 by sight.

FIG. 13 illustrates an exemplary case where a bending and stretching movement of the neck made by the animal object P3 exceeds a range of motion ROM of the actuator 570 that is arranged in a neck part of the autonomous mobile object 10. The operation controller 150 according to the embodiment may trim the bending and stretching movement of the animal object P3 that exceeds the range of motion ROM and generate control sequence data such that the rotational position of the joint part is within the range of motion ROM.

The above-described function of the operation controller 150 according to the embodiment enables dynamic generation of control sequence data such that the teaching operation is within the range of motion of a joint part and thus enables the autonomous mobile object 10 to realize a natural operation without stress.

The operation controller 150 according to the embodiment, for example, is also capable of generating control sequence data containing positional information on the autonomous mobile object 10. Specifically, the operation controller 150 according to the embodiment enables execution an action that specifies a position of the autonomous mobile object 10 in a space. The above-described function of the operation controller 150 according to the embodiment, for example, enables the autonomous mobile object to execute an action that specifies a given spot in the house of the user or an action that specifies a physical distance to the user.

The operation controller 150 according to the embodiment enables generation of control sequence data containing relative positional information on multiple autonomous mobile objects 10.

FIG. 14 is a diagram for describing teaching that specifies relative positions relating to multiple autonomous mobile objects 10 according to the embodiment. FIG. 14 represents movements of animal objects P1 and P2 that are output as visual information V3 and autonomous mobile objects 10a and 10b that recognize the visual information V3 by sight.

The movements of the animal objects P1 and P2 illustrated in FIG. 14 may be, for example, a dance that places importance on the relative positions. The operation controller 150 according to the embodiment is, in this case, capable of, based on the relative positions of the recognized animal objects P1 and P2, generate control sequence data in which the relative positions with respect to the other autonomous mobile object 10 are recorded chronologically together with the rotational positions of joint parts. The operation controller 150, for example, communicates information on the self-position that is estimated by the SLAM technique with the other autonomous mobile object 10 and thus is able to execute an action based on the relative positons. The operation controller 150 may, for example, recognize markers that are set by the user on the floor and thus execute an action based on the relative positions.

As described above, the operation controller 150 according to the embodiment makes it possible to easily teach a new act on to the autonomous mobile object 10 through physical operations of and image capturing of joints. According to the above-described function of the operation controller 150 according to the embodiment, an effect of maintaining love of the user for the autonomous mobile object 10 high without making the user to get tired with limited actions.

Figure 15:
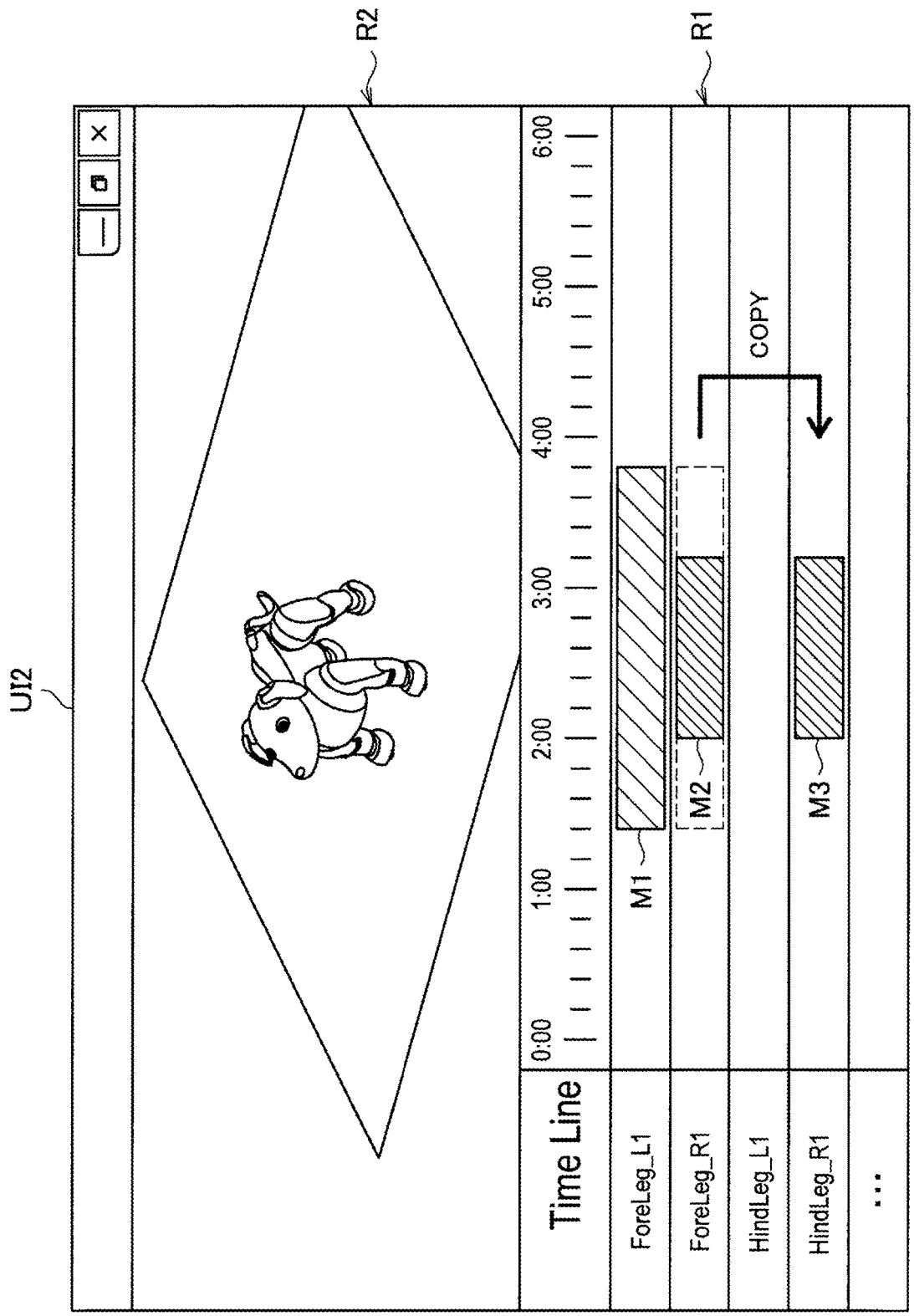
FIG. 15 is a diagram for describing editing control sequence data according to the first embodiment.

The user, for example, is also able to edit a teaching operation via a user interface. FIG. 15 is a diagram for describing editing control sequence data according to the embodiment.

FIG. 15 illustrates a user interface U12 that is used by a user to edit a teaching operation. As illustrated in FIG. 15, the user interface UI2 has the above-described area R1 and R2. Not as in the user interface UI1, information of control sequence data that is taught through physical operations of joint parts and image capturing may be displayed in the area R1 of the user interface UI2 in advance.

Users are able to easily edit a teaching operation by moving, copying, enlarging and reducing motion bars M1 to M3 that specifies motions of respective joint parts with a mouse or fingers. The user interface UI2 according to the embodiment, for example, makes it possible to copy the operation of the right front leg that is taught by a physical operation of a joint part to another leg and finely specify operation timing for each joint and thus makes it possible to perform teaching reflecting an intension of the user.

The operation controller 150 according to the embodiment is capable of saving the generated control sequence data and cause circumstances that cause an autonomous operation corresponding to the control sequence data in association with each other. The cause circumstances refers to circumstances that can cause the autonomous mobile object 10 to execute the autonomous operation corresponding to the teaching operation. The cause circumstances according to the embodiment include various types of circumstances that are recognized by the recognition unit 120 based on the sensor information that is collected by the input unit 110.

Figure 17:
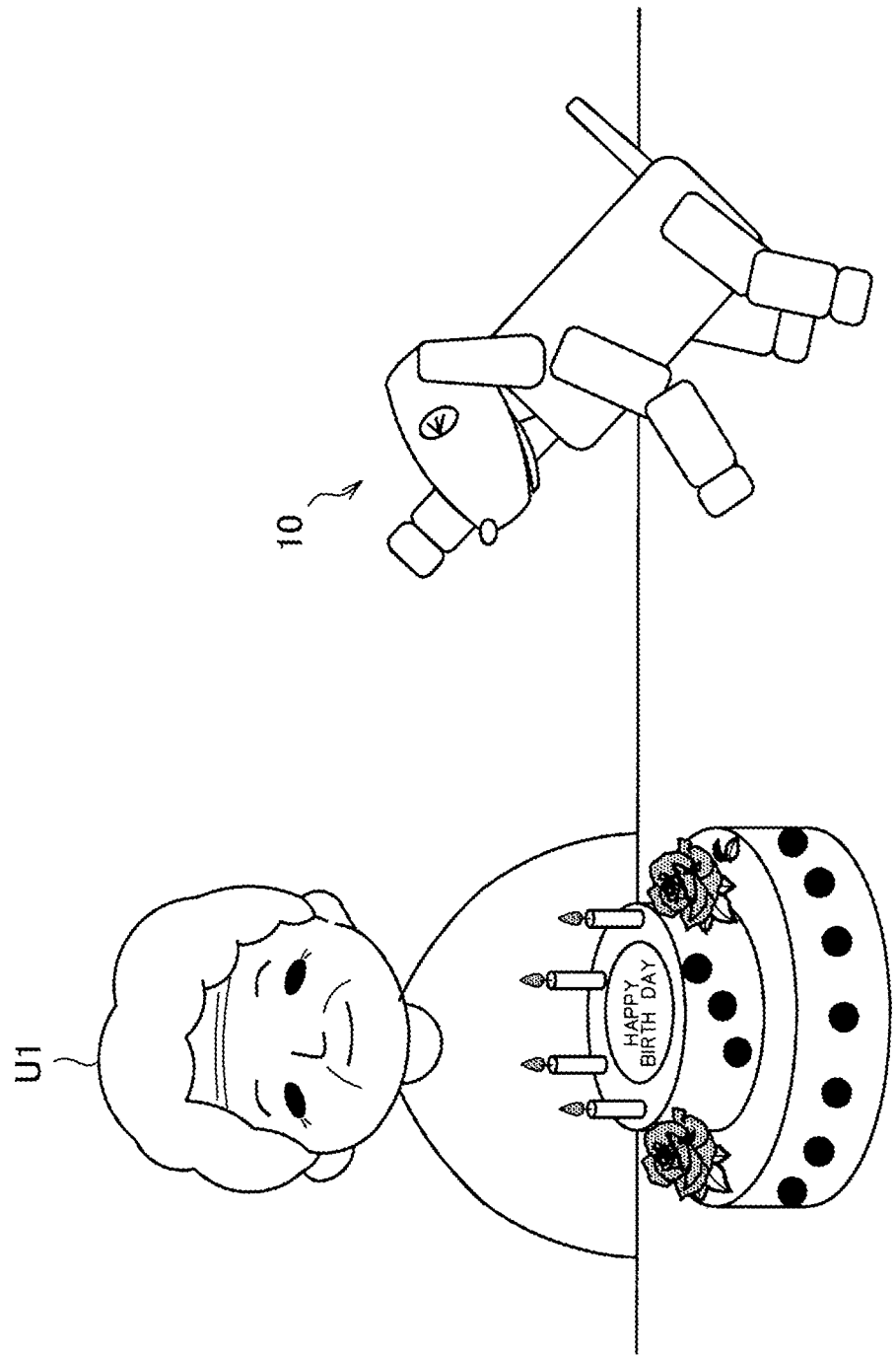
FIG. 17 is a diagram for describing cause circumstances according to the first embodiment.

FIGS. 16 and 17 are diagrams for describing cause circumstances according to the embodiment. FIG. 16 illustrates an example where a music that is output from a display device serves as cause circumstances and the autonomous mobile object 10 executes an autonomous operation corresponding to a teaching operation.

In the example illustrated in FIG. 16, the music played when the teaching operation is performed is autonomously saved as cause circumstances and, on recognizing the same music, the autonomous mobile object 10 performs the autonomous operation corresponding to the teaching operation. In this manner, the autonomous mobile object 10 according to the embodiment is capable of executing the autonomous operation corresponding to the teaching operation based on various types of cause circumstances.

FIG. 17 illustrates an exemplary case where recognition of the user serves as cause circumstances and the autonomous mobile object 10 executes an autonomous operation corresponding to a teaching operation. The cause circumstances according to the embodiment may be specified by the user. The user, for example, is able to set the case where a user U1 is recognized on the birthday of the user U1 as cause circumstances and encourage the autonomous mobile object 10 to execute an autonomous operation corresponding to a teaching operation only once.

As described above, the autonomous mobile object 10 according to the embodiment is able to execute an autonomous operation corresponding to a teaching operation based on cause circumstances that the autonomous mobile object 10 stores or that are specified by the user. The function enables realization of a natural response more close to that of a living thing and an action reflecting an intention of the user.

The autonomous mobile object 10 according to the embodiment is able to transmit the control sequence data, which is generated as described above, to another autonomous mobile object 10. FIG. 18 is a diagram for describing transmission of control sequence data between the autonomous mobile objects 10 according to the embodiment.

FIG. 18 illustrates an example where control sequence data CS that is generated by the autonomous mobile object 10a is transmitted to the autonomous mobile object 10b by radio communication. As described above, the autonomous mobile object 10 according to the embodiment is capable of transmitting the generated control sequence data CS to another autonomous mobile object 10.

The above-described function of the autonomous mobile object 10 according to the embodiment enables realization of insidious spread of an operation between the autonomous mobile objects 10 that the same user owns or between the autonomous mobile objects 10 that different users own, which thus makes it possible to keep the interest of the users high and promote communication between the users.

2.3. Flow of Control

Figure 19:
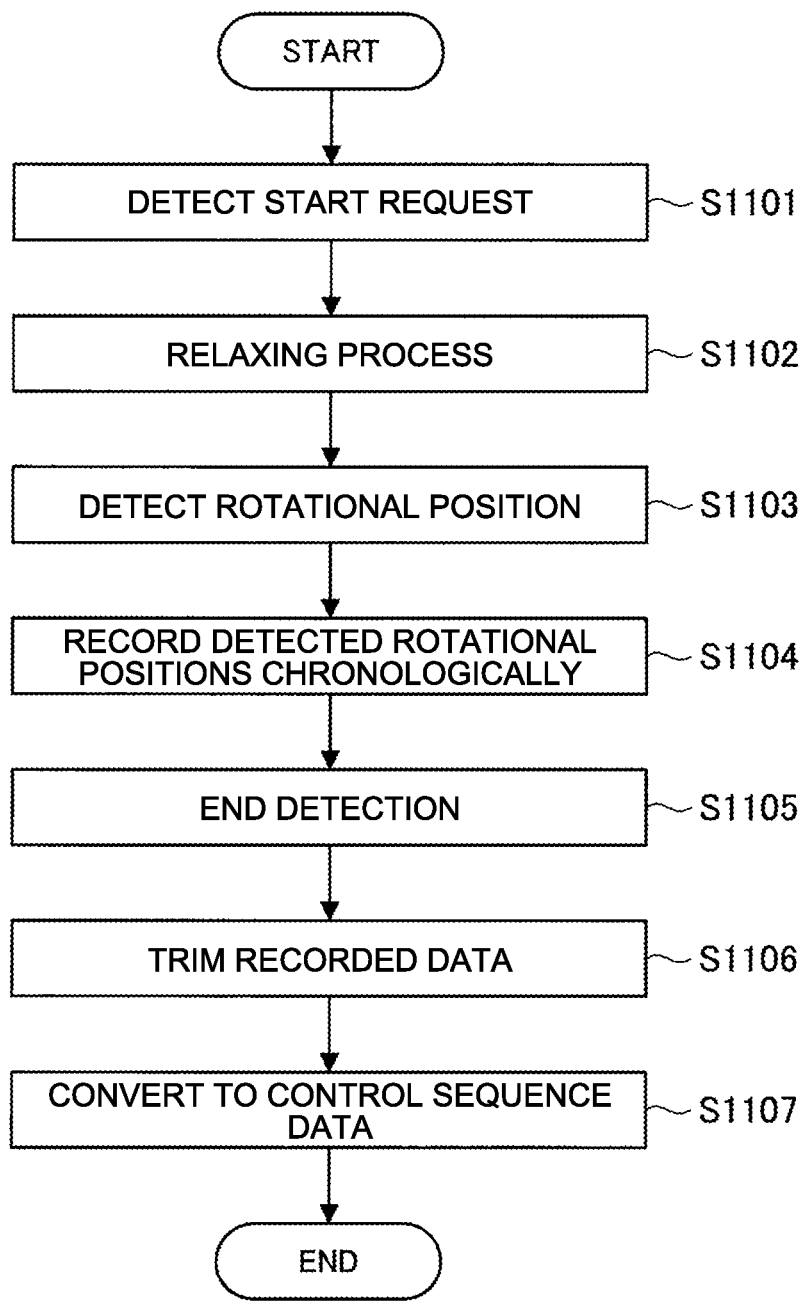
FIG. 19 is a flowchart representing a flow of control of the autonomous mobile object 10 relating to teaching by physical bending and stretching operations of a joint part that are performed by a user according to the first embodiment.

Details of a flow of control of the autonomous mobile object 10 according to the embodiment will be described. First of all, the flow of control of the autonomous mobile object 10 relating to teaching by physical bending and stretching operations of a joint part performed by a user will be described. FIG. 19 is a flowchart representing a flow of control of the autonomous mobile object 10 relating to teaching by physical bending and stretching operations of a joint performed by a user according to the embodiment.

Referring to FIG. 19, first of all, based on utterances of a user that are collected by the input unit 110, the recognition unit 120 detects a request for starting a teaching operation (S1101).

Based on the fact that the start request is detected at step S1101, the operation controller 150 causes the driver 160 to execute a relaxing operation (S1102).

The operation controller 150 detects a rotational position of a joint part that is bent and stretched by the user (S1103).

The operation controller 150 records detected rotational positions chronologically (S1104).

Based on the utterances, etc., the recognition unit 120 detects the end of the teaching operation (S1105). Note that the recognition unit 120 may detect the end of the teaching operation when no operation performed by the user on the joint part has been performed for a given time or longer.

The operation controller 150 executes trimming on the recorded data (S1106). The operation controller 150 may perform trimming on the time from the start of detection until performing of the actual operation on the joint part or the time from the last operation on the joint part until detection of the end.

The operation controller 150 converts the recorded data into control sequence data (S1107) and ends the process.

Figure 20:
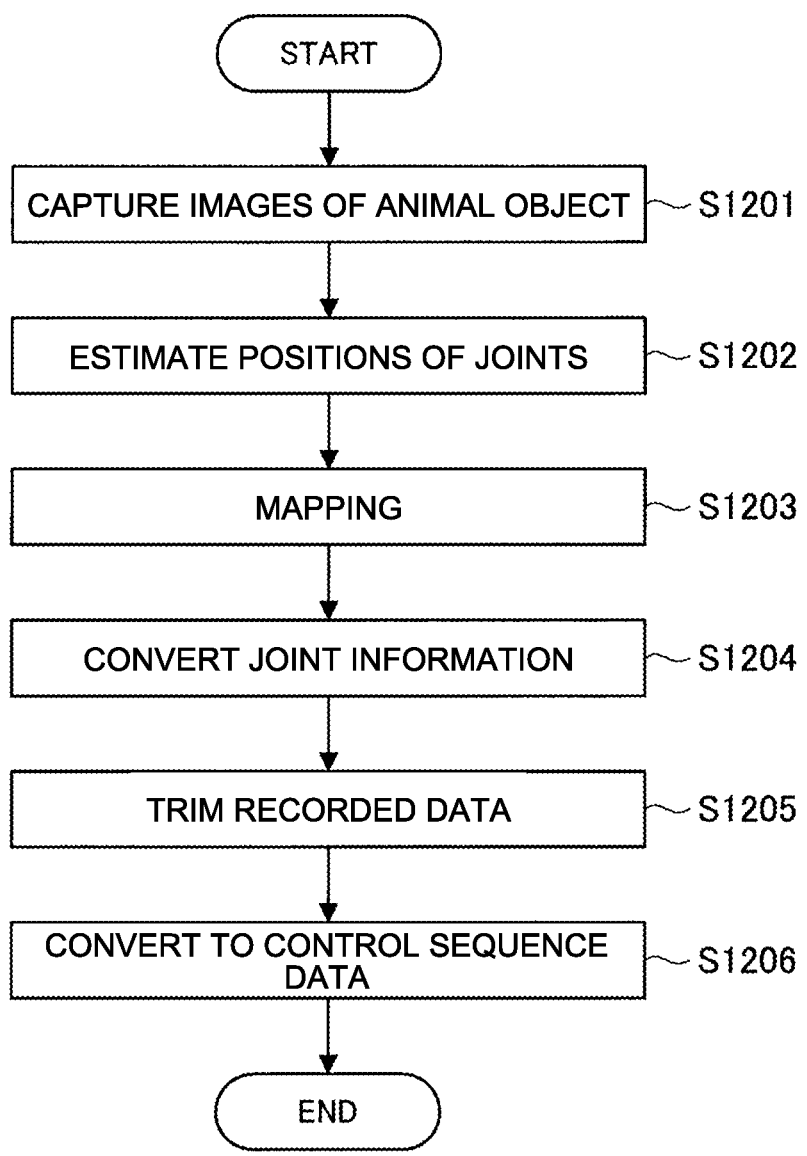
FIG. 20 is a flowchart representing a flow of control of an autonomous mobile object using movements of an animal object of which images are captured as teaching according to the first embodiment.

A flow of control of the autonomous mobile object 10 using movements of an animal object of which images are captured as a teaching will be described. FIG. 20 is a flowchart representing a flow of control of the autonomous mobile object 10 using movements of an animal object of which images are captured as a teaching.

Referring to FIG. 20, first of all, the input unit 110 captures images of movements of an animal object (S1201).

The operation controller 150 then executes estimation relating to positions of joints of the animal object (S1202).

The operation controller 150 then performs mapping between the joints of the animal object that are estimated at step S1202 and the joint parts of the driver 160 (S1203).

The operation controller 150 converts bending and stretching of the joints of the animal object into rotational positions of the joint parts and records the rotational positions (S1204).

Based on ranges of motion of the joint parts, the operation controller 150 performs trimming on the recorded data (S1205).

The operation controller 150 converts the recorded data into control sequence data (S1206) and ends the process.

3. Second Embodiment

3.1. Overview

A second embodiment of the disclosure will be described below. In the first embodiment, a method of teaching a new action to the autonomous mobile object 10 has been described in detail. In the following second embodiment, behavior plans relating to various operations including the aforementioned action will be mainly described.

As described above, unlike an apparatus that passively operates according to an instruction from a user, the autonomous mobile object 10 according to the embodiment of the disclosure performs a dynamic operation based on the estimated circumstances. The autonomous mobile object 10 has a characteristic in performing a comprehensive behavior plan based on multiple sets of needs opposed to each another in addition to the estimated circumstances.

For example, self-preservation needs and self-esteem needs are exemplified as the sets of needs opposed to each another. The self-preservation needs are needs for maintenance of continuous and safe activities of the autonomous mobile object 10. More specifically, the self-preservation needs according to the embodiment include needs for maintenance of or replenishment for the charging power of the autonomous mobile object 10. The self-preservation needs include needs for maintenance or recovery of the function of the autonomous mobile object 10.

The self-esteem needs are needs for being loved, being needed, and being interested in. The self-esteem needs according to the embodiment thus widely cover needs for pleasing the user, not making the user sad, etc., in order to achieve the above-described events.

The autonomous mobile object 10 according to the embodiment of the disclosure has both the above-described self-preservation needs and self-esteem needs and thus is able to realize more natural and flexible various behavior patterns close to those of real animals. In the second embodiment of the disclosure, flexible behavior plans of the autonomous mobile object 10 based on the above-described sets of needs and circumstances estimation will be described in detail with specific examples being exemplified.

3.2. Specific Example of Behavior Plan

As described above, the autonomous mobile object 10 according to the embodiment has multiple sets of needs opposed to each other, that is, self-preservation needs and self-esteem needs. Specifically, while the autonomous mobile object 10 basically has needs for being loved by the user and for pleasing the user, the autonomous mobile object 10 simultaneously has needs for reducing power consumption, for charging power and a demand for not wearing the components.

The behavior planner 140 according to the embodiment may, based on the circumstances that are estimated by the recognition unit 120, plan a behavior that satisfies at least one of self-preservation needs and self-esteem needs described above. For example, the behavior planner 140 is capable of planning a behavior prioritizing any one of self-preservation needs and self-esteem needs.

For example, the behavior planner 140 may determine prioritized needs depending on whether the user is detected. Specifically, the behavior planner 140 according to the embodiment may execute planning a behavior prioritizing self-esteem needs when the user is detected and execute planning a behavior prioritizing self-preservation needs when the user is not detected.

FIG. 21 a diagram for describing a behavior plan based on whether the user is detected according to the embodiment. In the upper part in FIG. 21, an exemplary case where a user U2 is present in an area Z1 surrounding the autonomous mobile object 10 is illustrated. The behavior planner 140 according to the embodiment executes planning a behavior prioritizing self-esteem needs based on the fact that the recognition unit 120 detects the user U2 in the surrounding area Z1. For example, the behavior planner 140 may make a behavior plan of getting close to the user U2, taking an action against the user U2, or the like.

On the other hand, in the lower part in FIG. 21, an exemplary case where the user is not in the area Z1 surrounding the autonomous mobile object 10 is illustrated. The behavior planner 140 according to the embodiment may plan a behavior prioritizing self-preservation needs based on the fact that the recognition unit 120 estimates that the user is not present. For example, the recognition unit 120, for example, may estimate that the user is not present when the user is not in the image that is captured by the input unit 110 or when no utterance of the user is detected. The recognition unit 120 is also capable of estimating absence of the user based on the schedule information on the user.

As described above, the self-preservation needs according to the embodiment include needs relating to the charging power of the autonomous mobile object 10. When the user is not detected, the behavior planner 140 may plan a behavior prioritizing maintenance of or replenishment of charging power. In the example illustrated in the lower part in FIG. 21, the behavior planner 140 plans replenishment for the charging power and the operation controller 150 connects the autonomous mobile object 10 to a charger 50 based on the planning.

Figure 22:
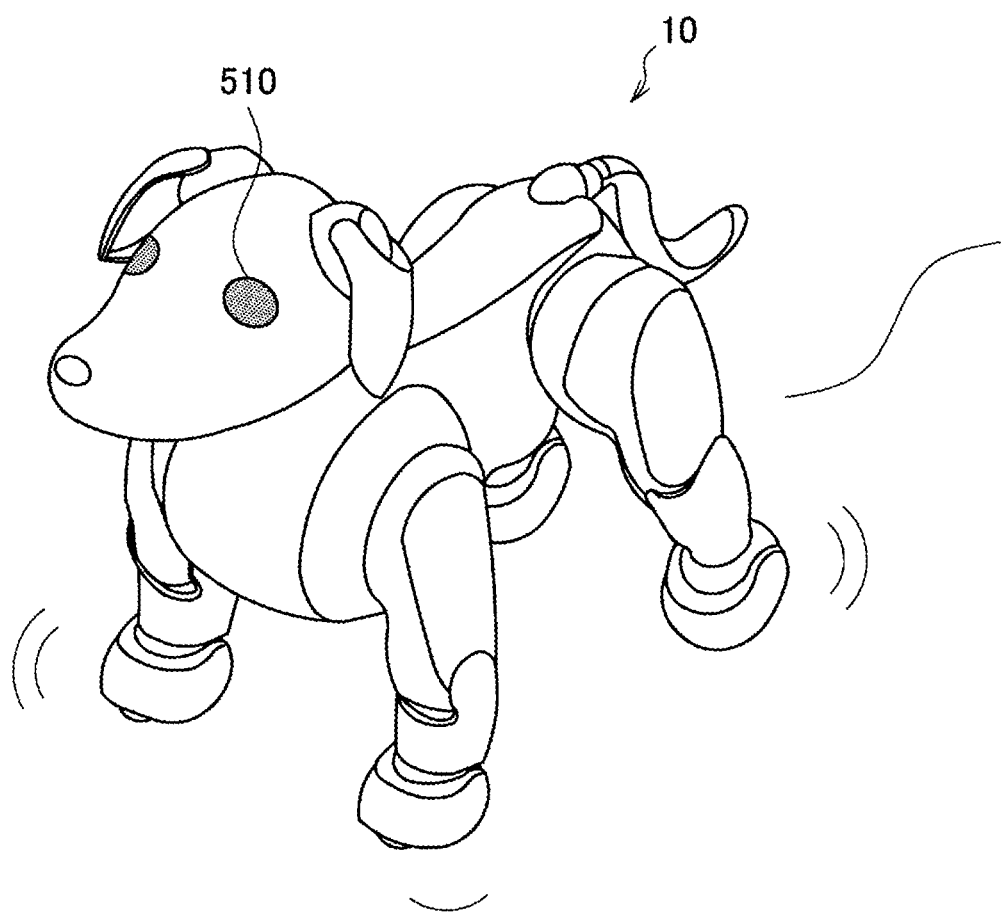
FIG. 22 is a diagram for describing a behavior plan prioritizing reduction of power consumption according to the second embodiment.

When power charge is not necessary, the behavior planner 140 according to the embodiment may execute planning various behaviors to reduce power consumption. FIG. 22 is a diagram for describing planning a behavior prioritizing reduction of power consumption according to the embodiment.

For example, in order to reduce power consumption, the behavior planner 140 according to the embodiment may execute planning to stop outputting visual expression relating to eyeball operations made by the displays 510. Similarly, the behavior planner 140 is able to make a plan to stop output of sound by a speaker and data collection using various sensors.

The behavior planner 140 may try to reduce power consumption by delaying operations of joint parts or planning a behavior of laying down on site. Furthermore, the behavior planner 140 may plan a behavior of turning off the processor and the power.

The self-preservation needs according to the embodiment include needs relating to maintenance of the function of the autonomous mobile object 10. For this reason, a behavior prioritizing maintenance and recovery of the function of the autonomous mobile object 10 according to the embodiment may be planned.

For example, when a failure is detected in an operation of the actuator 570, the behavior planner 140 may plan a behavior causing the corresponding actuator 570 to operate as little as possible in order not to deteriorate the failure. For example, the behavior planner 140 may prioritize maintaining the function and plan execution of calibration relating to the display 510 and various sensors.

When the degree of self-preservation needs described above is significantly large, the behavior planner 140 may plan a behavior prioritizing self-preservation needs. For example, when the charging power is about to deplete or when the damage of the actuator 570 is serious, the behavior planner 140 plans a behavior prioritizing self-preservation needs even when the user is present.

On the other hand, when the degree of self-preservation needs is under a threshold, the behavior planner 140 enables the autonomous mobile object 10 to implement various operations for meeting expectation of the user by planning a behavior prioritizing self-esteem needs.

As described above, the behavior planner 140 according to the embodiment enables implementation of complicated and flexible behavior patterns close to those of real animals by controlling the priorities of self-preservation needs and self-esteem needs according to the circumstances.

The behavior planner 140 according to the embodiment may, even when any one of self-preservation needs and self-esteem needs is prioritized, plan a behavior that can satisfy both self-preservation needs and self-esteem needs at a time. For example, there is a case where, when the user is detected in the field of view or when being called by the user, it is possible to reduce power consumption by taking a behavior corresponding to the condition of the user without rushing over to the user.

Figure 23:
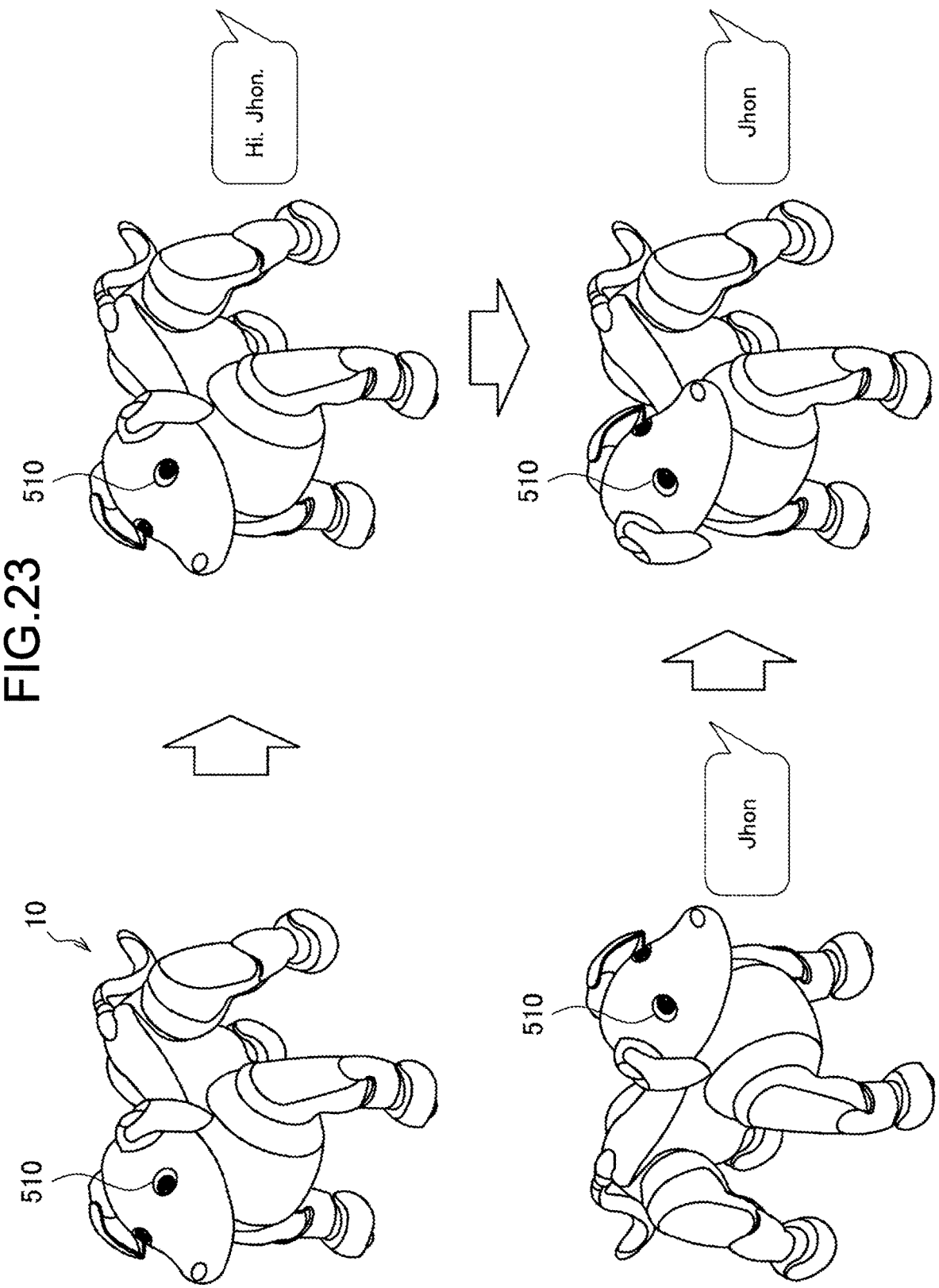
FIG. 23 is a diagram illustrating an exemplary behavior plan satisfying both self-preservation needs and self-esteem needs according to the second embodiment.

FIG. 23 is a diagram illustrating an exemplary behavior plan that satisfies both self-preservation needs and self-esteem needs according to the embodiment. FIG. 23 illustrates an example of planning a behavior on a call by the user.

First of all, when the recognition unit 120 detects an utterance of the user, the behavior planner 140 plans a behavior of turning the gaze that is displayed on the displays 510 toward the user. The above-described function of the behavior planner 140 makes it possible to, by first of all controlling only visual information relating to eyeball operations, realize a quick response and prevent the actuator 570 to operate unnecessarily.

When it is recognized that the user calls the autonomous mobile object 10 or the gaze of the user is toward the autonomous mobile object 10, the recognition unit 120 turns the head part and the torso part toward the user sequentially after the gaze. The behavior planner 140 is able to implement more natural operations of the autonomous mobile object 10 by, while turning the irises back to the centers of the displays 510 with the eyes setting on the user, turning the head part toward the user simultaneously.

In the same manner, the behavior planner is able to, by planning a behavior such that an angular difference with respect to the torso part gradually reduces with the head turned to the user, realize natural motions and prevent the power consumption from increasing due to a sudden operation.

Figure 24:
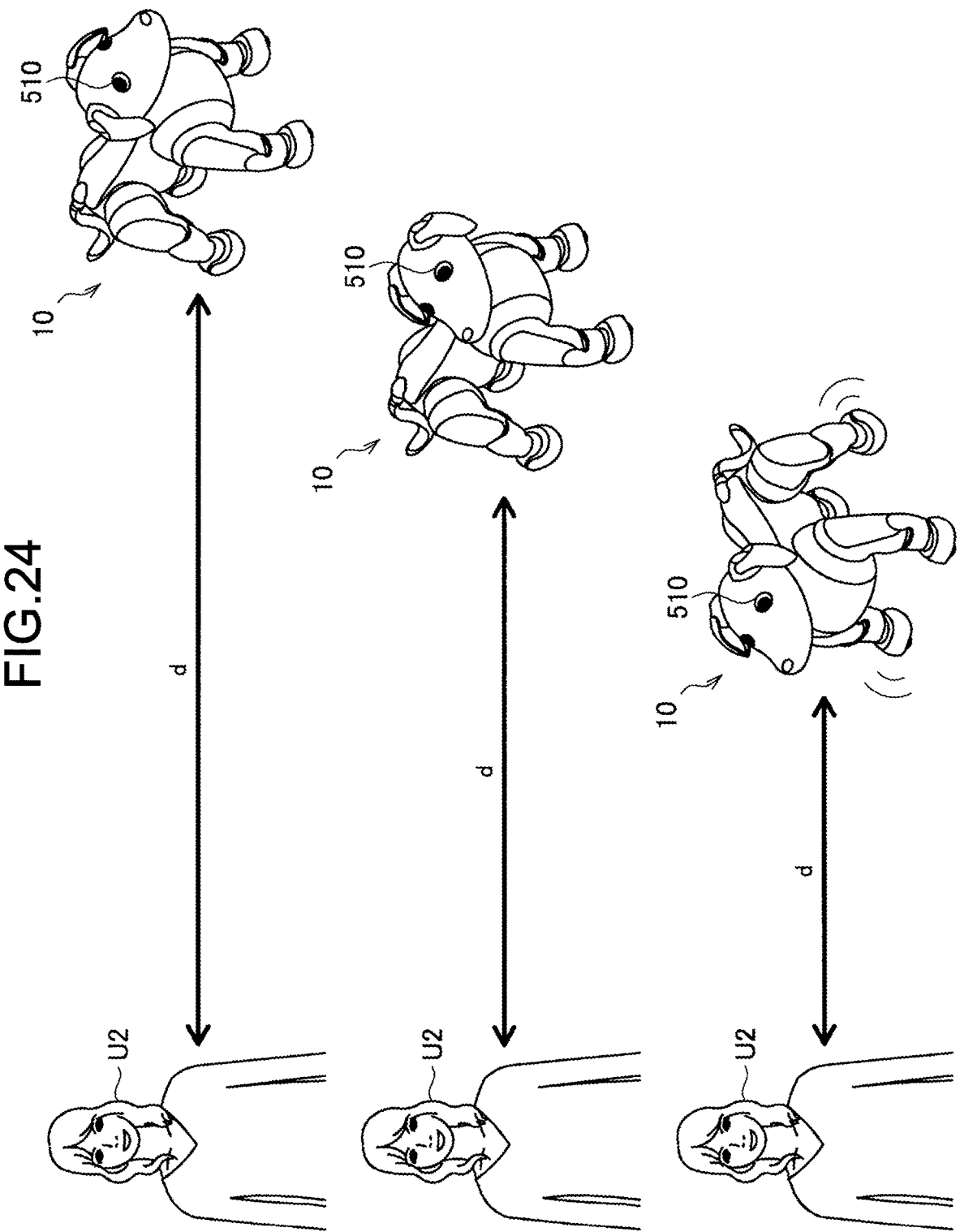
FIG. 24 is a diagram for describing a behavior plan based on a distance between a user and an autonomous mobile object according to the second embodiment.

The behavior planner 140 according to the embodiment may plan a behavior based on a distance between the user and the autonomous mobile object 10. FIG. 24 is a diagram for explaining a behavior plan based on a distance between the user and the autonomous mobile object 10 according to the embodiment.

FIG. 24 illustrates an exemplary behavior that is planned according to a distance to the user U2. Specifically, as illustrated in the upper part in FIG. 24, when the distance d between the user U2 and the autonomous mobile object 10 is long, the behavior planner 140 first of all may plan a behavior of turning only the gaze toward the user.

As illustrated in the middle part in FIG. 24, when the distance d between the user U2 and the autonomous mobile object 10 is intermediate, the behavior planner 140 plans a behavior of turning the head part toward the user after the gaze.

As illustrated in the lower part in FIG. 24, when the distance d between the user U2 and the autonomous mobile object 10 is short, the behavior planner 140 plans a behavior of turning the torso part toward the user after the gaze and the head part.

As described above, the behavior planner 140 according to the embodiment is able to plan a flexible behavior based on the distance between the user and the autonomous mobile object 10. The above-described function of the behavior planner 140 enables a behavior of, while reducing power consumption by first of all shifting only the gaze, causing the actuator 570 to operate according to the degree of proximity of the user afterwards, which thus makes it possible to efficiently reduce power consumption while showing a definite response to the user.

The behavior planner 140 according to the embodiment may plan the behavior described above based on the strength of the demand of the user. When the user keeps calling the autonomous mobile object 10 or gets close to the autonomous mobile object 10 after the gaze is turned, the behavior planner 140 may plan a behavior of turning the head part and the torso part.

The behavior planner 140 according to the embodiment may plan a behavior based on an emotional distance to the user other than the physical distance to the user. The behavior planner 140, for example, is able to plan a behavior of, while only turning the gaze when called from a distance soon after the user uses the autonomous mobile object 10, rushing to the user even when called from a distance after the use of the autonomous mobile object 10 is kept sufficiently.

The behavior planner 140 according to the embodiment is capable of planning, in addition to the above-described behaviors, various behaviors based on changes in the condition of surrounding environment and the condition of the user. For example, the behavior planner 140 according to the embodiment is able to plan a flexible behavior based on detected changes in illuminance environment.

Figure 25:
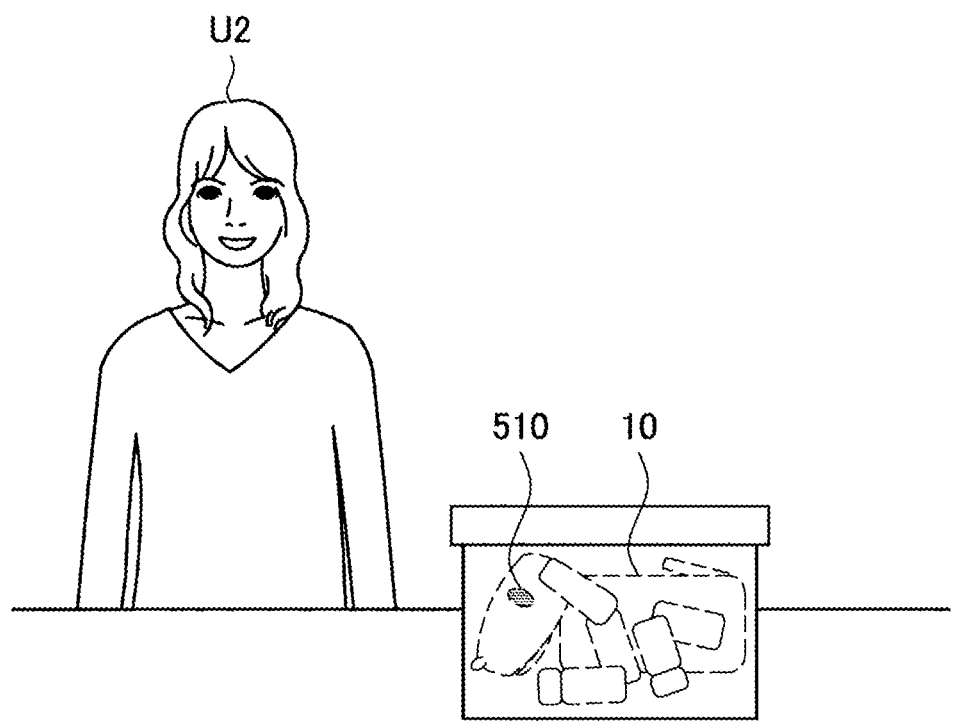
FIG. 25 is a diagram illustrating an exemplary behavior plan based on a change in environmental condition according to the second embodiment.
Figure 26:
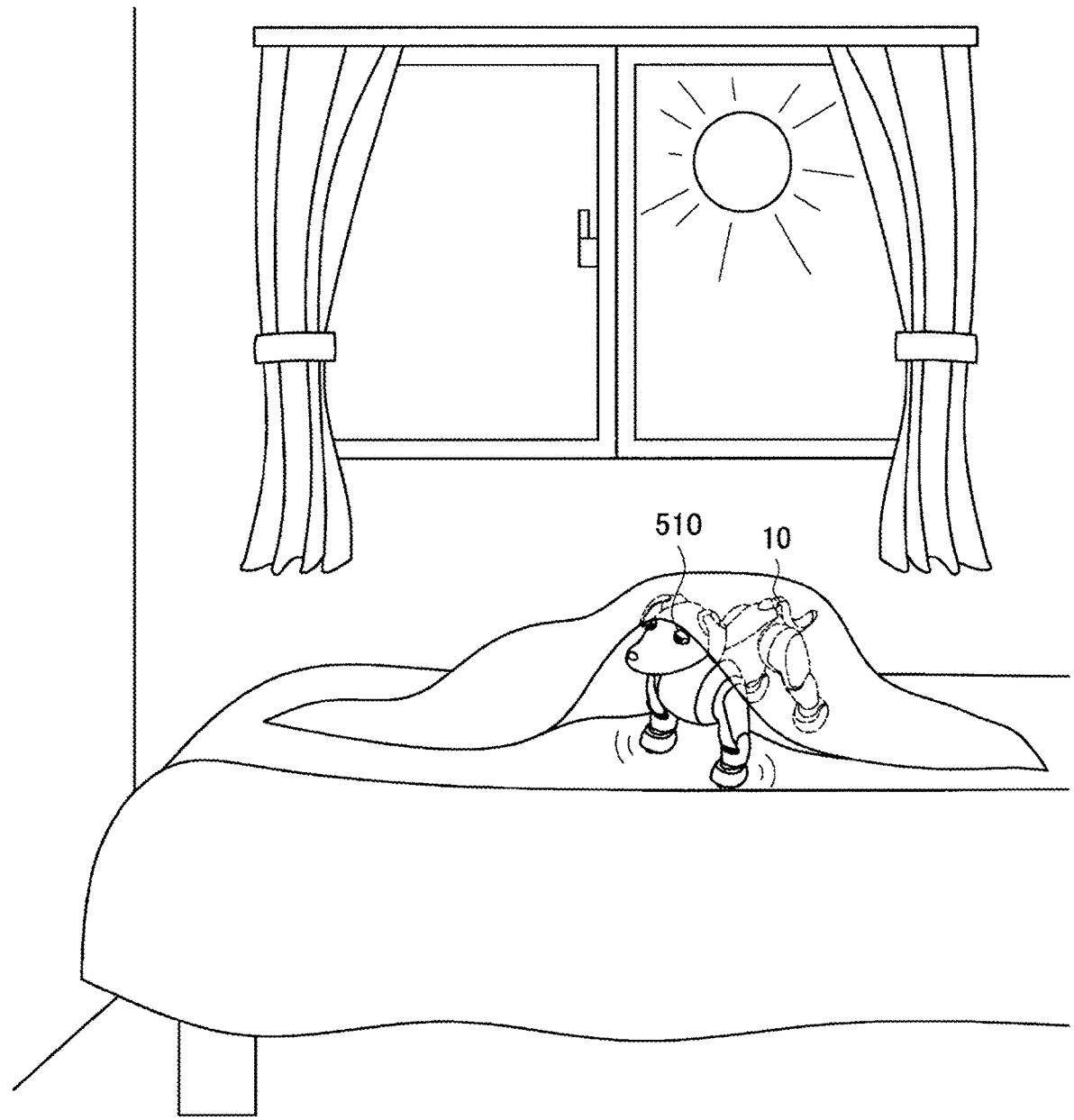
FIG. 26 is a diagram illustrating an exemplary behavior plan based on a change in environmental condition according to the second embodiment.
Figure 27:
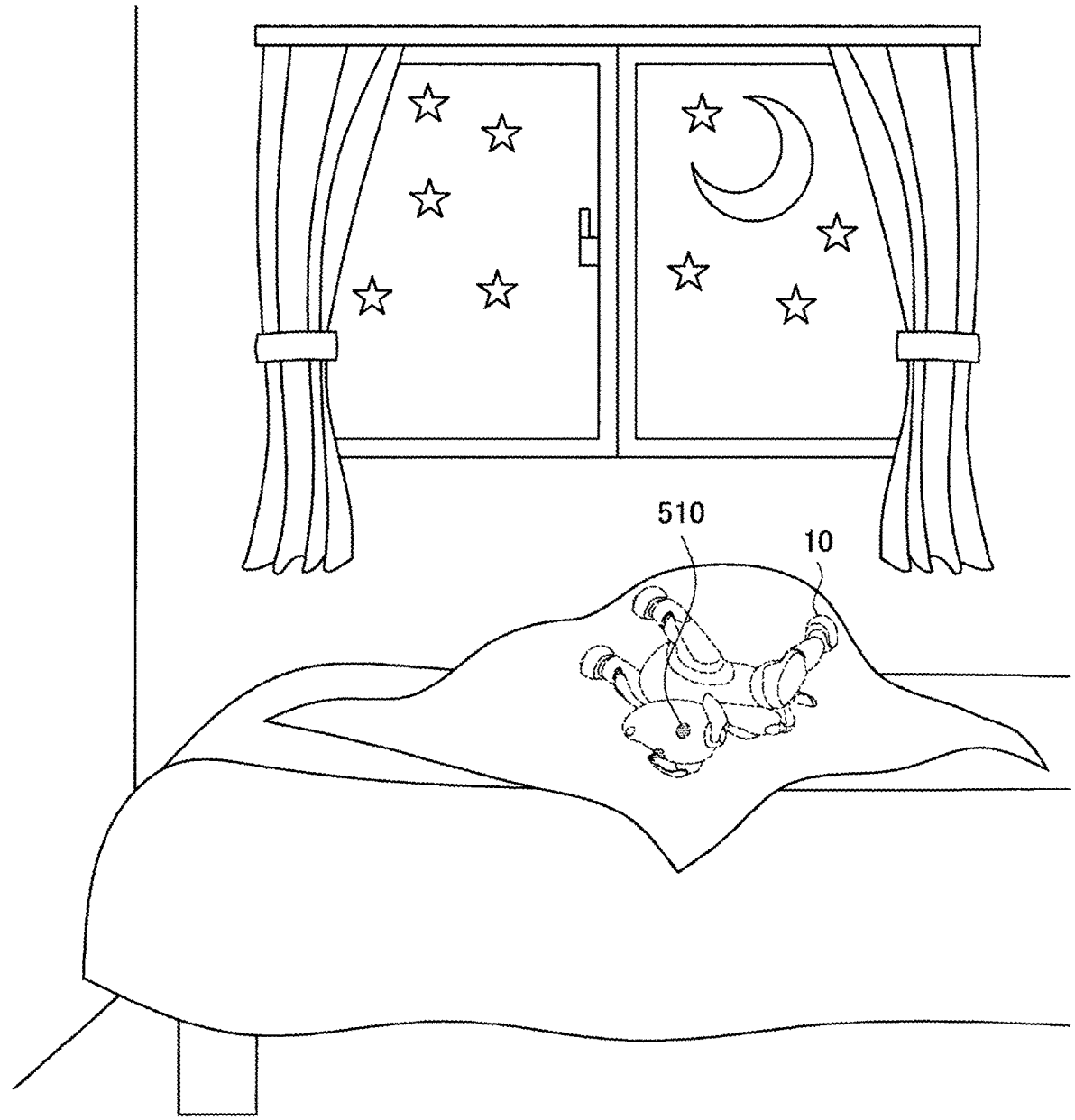
FIG. 27 is a diagram illustrating an exemplary behavior plan based on a change in environmental condition according to the second embodiment.

FIGS. 25 to 27 are diagrams illustrating examples of planning behaviors based on changes in environmental condition according to the embodiment. FIG. 25 illustrates the autonomous mobile object 10 that is stored by the user U2 in a box or a carry bag. In this case, the behavior planner 140 according to the embodiment may plan a behavior of autonomously turning off the power based on the fact that the recognition unit 120 detects that the user U2 houses the autonomous mobile object 10.

The above-described function of the behavior planner 140 makes it possible to satisfy self-preservation needs relating to charging power and maintenance of the function and simultaneously satisfy self-esteem needs by executing a behavior considering the intention of the user.

The recognition unit 120 is capable of recognizing an act of the user U2 to house the autonomous mobile object 10, for example, based on a drop in illuminance and restriction of an obstacle on operations of the actuator 570.

For example, when the user U2 houses the autonomous mobile object 10 with the head part being outside in a tote bag, or the like, the behavior planner 140 may plan a behavior such that the actuators of the torso part and leg parts do no operate while the output of visual information relating to the eyeball operations performed by the displays 510 and operations of the head part, the ears and the mouse are maintained.

FIGS. 26 and 27 illustrate behaviors of the autonomous mobile object 10 taken when the user puts a blanket, or the like, on the autonomous mobile object 10. In this case, the behavior planner 140 according to the embodiment may plan a behavior satisfying at least one of self-preservation needs and self-esteem needs based on the face that a sudden change in illuminance environment is detected. In that case, the behavior planner 140 may determine priorities relating to self-preservation needs and self-esteem needs based on the surrounding environment and the condition of the user.

For example, in the example illustrated in FIG. 26, the behavior planner 140 plans a behavior of escaping from the blanket based on the fact that the time is early for the user to sleep and that laughing voice of the user is detected. The behavior planner 140 may plan a behavior of the autonomous mobile object 10 to move toward a brighter site.

As described above, the behavior planner 140 according to the embodiment enables, when mischief of the user is estimated from the condition including the response of the user and the surrounding environment, implementation of a behavior along expectation of the user by planning a response like that of a real dog.

In the example illustrated in FIG. 27, based on the fact that it is time for the user to sleep and the user wears a night wear, the behavior planner 140 plans a behavior of sleeping with the user. Specifically, the behavior planner 140 may plan a behavior of turning off the power after the autonomous mobile object 10 is in a supine position.

As described above, when it is estimated that the user is going to sleep together from the state of the user and the surrounding environment, the behavior planner 140 according to the embodiment is able to satisfy both self-esteem needs and self-preservation needs by performing a behavior that meets the expectation of the user and reduces power consumption.

The behavior planner 140 according to the embodiment, for example, is also able to plan a behavior based on a control mode of the autonomous mobile object 10. For example, a silent mode in which no sound output is performed is taken as the aforementioned control mode.

FIG. 28 is a diagram for explaining a behavior plan based on the control mode of the autonomous mobile object 10 according to the embodiment. On the left s in FIG. 28, the behavior of the autonomous mobile object 10 in the case where the control mode of the autonomous mobile object 10 is a normal mode is exemplified. The behavior planner 140 according to the embodiment may plan a behavior of outputting voices and opening the mouse in response to a call by the user, or the like.

On the right in FIG. 28, a behavior of the autonomous mobile object 10 in the case where the control mode of the autonomous mobile object 10 is the silent mode is exemplified. The behavior planner 140 according to the embodiment may plan a behavior of outputting no voce and not opening the mouse according to the silent mode.

The above-described function of the behavior planner 140 according to the embodiment makes it possible to realize more natural operations by closing the mouse when no voice is output and at the same time effectively reduce power consumption by not opening the mouse.

The behavior planner 140 may realize a response to the user by planning, instead of operations of the mouse, a change in output of visual information relating to the eyeball operations performed by the displays 510 or a non-verbal behavior using or the tail.

As described above, the behavior planner 140 according to the embodiment is able to implement a behavior that satisfy both self-preservation needs and self-esteem needs.

The silent mode according to the embodiment may be set by the user or may be set as part of planning a behavior by the behavior planner 140. The behavior planner 140 is also able to plan an autonomous shift to the silent mode, for example, when it is detected that the user is talking with another person.

3.3. Flow of Control

Figure 29:
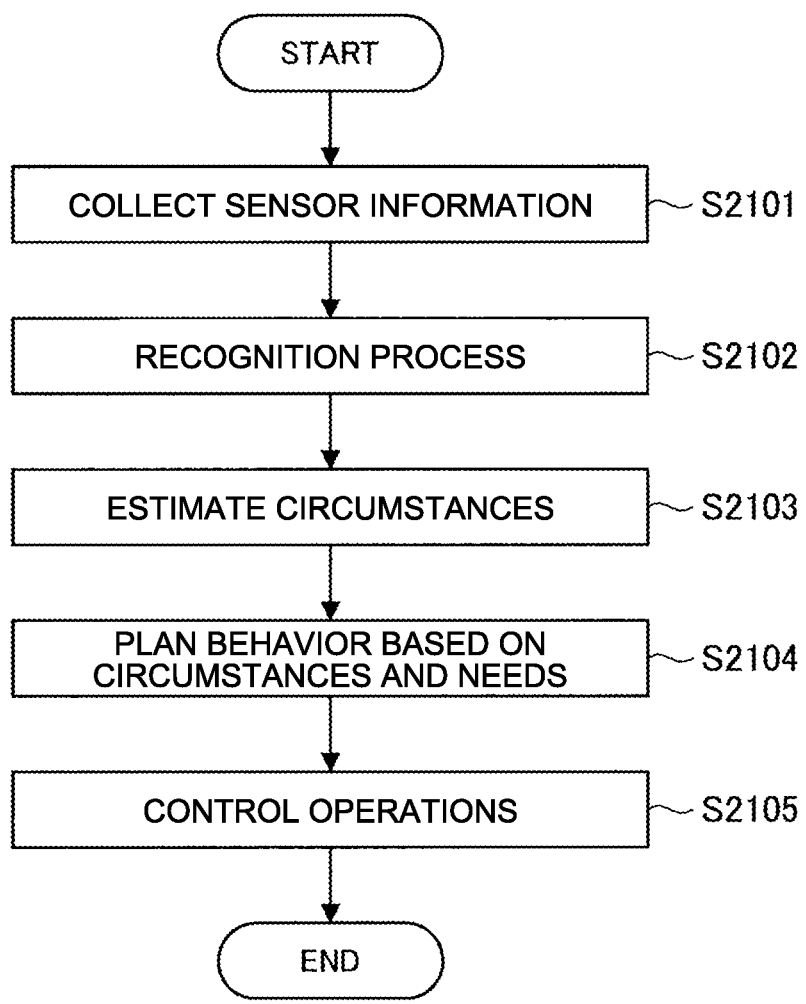
FIG. 29 is a flowchart representing a flow of a behavior plan according to the embodiment.

A flow of a behavior plan of the autonomous mobile object 10 according to the embodiment will be described in detail. FIG. 29 is a flowchart representing a flow of the behavior plan according to the embodiment.

Referring to FIG. 29, first of all, the input unit 110 collects sensor information (S2101).

The recognition unit 120 then executes each type of recognition process based on the sensor information that is collected at step S2101 (S2102).

The recognition unit 120 performs comprehensive circumstances estimation based on various events that are recognized at step S2102 (S2103).

Collecting sensor information, the recognition processes, the circumstances estimation at steps S2101 to 2103 may be continuously executed constantly.

The behavior planner 140 plans a behavior to be executed by the autonomous mobile object 10 based on the circumstances estimated at step S2103 and self-preservation needs and self-esteem needs (S2104).

Based on the behavior plan that is determined at step S2104, the operation controller 150 controls operations of the driver 160 and the output unit 170 to execute the behavior (S2105).

4. Third Embodiment

4.1. Overview

A third embodiment of the disclosure will be described. In the first and second embodiment, the behavior planning function and the motion control function of the autonomous mobile object 10 have been mainly described. On the other hand, in a third embodiment of the disclosure, the function of the information processing server 20 will be focused on and described.

As described above, the autonomous mobile object 10 according to the embodiment of the disclosure has the circumstances estimation function, the behavior planning function and the operation control function and is capable of taking autonomous behaviors. In other words, the autonomous mobile object 10 is an apparatus capable of operating independently. On the other hand, when performing operations completely independently, the autonomous mobile object 10 performs leaning based on only the operations executed by the autonomous mobile object 10 and it is difficult to share the result of leaning with other autonomous mobile objects 10.

Even when the autonomous mobile object 10 performs operations independently, it is possible to increase actions that can be taken by teaching by the user: however, more room is discerned to collect more actions that attract the interest of the user.

The information processing server 20 according to the embodiment is invented by focusing on the above-described aspect and providing collective intelligence based on a log of behaviors that are collected from the multiple autonomous mobile objects 10 enables each autonomous mobile object 10 to take more appropriate behaviors.

The information processing server 20 thus includes the behavior recommender 220 that represents, to the autonomous mobile object 10 that performs a behavior plan based on circumstances estimation, a recommended behavior to be recommended to the autonomous mobile object 10. The behavior recommender 220 has a characteristic in determining the aforementioned recommended behavior based on the log of behaviors collected from the autonomous mobile objects 10 and a circumstances summary that is received from the autonomous mobile object 10 to which recommendation is made (also referred to as a subject autonomous mobile object).

The function of the information processing server 20 according to the embodiment and the effect achieved by the function will be described in detail below.

4.2. Representation of Recommended Behavior

First of all, the function of representing a recommended behavior implemented by the behavior recommender 220 according to the embodiment will be described. As described above, the autonomous mobile object 10 according to the embodiment is capable of independently performing a behavior plan based on circumstances estimation. Depending on the circumstances, however, the case where reliability relating to a behavior plan is not sufficient and the case where plans tend to be uniform are assumed. They can be causes of decreases in satisfaction of the user with the autonomous mobile object 10 and the degree of love of the user for the autonomous mobile object 10.

For this reason, by representing a recommended behavior to the subject autonomous mobile object based on the log of behaviors collected from the autonomous mobile objects 10, the information processing server 20 according to the embodiment is able to support the subject autonomous mobile object to perform more appropriate operations.

Figure 30:
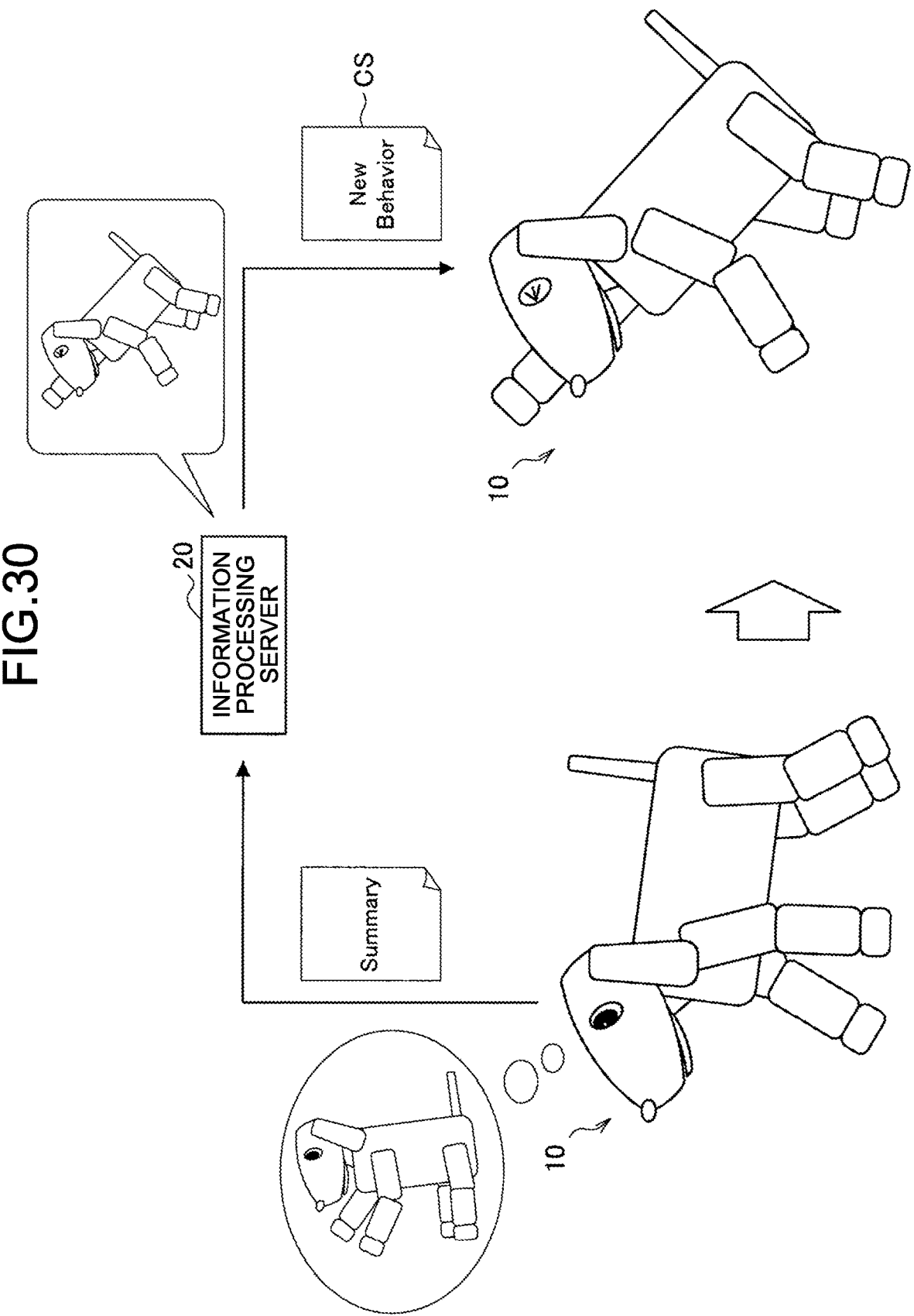
FIG. 30 is a diagram for describing representation of a recommended behavior according to a third embodiment of the disclosure.

FIG. 30 is a diagram for describing representation of a recommended behavior according to the embodiment. FIG. 30 illustrates the autonomous mobile object 10 that is a subject autonomous mobile object and the information processing server 20. Note that FIG. 30 illustrates two autonomous mobile objects 10 for description and the two autonomous mobile objects 10 are an identical subject autonomous mobile object.

On the left in FIG. 30, the exemplary case where the autonomous mobile object 10 that is the subject autonomous mobile object independently performs a behavior plan based on circumstances estimation. The autonomous mobile object 10 may, for example, plan an operation that is represented by the balloon on the left in FIG. 30.

On the other hand, the behavior recommender 220 of the information processing server 20 according to the embodiment is capable of determining a recommended behavior to be recommended to the subject autonomous mobile object based on summary information (also referred to as circumstances summary) relating to circumstances estimation that is received from the autonomous mobile object 10 that is the subject autonomous mobile object and representing the recommended behavior to the subject autonomous mobile object. The recommended behavior that is recommended by the behavior recommender 220 may be the operation that is represented by the balloon on the upper right in FIG. 30.

The behavior recommender 220 according to the embodiment has a characteristic in providing the control sequence data CS for implementing an operation corresponding to the recommended behavior to the subject mobile object via the terminal device communication unit 250.

As described above, the behavior recommender 220 according to the embodiment is capable of representing a recommended behavior and control sequence data relating to the recommended behavior to a subject autonomous mobile object, which enables the subject autonomous mobile object to execute a new action to which a good response of the user is expected.

Figure 31:
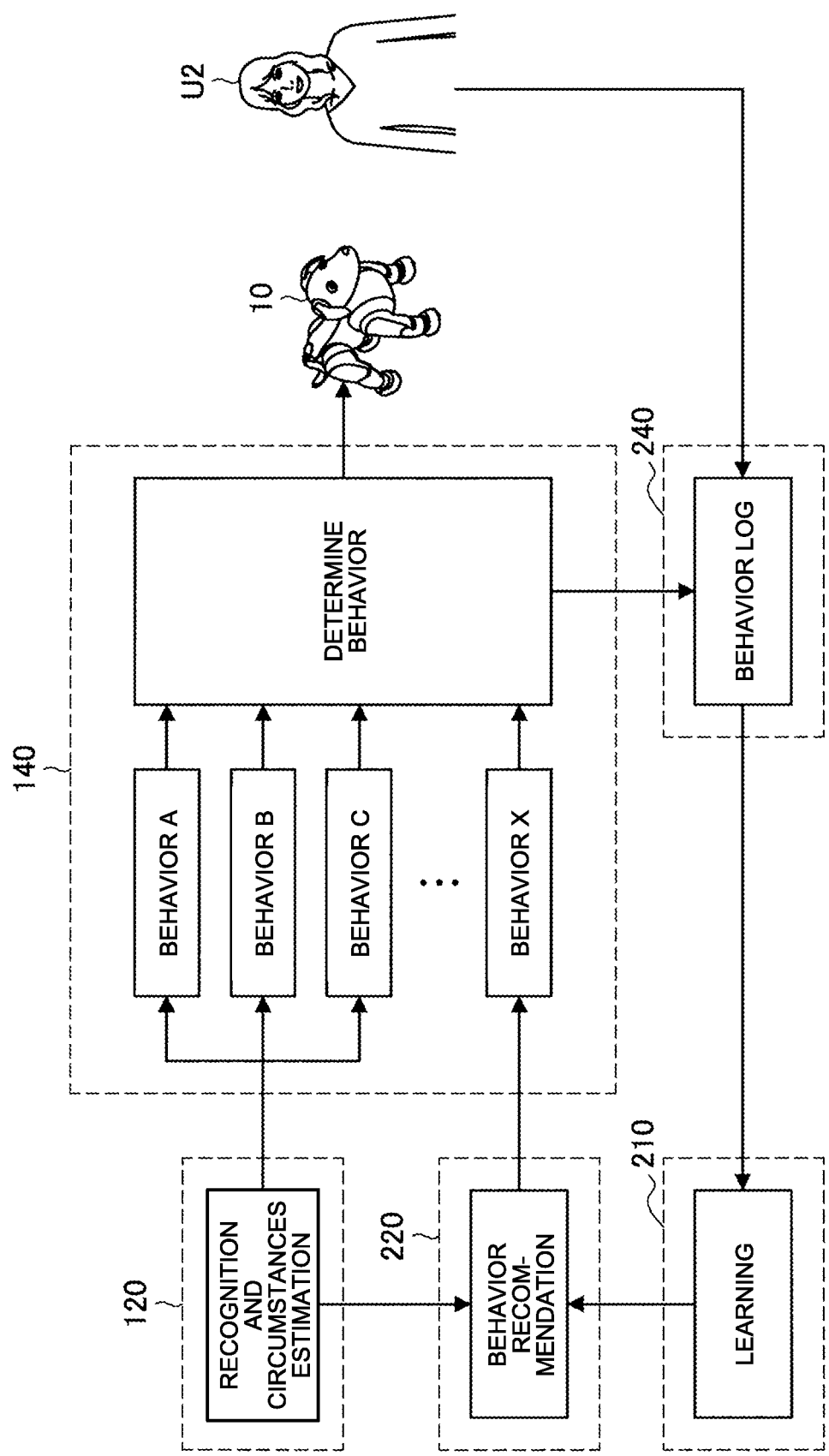
FIG. 31 is a conceptual view to describe a behavior plan based on a recommended behavior according to the third embodiment.

Representation of a recommended behavior made by the behavior recommender 220 according to the embodiment and a flow of a behavior plan of the autonomous mobile object 10 will be described in detail. FIG. 31 is a conceptual view to describe a behavior plan based on the recommended behavior according to the embodiment.

First of all, the recognition unit 120 of the autonomous mobile object 10 executes various types of recognition and circumstances estimation based on sensor information that is collected by the input unit 110. The recognition unit 120 passes the result of circumstances estimation to the behavior planner 140 and transmits a circumstances summary to the behavior recommender 220 of the information processing server 20.

The behavior recommender 220 according to the embodiment determines a recommended behavior using the circumstances summary that is received from the recognition unit 120 and knowledge serving as collective intelligence relating to the autonomous mobile objects 10 of the learning unit 210 and represents information relating to the recommended behavior to the behavior planner 140.

The behavior planner 140 according to the embodiment then determines a behavior to be actually executed based on multiple possible behaviors based on the circumstances estimation made by the recognition unit 120 and the recommended behavior that is recommended by the behavior recommender 220. The behavior planner 140 may make a final behavior determination based on reliability of each of the possible behaviors. As described above, the behavior planner 140 according to the embodiment need not necessarily employ a recommended behavior.

The operation controller 150 then controls the driver 160 and the output unit 170 based on the behavior plan that is determined by the behavior planner 140 and implements an operation performed by the autonomous mobile object 10.

The behavior planner 140 associates the circumstances estimation made by the recognition unit 120, the determined behavior plan, and a response (feedback) of the user U2 to the executed operation with one another and transmits them to the information processing server 20.

The above-described information is stored as the behavior log in the storage 240 of the information processing server 20 and is used for learning by the learning unit 210. The feedback of the user may be stored in a quantified condition via analysis by the analyzer 230. The analyzer 230, for example, is able to quantify positiveness and negativeness of response of the user based on the expression and utterances of the user.

As described above, the information processing system according to the embodiment is capable of effectively learning operations that attract the interest of users more by estimating the circumstances, representing a recommended behavior, planning a behavior, controlling operations, collecting the behavior log, and repeated execution.

Figure 32:
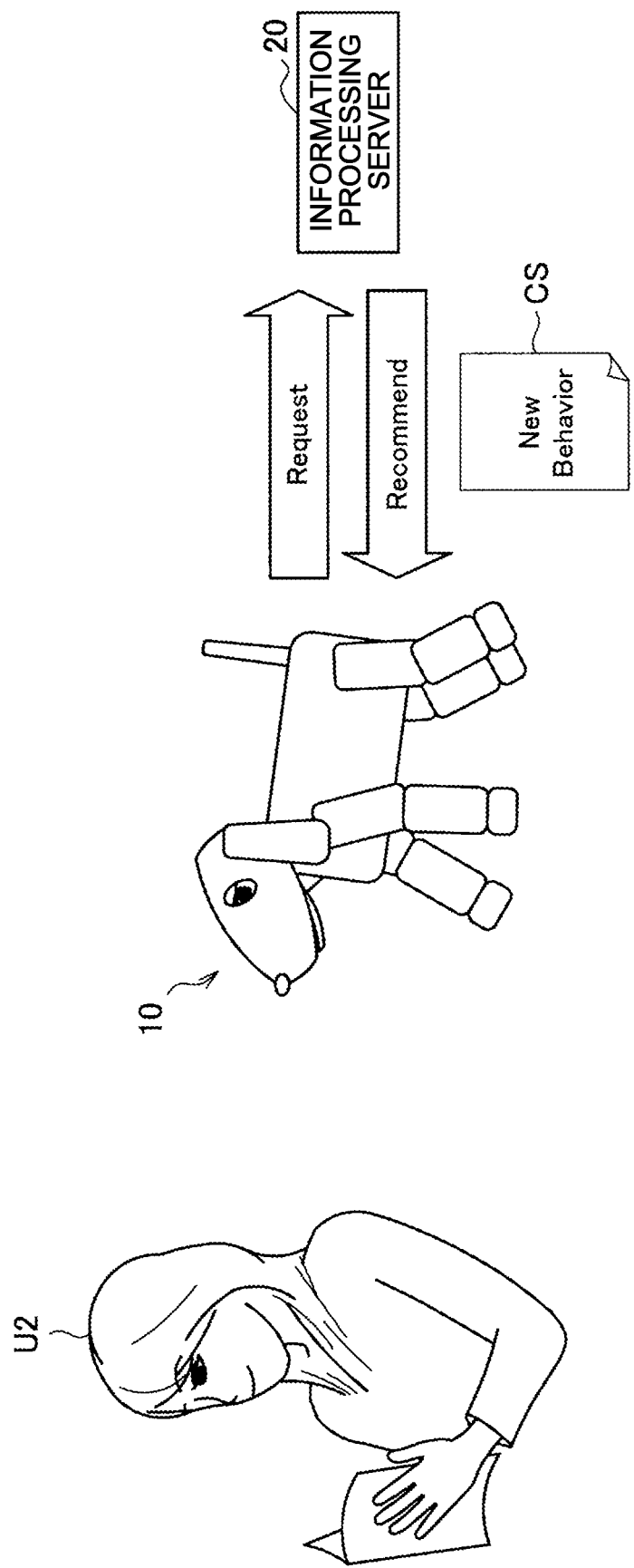
FIG. 32 is a diagram for describing representation of a recommended behavior based on a degree of love of a user according to the third embodiment.

The behavior recommender 220 according to the embodiment, for example, may represent a recommended behavior based on the degree of love of a user for a subject autonomous mobile object. FIG. 32 is a diagram for for describing representation of a recommended behavior based on a degree of love of the user according to the embodiment.

FIG. 32 illustrates the user U2 with lowered love for the autonomous mobile object 10 that is the subject autonomous mobile object. The behavior recommender 220 according to the embodiment may, based on the analysis by the analyzer 230 indicating that the love of the user U2 is lowering, represent a recommended behavior or provide the control sequence data CS to the autonomous mobile object 10.

The analyzer 230 is able to analyze the aforementioned degree of love based on the feedback of the user U2 to the operation executed by the autonomous mobile object 10, the number of times the user U2 is in contact with the autonomous mobile object 10, the number of calls, the time during which the autonomous mobile object 10 is on, etc.

Analysis on the degree of love may be executed by the autonomous mobile object 10. In that case, based on the fact that the degree of love of the user is lowering, the autonomous mobile object 10 makes a request for a recommended behavior to the information processing server 20. Based on the request for the circumstances, the behavior recommender 220 is able to represent a recommended behavior to the autonomous mobile object 10.

The above-described functions of the information processing server 20 and the autonomous mobile object 10 according to the embodiment enable efficient increase of new actions that can be executed by the autonomous mobile object 10 and enables prevention of the degree of love of the user from lowering.

Figure 33:
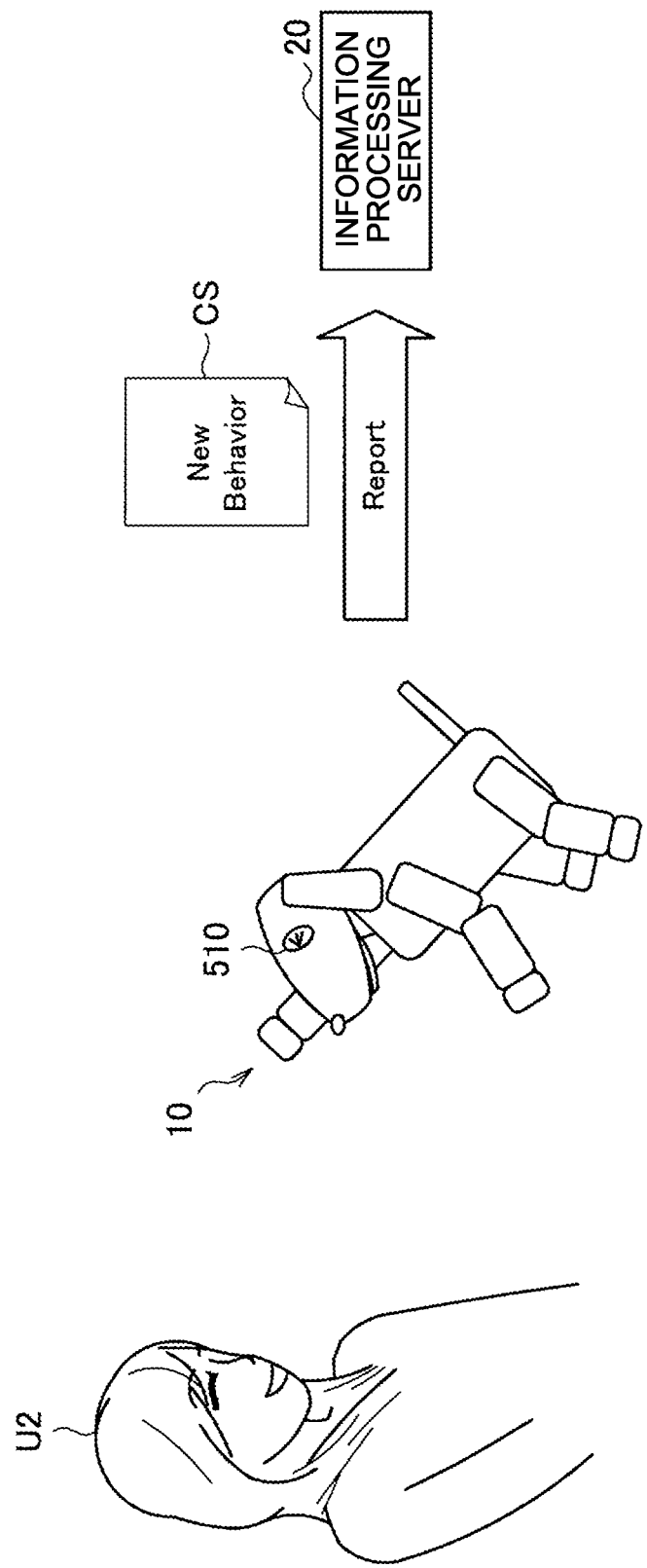
FIG. 33 is a diagram for describing collection of control sequence data according to the third embodiment.

A system for the behavior recommender 220 according to the embodiment to collect control sequence data from the autonomous mobile objects 10 will be described. FIG. 33 is a diagram for describing collection of control sequence data according to the embodiment.

FIG. 33 illustrates the autonomous mobile object 10 that executes an operation and the user U2 that makes a positive feedback to the operation. When the feedback of the user to the executed operation is positive as described above, the autonomous mobile object 10 may transmit a circumstances summary, control sequence data CS relating to the executed operation, and feedback of the user as a behavior log to the information processing server 20.

As described above, the behavior recommender 220 according to the embodiment is capable of efficiently collect, from the multiple autonomous mobile objects 10, control sequence data corresponding to operations to which the user shows positive feedback. The above-described system enables provision of the control sequence data that is collected from other autonomous mobile objects 10 to a subject autonomous mobile object and enables the autonomous mobile objects 10 to share the operations that are assumed to be effective to the user.

Downloading and uploading the control sequence data according to the embodiment, for example, may be performed freely by the user via a client application. The user may restrict the range of disclosure of control sequence data, for example, to a group of friends or work place. The function enables the group to spread and share the operations loved by the group and thus an effect of promotion of communication among users is also expected.

Figure 34:
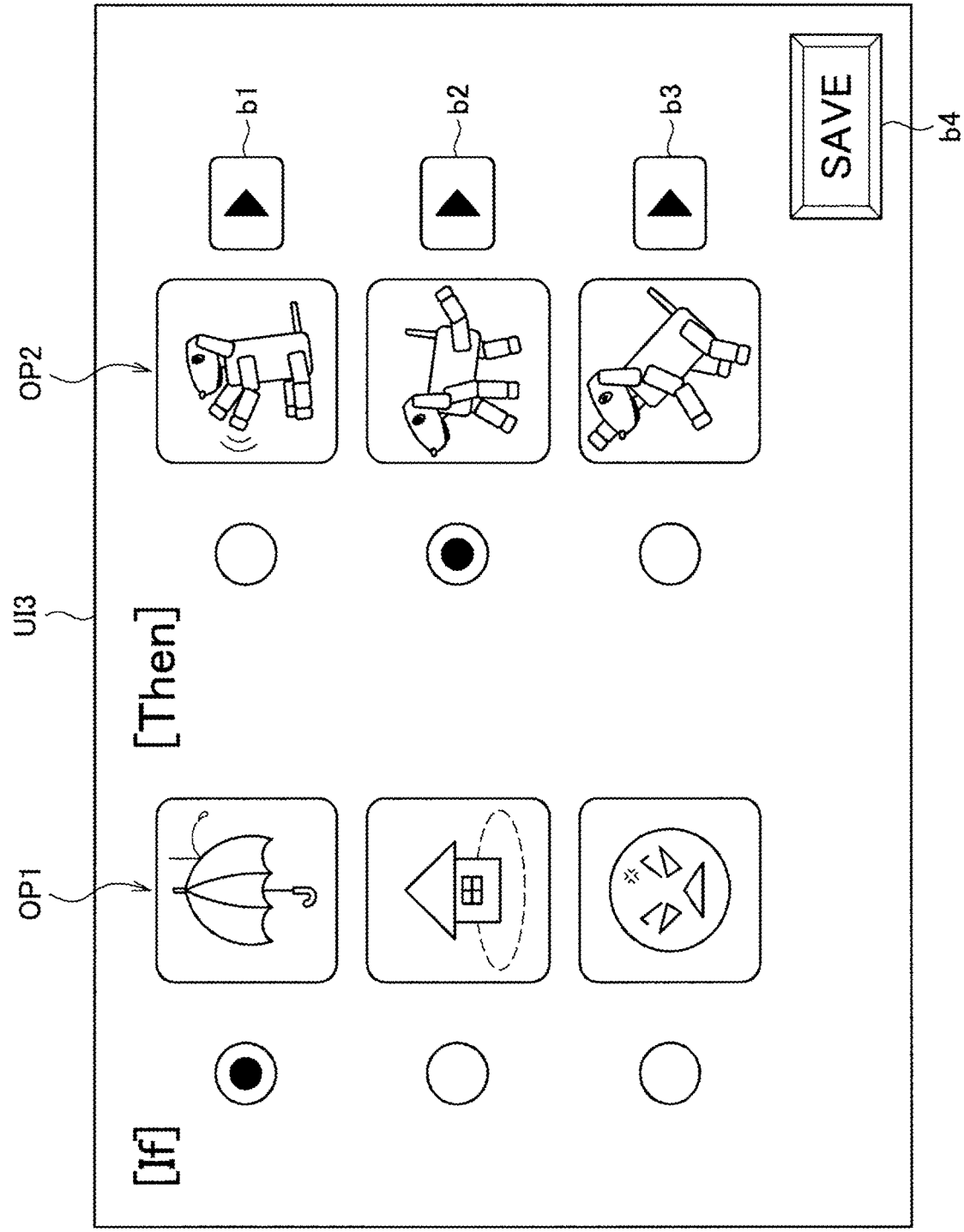
FIG. 34 is a diagram illustrating an exemplary user interface of a client application according to the third embodiment.

Together with the aforementioned downloading, the user is also able to set cause circumstances described in the first embodiment via the client application. FIG. 34 is a diagram illustrating an exemplary user interface of the client application according to the embodiment.

FIG. 34 illustrates a user interface UI3 that makes it possible to set cause circumstances and download control sequence data. The user may, for example, select cause circumstances and an operation corresponding to the cause circumstance from options OP1 and OP2 on the user interface UI3.

In the example illustrated in FIG. 34, the user is able to select cause circumstances, such as "if it rains", "if the user goes home", or "if the autonomous mobile object 10 is in a bad mood", from options OP1. For example, a field for specifying detailed circumstances may be set for cause circumstances.

The user is able to specify a given operation to be associated with cause circumstances from the options OP2. The user, for example, may be able to check a preview of operations by pushing the buttons b1 to b3. By selecting a given operation while checking the preview of operations and pushing a button b4, the user is able to download the control sequence data on the operation associated with a cause condition to the autonomous mobile object 10.

4.3. Additional Registration in Recognition Dictionary

A function of making additional registration in a recognition dictionary that the behavior recommender 220 according to the embodiment has will be described. The behavior recommender 220 according to the embodiment may have a function of, in addition to representing a recommended behavior to the autonomous mobile object 10, additionally registering new data in an object recognition dictionary or an audio recognition dictionary of the autonomous mobile object 10.

Figure 35:
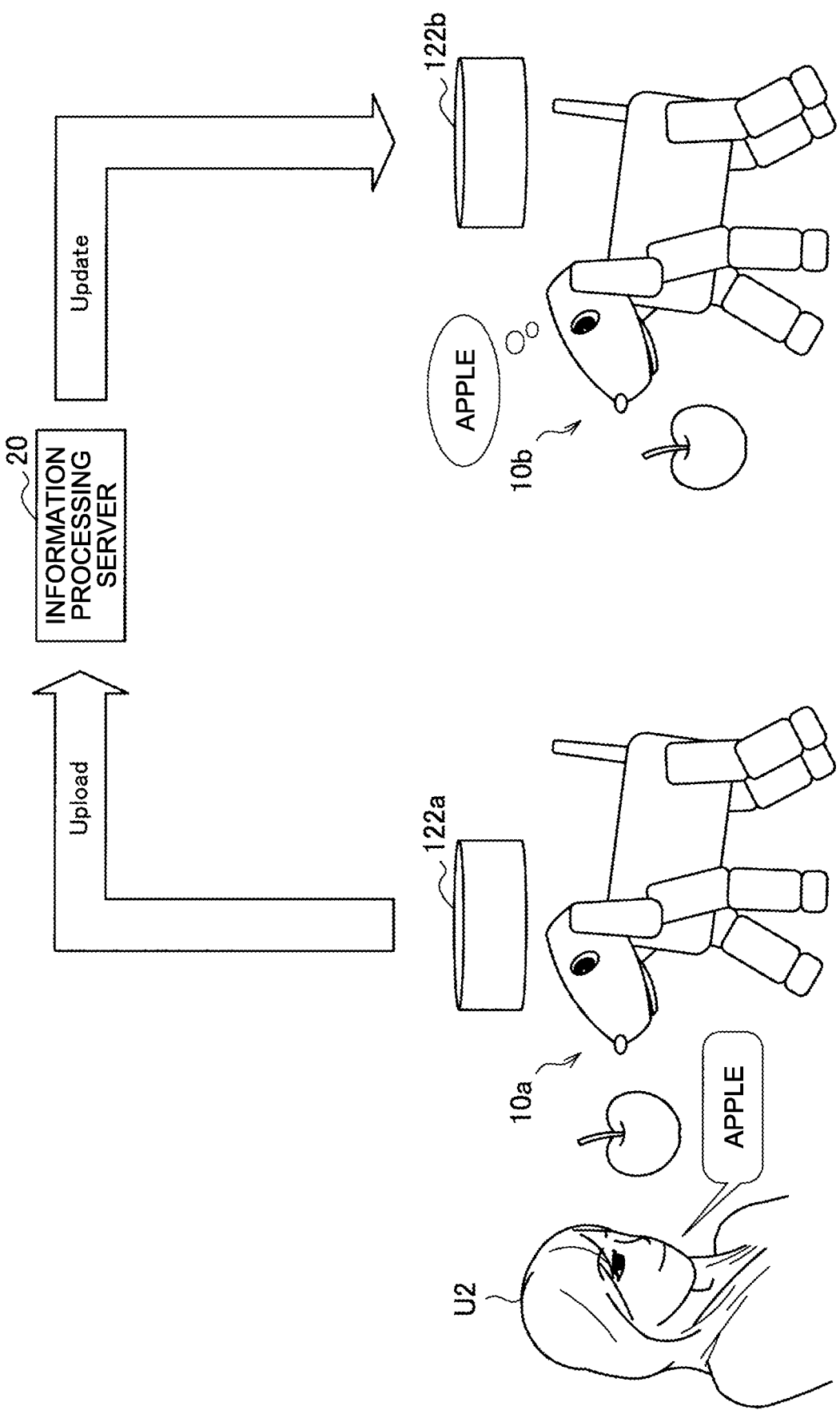
FIG. 35 is a diagram for describing additional registration in an object recognition dictionary according to the third embodiment.

FIG. 35 is a diagram for describing additional registration in the object recognition dictionary according to the embodiment. On the left in FIG. 35, the user U2 who causes the autonomous mobile object 10 to newly learn object recognition relating to apples is illustrated.

When an audio recognition result and image data relating to "apple" are registered in association with each other in an object recognition dictionary 122a of the autonomous mobile object 10 because of the above-described act, the behavior recommender 220 according to the embodiment may collect data that is newly registered in the object recognition dictionary 122a and additionally register the data in an object recognition dictionary 122b of the autonomous mobile object 10b that is a subject autonomous mobile object.

The above-described function of the behavior recommender 220 according to the embodiment makes it possible to efficiently enhance the content of the object recognition dictionary 122 of the autonomous mobile object 10 and improve generalization relating to object recognition.

Figure 36:
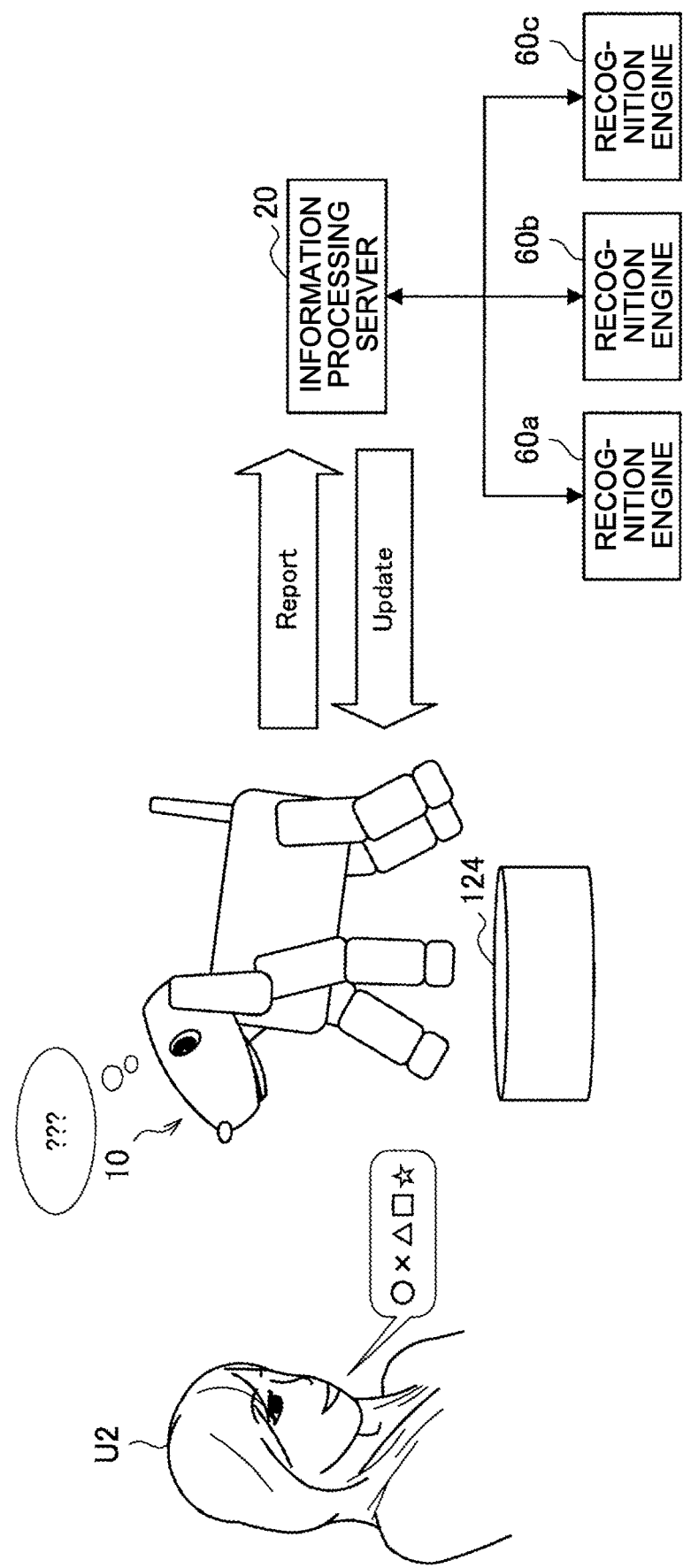
FIG. 36 is a diagram for describing additional registration in an audio recognition dictionary according to the third embodiment.

FIG. 36 is a diagram for describing additional registration in the audio recognition dictionary according to the embodiment. On the left in FIG. 36, the autonomous mobile object 10 that fails in audio recognition of an utterance made by the user U2 is illustrated. The behavior recommender 220 according to the embodiment collects a recognition failure log relating to utterances made by the user U2 from the autonomous mobile object 10. The recognition failure log contains audio data including utterances of the user U2.

Subsequently, the behavior recommender 220 causes a plurality of recognition engines 60a to 60c to recognize the sound of utterance of the user contained in the collected recognition failure log, thereby acquiring recognition results. When likely data is obtained from the acquired recognition results, the behavior recommender 220 may additionally register the data in an audio recognition dictionary 124 of the autonomous mobile object 10.

The above-described function of the behavior recommender 220 according to the embodiment makes it possible to efficiently enhance the content of the audio recognition dictionary 124 of the autonomous mobile object 10 and improve generalization relating to object recognition.

4.4. Recommendation of Maintenance

A function of recommending maintenance that the behavior recommender 220 according to the embodiment has will be described. The behavior recommender 220 according to the embodiment may have a recommendation function relating to maintenance of the autonomous mobile object 10 in addition to representation of a recommended behavior to the autonomous mobile object 10.

Figure 37:
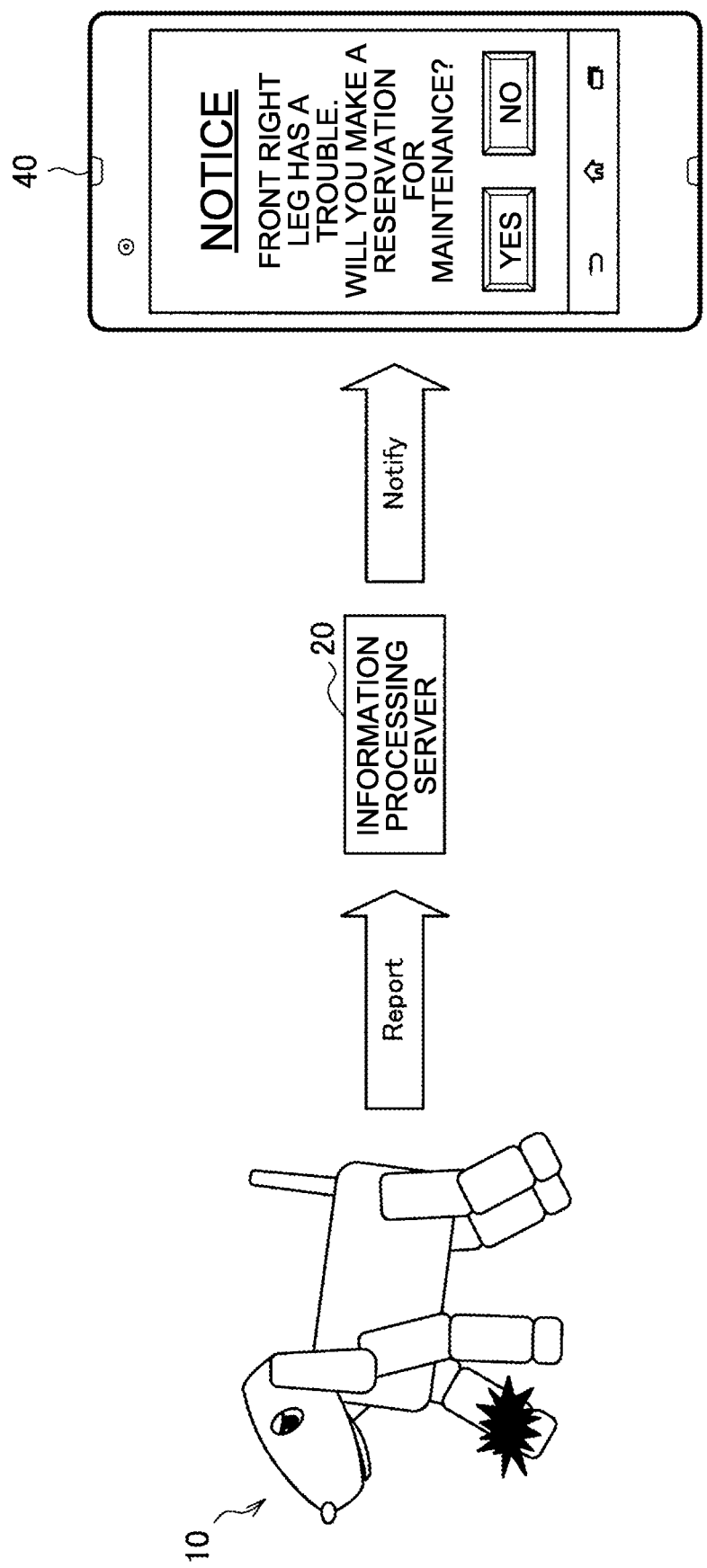
FIG. 37 is a diagram for describing a function of recommending maintenance according to the third embodiment.

FIG. 37 is a diagram for describing a function of recommending maintenance according to the embodiment. On the left in FIG. 37, the autonomous mobile object 10 in which a failure occurs in the actuator 570 of the right front leg is illustrated. Based on a result of analysis by the analyzer 230 on the operational status relating to the autonomous mobile object 10, the behavior recommender 220 according to the embodiment is able to transmit a notification recommending maintenance to the user.

The analyzer 230 is capable of, based on information relating to the operational status of a component, such as the actuator 570, that is received from the autonomous mobile object 10, detecting or expecting deterioration or a failure of the component. For example, in addition to the total number of times of operation and the total operational time, a behavior failure log relating to the component is taken as the aforementioned information relating to the operational status. The aforementioned behavior failure includes a log of error notifications that are output when the component does not operate according to control by the operation controller 150.

When a failure of the component is estimated from the behavior failure log, the behavior recommender 220 according to the embodiment may transmit a notification recommending maintenance of the component to the information processing terminal device 40 that the user owns. The behavior recommender 220 may transmit the aforementioned notification via a client application like that described above.

When a failure of the component is detected or expected, the behavior recommender 220 according to the embodiment may be able to automatically order the component.

The behavior recommender 220 and the analyzer 230 according to the embodiment enable early detection of a failure of a component of the autonomous mobile object 10 and utilization of the autonomous mobile object 10 in a safe condition for a long term.

4.5. Flow of Control

Figure 38:
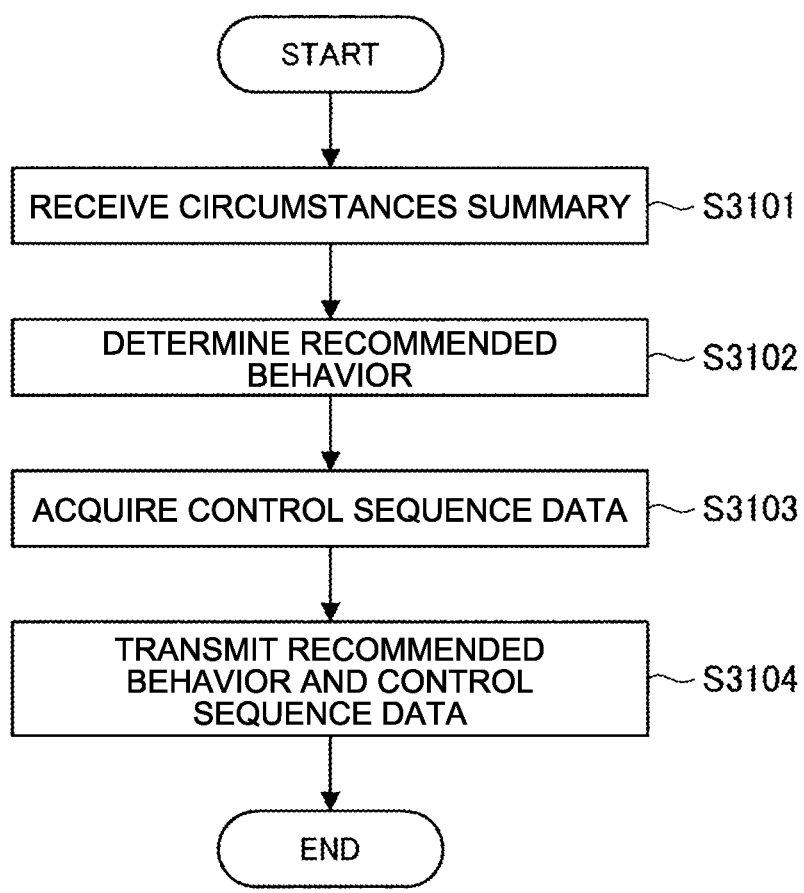
FIG. 38 is a flowchart representing a flow of representation of recommended behavior by an information processing server according to the third embodiment.

A flow of representation of a recommended behavior made by the information processing server 20 according to the embodiment will be described in detail. FIG. 38 is a flowchart representing a flow of representation of a recommended behavior made by the information processing server 20 according to the embodiment.

Referring to FIG. 38, first of all, the terminal device communication unit 250 receives a circumstances summary from a subject autonomous mobile object (S3101).

Based on the circumstances summary that is received at step S3101 and knowledge serving as collective intelligence of the learning unit 210, the behavior recommender 220 determines a recommended behavior (S3102).

The behavior recommender 220 acquires control sequence data corresponding to the recommended behavior that is determined at step S3102 from the storage 240 (S3103).

The behavior recommender 220 subsequently transmits information relating to the recommended behavior that is determined at step S3102 and the control sequence data that is acquired at step S3103 to the subject autonomous mobile object via the terminal device communication unit 250 (S3104).

5. Exemplary Hardware Configuration

Figure 39:
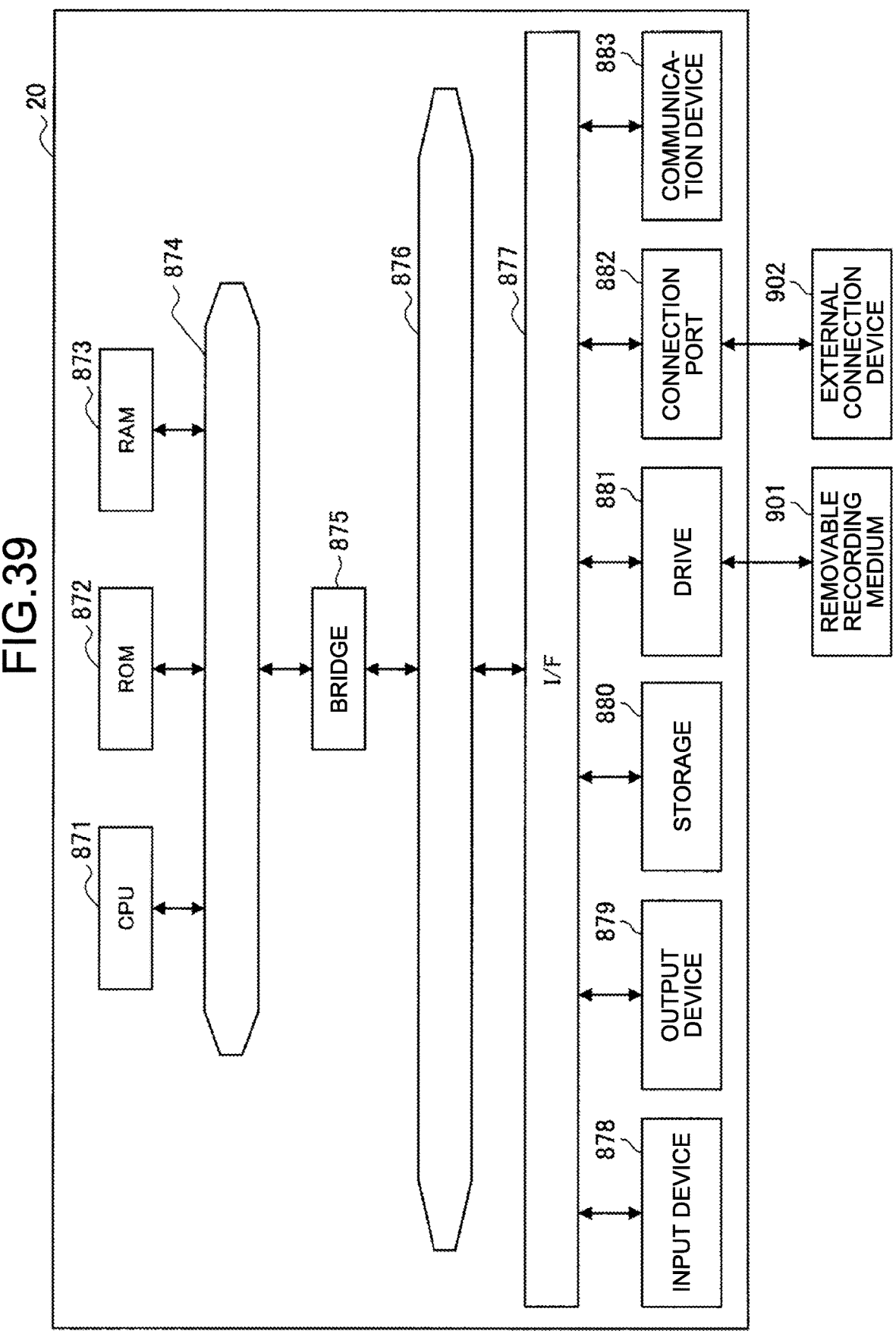
FIG. 39 is a diagram illustrating an exemplary hardware configuration of as information processing server according to an embodiment of the disclosure.

An exemplary hardware configuration of the information processing server 20 according to an embodiment of the disclosure will be described. FIG. 39 is a block diagram illustrating an exemplary hardware configuration of the information processing server 20 according to the embodiment of the disclosure. Referring to FIG. 39, the information processing server 20, for example, includes a CPU 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration illustrated herein is an example and part of the components may be omitted. Components other than the components illustrated herein may be further included.

CPU 871

The CPU 871, for example, functions as an arithmetic processor or a control device and controls all or part of operations of the components based on various programs that are recorded in the ROM 872, the RAM 873, the storage 880, or the removable recording medium 901.

ROM 872, RAM 873

The ROM 872 is a unit that stores a program to be loaded in the CPU 871 and data used for computation, etc. In the RAM 873, for example, a program to be loaded in the CPU 871 and various parameters that vary as appropriate when the program is executed, etc., are temporarily or permanently stored.

Host Bus 874, Bridge 75, External Bus 876 and Interface 877

The CPU 871, the ROM 872 and the RAM 873 are, for example, connected to one another via the host bus 874 capable of high-rate data transmission. On the other hand, the host bus 874, for example, is connected to the external bus 876 in which the data transmission rate is relatively low via the bridge 875. The external bus 876 is connected to various components via the interface 877.

Input Device 878

For example, a mouse, a keyboard, a touch panel, a button, a switch and a lever, etc., are used for the input device 878. A remote controller capable of transmitting a control signal using infrared rays or other radio waves may be used as the input device 878. The input device 878 includes an audio input device, such as a microphone.

Output Device 879

The output device 879 is, for example, a device capable of visually or auditorily notifying a user of acquired information, such as a display device like a CRT (Cathode Ray Tube), a LCD, or an organic EL, an audio output device like a speaker or headphones, a printer, a mobile phone, or a facsimile machine. The output device 879 according to the disclosure includes various vibration devices capable of outputting tactile stimulation.

Storage 880

The storage 880 is a device for storing various types of data. For example, a magnetic storage device, such as a hard disk drive (HDD), a semiconductor storage device, an optical storage device, or an magneto-optical device may be used as the storage 880.

Drive 881

The drive 881, for example, is a device that reads information recorded in the removable recording medium 901, such as a magnetic disk, an optical disk, a magneto-optical disk, or a semiconductor memory, or writes information in the removable recording medium 901.

Removable Recording Medium 901

The removable recording medium 901 is, for example, a DVD medium, a Blu-ray (trademark) medium, a HD DVD medium, or various types of semiconductor storage media. The removable recording medium 901, for example, may be an IC card, an electric device, or the like, on which a non-contact IC chip is mounted.

Connection Port 882

The connection port 882, for example, is a port for connecting the external connection device 902, such as a USB (Universal Serial Bus) port, an IEEE1394 port, a SCSI (Small Computer System Interface), a RS-232C port or an optical audio terminal.

External Connection Device 902

The external connection device 902 is, for example, a printer, a portable music player, a digital camera, a digital video camera or an IC recorder.

Communication Device 883

The communication device 883 is a communication device for connecting to a network and is, for example, a communication card for a wired or wireless LAN, Bluetooth (trademark) or WUSB (Wireless USB), a router for optical communication, a router for ADSL (Asymmetric Digital Subscriber Line), or a modem for various types of communication.

6. Summary

As described above, the autonomous mobile object 10 according to the embodiment of the disclosure includes the behavior planner 140 that plans a behavior based on circumstances estimation. The behavior planner 140 has a characteristic in determining a behavior to be executed by the autonomous mobile object based on the estimated circumstances and multiple sets of needs opposed to each other. The configuration enables implementation of a natural and flexible behavior plan of the autonomous mobile object.

The preferable embodiments of the disclosure have been described in detail with reference to the accompanying drawings; however, the technical scope of the disclosure is not limited to the examples. It is obvious that those with general knowledge in the technical field of the disclosure can reach various exemplary modifications or exemplary corrections within the scope of technical idea described in the claims and it is understood that they naturally belong to the technical scope of the disclosure.

The effects disclosed herein are explanatory and exemplary only and thus are not definitive. In other words, the technique according to the disclosure can achieve, together with the above-described effects or instead of the above-described effects, other effects obvious to those skilled in the art from the description herein.

Each step according to the processes performed by the autonomous mobile object 10 and the information processing server 20 according to the disclosure need not necessarily be processed chronologically along the order illustrated in the flowchart. For example, each step according to the processes of the autonomous mobile object 10 and the information processing server 20 may be processed in an order different from that illustrated in the flowchart or may be processed in parallel.

The following configuration also belongs to the technical scope of the disclosure.

(1)

An information processing apparatus comprising:
a behavior planner configured to plan a behavior of an autonomous mobile object based on estimation of circumstances,
wherein the behavior planner is configured to, based on the circumstances that are estimated and multiple sets of needs that are opposed to each other, determine the behavior to be executed by the autonomous mobile object.

(2)

The information processing apparatus according to (1), wherein the sets of needs opposed to each other include self-preservation needs and self-esteem needs.

(3)

The information processing apparatus according to (2), wherein the behavior planner is configured to, based on the estimated circumstances, plan the behavior satisfying at least one of the self-preservation needs and the self-esteem needs.

(4)

The information processing apparatus according to (2) or (3), wherein the behavior planner is configured to, in circumstances where no user is detected, plan the behavior prioritizing the self-preservation needs.

(5)

The information processing apparatus according to any one of (2) to (4), wherein
the self-preservation needs include needs relating to charging power of the autonomous mobile object, and
the behavior planner is configured to plan the behavior prioritizing maintenance of or replenishment for the charging power.

(6)

The information processing apparatus according to any one of (2) to (5), wherein
the self-preservation needs include needs relating to maintenance of a function of the autonomous mobile object, and
the behavior planner is configured to plan the behavior prioritizing maintenance or recovery of the function of the autonomous mobile object.

(7)

The information processing apparatus according to any one of (2) to (6), wherein the behavior planner is configured to, when the self-preservation needs are under a threshold, plan the behavior prioritizing the self-esteem needs.

(8)

The information processing apparatus according to any one of (2) to (7), wherein
the autonomous mobile object includes a structure corresponding to at least eyeballs and a head part, and
the behavior planner is configured to plan the behavior of turning gaze toward a user and then turning the head part toward the user.

(9)

The information processing apparatus according to (8), wherein
the autonomous mobile object further includes a structure corresponding to a torso part, and
the behavior planner is configured to plan the behavior of turning the torso part toward the user after turning the head part toward the user.

(10)

The information processing apparatus according to any one of (1) to (9), wherein the behavior planner is configured to plan the behavior based on a distance between the autonomous mobile object and the user.

(11)

The information processing apparatus according to any one of (1) to (10), wherein the behavior planner is configured to plan the behavior based on strength of a strength of a demand of the user for the autonomous mobile object.

(12)

The information processing apparatus according to any one of (1) to (11), wherein the behavior planner is configured to plan the behavior based on a control mode of the autonomous mobile object.

(13)

The information processing apparatus according to (12), wherein the autonomous mobile object includes a structure corresponding to a mouth, and the behavior planner is configured to, when the control mode of the autonomous mobile object is a silent mode, plan the behavior such that the structure corresponding to the mouth does not open.

(14)

The information processing apparatus according to any one of (1) to (13), wherein the behavior planner is configured to, based on changes in illuminance, plan the behavior satisfying at least one of self-preservation needs and self-esteem needs.

(15)

The information processing apparatus according to (14), wherein the behavior planner is configured to, based on a surrounding environment or a condition of the user, determine a priority relating to the self-preservation needs or the self-esteem needs.

(16)

The information processing apparatus according to any one of (1) to (15), wherein the behavior planner is configured to, when it is detected that the user houses the autonomous mobile object, plan the behavior satisfying both self-preservation needs and self-esteem needs.

(17)

The information processing apparatus according to any one of (1) to (16), further comprising an operation controller configured to control operations of the autonomous mobile object based on the behavior planned by the behavior planner.

(18)

The information processing apparatus according to any one of (1) to (17), further comprising independent two display devices corresponding to eyeballs.

(19)

An information processing method comprising:

by a processor, planning a behavior of an autonomous mobile object based on estimation of circumstances, wherein the planning includes, based on the circumstances that are estimated and multiple sets of needs that are opposed to each other, determining the behavior to be executed by the autonomous mobile object.

(20)

A program for causing a computer to function as an information processing apparatus comprising a behavior planner configured to plan a behavior of an autonomous mobile object based on estimation of circumstances, wherein the behavior planner is configured to, based on the circumstances that are estimated and multiple sets of needs that are opposed to each other, determine the behavior to be executed by the autonomous mobile object.

REFERENCE SIGNS LIST

10 Autonomous Mobile Object
110 Input Unit
120 Recognition Unit
130 Learning Unit
140 Behavior Planner
150 Operation Controller
160 Driver
170 Output Unit
510 Display
570 Actuator
20 Information Processing Server
210 Learning Unit
220 Behavior Recommender
230 Analyzer
240 Storage

The invention claimed is:

1. An information processing apparatus comprising:

a behavior planner configured to estimate circumstances in relation to an autonomous mobile object using sensor information collected from the autonomous mobile object, plan a behavior of the autonomous mobile object based on the estimated circumstances, and transmit control sequence data for causing the autonomous mobile object to implement the planned behavior, wherein the behavior planner is configured to, based on the circumstances that are estimated and multiple sets of needs that are opposed to each other, determine the behavior to be executed by the autonomous mobile object, wherein the determined behavior of the autonomous mobile object includes a visual expression related to eyeball operations being performed sequentially before performing subsequent operations related to other parts of the autonomous mobile object, wherein an amount and a type of the subsequent operations related to the other parts of the autonomous mobile object are determined based on a distance between a user and the autonomous mobile object, and wherein the behavior planner is implemented via at least one processor.

2. The information processing apparatus according to claim 1, wherein the sets of needs opposed to each other include self-preservation needs and self-esteem needs.

3. The information processing apparatus according to claim 2, wherein the behavior planner is configured to, based on the estimated circumstances, plan the behavior satisfying at least one of the self-preservation needs and the self-esteem needs.

4. The information processing apparatus according to claim 2, wherein the behavior planner is configured to, in circumstances where no user is detected, plan the behavior prioritizing the self-preservation needs.

5. The information processing apparatus according to claim 2, wherein the self-preservation needs include needs relating to charging power of the autonomous mobile object, and the behavior planner is configured to plan the behavior prioritizing maintenance of or replenishment for the charging power.

6. The information processing apparatus according to claim 2, wherein the self-preservation needs include needs relating to maintenance of a function of the autonomous mobile object, and the behavior planner is configured to plan the behavior prioritizing maintenance or recovery of the function of the autonomous mobile object.

7. The information processing apparatus according to claim 2, wherein the behavior planner is configured to, when the self-preservation needs are under a threshold, plan the behavior prioritizing the self-esteem needs.

8. The information processing apparatus according to claim 1, wherein
the autonomous mobile object includes a structure corresponding to at least eyeballs and a head part, and
the estimated circumstances include an estimation of whether the user is present, and when the user is estimated to be present, the behavior planner is configured to plan the behavior of turning a gaze of the eyeballs toward the user and then turning the head part toward the user.

9. The information processing apparatus according to claim 8, wherein
the autonomous mobile object further includes a structure corresponding to a torso part, and
the behavior planner is configured to plan the behavior of turning the torso part toward the user after turning the head part toward the user.

10. The information processing apparatus according to claim 1, wherein the behavior planner is configured to plan the behavior based on the distance between the autonomous mobile object and the user.

11. The information processing apparatus according to claim 1, wherein the behavior planner is configured to plan the behavior based on strength of a demand of the user for the autonomous mobile object.

12. The information processing apparatus according to claim 1, wherein the behavior planner is configured to plan the behavior based on a control mode of the autonomous mobile object.

13. The information processing apparatus according to claim 12, wherein
the autonomous mobile object includes a structure corresponding to a mouth, and
the behavior planner is configured to, when the control mode of the autonomous mobile object is a silent mode, plan the behavior such that the structure corresponding to the mouth does not open.

14. The information processing apparatus according to claim 1, wherein the behavior planner is configured to, based on changes in illuminance, plan the behavior satisfying at least one of self-preservation needs and self-esteem needs.

15. The information processing apparatus according to claim 14, wherein the behavior planner is configured to, based on a surrounding environment or a condition of the user, determine a priority relating to the self-preservation needs or the self-esteem needs.

16. The information processing apparatus according to claim 1, wherein the behavior planner is configured to, when it is detected that the user houses the autonomous mobile object, plan the behavior satisfying both self-preservation needs and self-esteem needs.

17. The information processing apparatus according to claim 1, further comprising an operation controller configured to control operations of the autonomous mobile object based on the behavior planned by the behavior planner.

18. The information processing apparatus according to claim 1, further comprising two independent display devices corresponding to eyeballs.

19. An information processing method comprising:
by a processor, estimating circumstances in relation to an autonomous mobile object using sensor information collected from the autonomous mobile object;
by the processor, planning a behavior of the autonomous mobile object based on the estimated circumstances; and
by the processor, transmitting control sequence data for causing the autonomous mobile object to implement the planned behavior,
wherein the planning includes, based on the circumstances that are estimated and multiple sets of needs that are opposed to each other, determining the behavior to be executed by the autonomous mobile object,
wherein the determined behavior of the autonomous mobile object includes a visual expression related to eyeball operations being performed sequentially before performing subsequent operations related to other parts of the autonomous mobile object, and
wherein an amount and a type of the subsequent operations related to the other parts of the autonomous mobile object are determined based on a distance between a user and the autonomous mobile object.

20. A non-transitory computer-readable storage medium having embodied thereon a program, which when executed by a computer causes the computer to execute a method, the method comprising:
causing the computer to function as an information processing apparatus comprising a behavior planner configured to plan a behavior of an autonomous mobile object;
estimating circumstances in relation to the autonomous mobile object using sensor information collected from the autonomous mobile object;
planning the behavior of an autonomous mobile object based on the estimated circumstances; and
transmitting control sequence data for causing the autonomous mobile object to implement the planned behavior,
wherein the planning includes, based on the circumstances that are estimated and multiple sets of needs that are opposed to each other, determining the behavior to be executed by the autonomous mobile object,
wherein the determined behavior of the autonomous mobile object includes a visual expression related to eyeball operations being performed sequentially before performing subsequent operations related to other parts of the autonomous mobile object, and
wherein an amount and a type of the subsequent operations related to the other parts of the autonomous mobile object are determined based on a distance between a user and the autonomous mobile object.

21. The information processing apparatus according to claim 1, wherein the subsequent operations related to the other parts of the autonomous mobile object are reduced based on the distance between the user and the autonomous mobile object being increased.

* * * * *